(12) United States Patent
Kaushal et al.

(10) Patent No.: US 8,744,607 B2
(45) Date of Patent: Jun. 3, 2014

(54) METHOD AND APPARATUS FOR SELF-LEARNING AND SELF-IMPROVING A SEMICONDUCTOR MANUFACTURING TOOL

(71) Applicant: Tokyo Electron Limited, Tokyo (JP)

(72) Inventors: Sanjeev Kaushal, San Jose, CA (US); Sukesh Janubhai Patel, Cupertino, CA (US); Kenji Sugishima, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 13/763,797

(22) Filed: Feb. 11, 2013

(65) Prior Publication Data

US 2013/0151447 A1 Jun. 13, 2013

Related U.S. Application Data

(63) Continuation of application No. 12/697,121, filed on Jan. 29, 2010, now Pat. No. 8,396,582, which is a continuation-in-part of application No. 12/044,958, filed on Mar. 8, 2008, now Pat. No. 8,190,543.

(51) Int. Cl.
- *G06F 15/18* (2006.01)
- *G06N 3/08* (2006.01)
- *G06N 3/12* (2006.01)

(52) U.S. Cl.
USPC ............... 700/104; 700/100; 706/13; 706/25

(58) Field of Classification Search
USPC ............... 700/28, 47, 52, 100, 103, 104, 105, 700/108, 109, 110, 121; 702/81, 82, 83, 84, 702/182, 183, 184; 438/5, 14, 16, 17; 706/12, 13, 16, 23
See application file for complete search history.

(56) References Cited

U.S. PATENT DOCUMENTS

| | | | |
|---|---|---|---|
| 5,495,417 A | 2/1996 | Fuduka et al. | |
| 5,644,686 A | 7/1997 | Hekmatpour | |

(Continued)

FOREIGN PATENT DOCUMENTS

| | | |
|---|---|---|
| CN | 1734382 | 2/2006 |
| CN | 1791971 | 6/2006 |

(Continued)

OTHER PUBLICATIONS

"A Tutorial on Learning with Bayesian Networks", David Heckerman, Microsoft Technical Report MSR-TR-95-06, 1995.

(Continued)

*Primary Examiner* — Charles Kasenge
(74) *Attorney, Agent, or Firm* — Amin, Turocy & Watson, LLP

(57) ABSTRACT

Performance of a manufacturing tool is optimized. Optimization relies on recipe drifting and generation of knowledge that capture relationships among product output metrics and input material measurement(s) and recipe parameters. Optimized recipe parameters are extracted from a basis of learned functions that predict output metrics for a current state of the manufacturing tool and measurements of input material(s). Drifting and learning are related and lead to dynamic optimization of tool performance, which enables optimized output from the manufacturing tool as the operation conditions of the tool changes. Features of recipe drifting and associated learning can be autonomously or externally configured through suitable user interfaces, which also can be drifted to optimize end-user interaction.

20 Claims, 22 Drawing Sheets

(56) References Cited

U.S. PATENT DOCUMENTS

| | | | |
|---|---|---|---|
| 5,694,325 | A | 12/1997 | Fuduka et al. |
| 5,867,799 | A | 2/1999 | Lang et al. |
| 6,122,397 | A | 9/2000 | Lee et al. |
| 6,201,999 | B1 | 3/2001 | Jevtic et al. |
| 6,496,746 | B2 | 12/2002 | Jevtic et al. |
| 6,678,572 | B1 | 1/2004 | Oh et al. |
| 6,725,114 | B1 | 4/2004 | Jevtic et al. |
| 6,876,894 | B1 * | 4/2005 | Chen et al. ............... 700/100 |
| 7,127,304 | B1 | 10/2006 | Gould et al. |
| 7,133,804 | B2 | 11/2006 | Tonack et al. |
| 7,177,714 | B2 * | 2/2007 | Giebels et al. ............ 700/99 |
| 7,218,980 | B1 | 5/2007 | Orshansky et al. |
| 7,246,039 | B2 | 7/2007 | Moorhouse |
| 7,373,216 | B1 | 5/2008 | Winkler et al. |
| 7,531,368 | B2 | 5/2009 | Winkler et al. |
| 7,571,019 | B2 | 8/2009 | Winstead et al. |
| 7,596,423 | B2 | 9/2009 | Winkler et al. |
| 7,596,718 | B2 | 9/2009 | Harvey et al. |
| 7,702,411 | B2 | 4/2010 | Bagchi et al. |
| 7,849,033 | B2 | 12/2010 | Sabe et al. |
| 8,005,634 | B2 | 8/2011 | Shanmugasundram et al. |
| 8,010,321 | B2 | 8/2011 | Lin et al. |
| 8,396,582 | B2 * | 3/2013 | Kaushal et al. ............ 700/100 |
| 2003/0061212 | A1 | 3/2003 | Smith et al. |
| 2003/0199112 | A1 | 10/2003 | Shanmugasundram et al. |
| 2004/0254762 | A1 | 12/2004 | Hopkins et al. |
| 2005/0114829 | A1 | 5/2005 | Robin et al. |
| 2005/0144624 | A1 | 6/2005 | Riosa et al. |
| 2005/0288812 | A1 | 12/2005 | Cheng et al. |
| 2006/0042543 | A1 | 3/2006 | Funk et al. |
| 2006/0047356 | A1 | 3/2006 | Funk et al. |
| 2006/0129257 | A1 | 6/2006 | Chen et al. |
| 2006/0195409 | A1 | 8/2006 | Sabe et al. |
| 2006/0247915 | A1 | 11/2006 | Bradford et al. |
| 2007/0005341 | A1 | 1/2007 | Burges et al. |
| 2007/0100487 | A1 | 5/2007 | Cheng et al. |
| 2007/0122921 | A1 | 5/2007 | Shanmugasundram et al. |
| 2007/0219738 | A1 | 9/2007 | Weiher et al. |
| 2007/0282767 | A1 | 12/2007 | Cheng et al. |
| 2007/0288419 | A1 | 12/2007 | Strassner |
| 2008/0051929 | A1 | 2/2008 | Hongkham et al. |
| 2008/0051930 | A1 | 2/2008 | Oh et al. |
| 2008/0275586 | A1 | 11/2008 | Ko et al. |
| 2009/0138418 | A1 | 5/2009 | Hidai et al. |
| 2009/0222123 | A1 | 9/2009 | Nevills et al. |
| 2009/0240366 | A1 | 9/2009 | Kaushal et al. |
| 2009/0271344 | A1 | 10/2009 | Schafer et al. |

FOREIGN PATENT DOCUMENTS

| | | |
|---|---|---|
| CN | 101067742 | 11/2007 |
| JP | H04-112204 | 4/1992 |
| JP | 05-256495 | 10/1993 |
| JP | H11-329941 | 11/1999 |
| JP | 2006-024195 | 1/2006 |
| JP | 2006-500654 A | 1/2006 |
| JP | 2007-18490 | 1/2007 |
| JP | 2008-517362 | 5/2008 |
| JP | 4-123231 B2 | 7/2008 |
| JP | 2008-158748 | 7/2008 |

OTHER PUBLICATIONS

"Learning Probabilistic Networks", Paul J Krause, Phillips Research Laboratory, Technical Report, 1998.

International Search Report and Written Opinion for PCT Application No. PCT/US/09/36169, completed Apr. 15, 2009 and mailed Apr. 27, 2009, 10 pages.

International Search Report & Written Opinion dated May 5, 2009 for PCT Application Serial No. PCT/US09/36149, 11 pages.

International Search Report & Written Opinion dated Mar. 18, 2010 for PCT Application Serial No. PCT/US10/23113, 11 pages.

OA dated Apr. 20, 2011 for U.S. Appl. No. 12/044,959, 25 pages.

Shin et al., "A machine learning approach to yield management in semiconductor manufacturing", J.Pro. Res., 2000, vol. 38, No. 17, pp. 4261-4271.

Kopetz, "The Real Time Environment" in Real-time systems: design principles for distributed embedded applications, (Kopetz), Kluwer, 2002, vol. 395, pp. 1-28.

International Search Report & Written Opinion dated Apr. 12, 2011 for PCT Application Serial No. PCT/US1122997, 13 pages.

OA dated Oct. 13, 2011 for U.S. Appl. No. 12/044,958, 45 pages.

Haibo He ("Dynamically self-reconfigurable systems for machine intelligence" Aug. 2006).

Roth et al ("A Domain-Specific software architecture for adaptive intelligent systems" Apr. 1995).

Stirrup et al ("Improved MOGA-tuning and visualization for a hybrid control system" Proceedings of the 16th IFAC World Congress, 2005).

OA dated Nov. 14, 2011 for U.S. Appl. No. 12/416,018, 41 pages.

OA dated Jan. 19, 2012 for U.S. Appl. No. 12/697,121, 22 pages.

OA dated May 8, 2012 for U.S. Appl. No. 12/416,018, 48 pages.

OA dated Jun. 8, 2012 for U.S. Appl. No. 12/697,121, 29 pages.

OA dated Jul. 31, 2012 for U.S. Appl. No. 12/697,121, 31 pages.

Non-Final Office Action for U.S. Appl. No. 12/416,018 dated Oct. 17, 2012, 54 pgs.

Office Action for Chinese Patent Application No. 200980104562.8 dated May 28, 2012, 19 pgs.

Office Action for Chinese Patent Application No. 200980104564.7 dated Jul. 3, 2012, 24 pgs.

Final Office Action for U.S. Appl. No. 12/416,018 dated Apr. 16, 2013, 59 pages.

Office Action dated Jul. 18, 2013 for U.S. Appl. No. 12/416,018, 56 pages.

Yung-Cheng, et al. "Application Development of Virtual Metrology in Semiconductor Industry," Industrial Electronics Society, 2005. IECON 2005. 31st Annual Conference of IEEE, Nov. 6-10, 2005. pp. 124-129.

Japanese Office Action mailed Jun. 11, 2013 for JP Patent Application No. 2010-549880, 4 pages.

Taiwanese Office Action mailed Sep. 26, 2013 for Taiwanese Patent Application No. 098107266, 16 pages.

Japanese Office Action mailed Oct. 15, 2013 for Japanese Patent Application No. 2012-503438, 23 pages.

Chinese Office Action mailed Oct. 8, 2013 for Chinese Patent Application No. 200980104562.8, 11 pages.

Chinese Office Action dated Feb. 28, 2013 for Chinese Patent Application No. 200980104562.8, 4 pages.

Japanese Office Action dated Mar. 26, 2013 for Japanese Patent Application No. 2010-549876, 4 pages.

Japanese Office Action mailed on Jan. 7, 2014 for Japanese Application No. 2010-549880, 4 pages.

Japanese Office Action mailed on Jan. 21, 2014 for Japanese Application No. 2012-503438, 3 pages.

* cited by examiner

METHOD AND APPARATUS FOR SELF-LEARNING AND SELF-IMPROVING A SEMICONDUCTOR MANUFACTURING TOOL

CROSS-REFERENCE TO RELATED APPLICATION

This application is a continuation of U.S. patent application Ser. No. 12/697,121, entitled "METHOD AND APPARATUS FOR SELF LEARNING AND SELF-IMPROVING A SEMICONDUCTOR MANUFACTURING TOOL", filed on Jan. 29, 2010, which (1) is a continuation-in-part of U.S. patent application Ser. No. 12/044,958, entitled "AUTONOMOUS BIOLOGICALLY BASED LEARNING TOOL," filed on Mar. 8, 2008 and (2) is related to U.S. patent application Ser. No. 12/044,959, entitled "AUTONOMOUS ADAPTIVE SEMICONDUCTOR MANUFACTURING," filed on Mar. 8, 2008. The entireties of all prior-filed applications listed herein are hereby incorporated by reference.

BACKGROUND

Technological advances have lead to process-driven automated equipment that is increasingly complex. A tool system to accomplish a specific goal or perform a specific, highly technical process can commonly incorporate multiple functional elements to accomplish the goal or successfully execute the process, and various sensors that collect data to monitor the operation of the equipment. Such automated equipment can generate a large volume of data. Data can include substantial information related to a product or service performed as a part of the specific task, but it can also comprise sizable log information related to the execution of the process itself.

While modem electronic storage technologies can afford retaining constantly increasing quantities of data, utilization of the accumulated data remains far from optimal. Examination and interpretation of collected information generally requires human intervention, and while advances in computing power such as multiple-core processors, massively parallel platforms and processor grids, as well as advances in computing paradigms like object-oriented programming, modular code reuse, web based applications and more recently quantum computing, the processing of the collected data remains to be a non-autonomous, static programmatic enterprise wherein the data is operated upon. More importantly, in non-autonomous data processing, the data fails to drive the analysis process itself. As a consequence of such data processing paradigm, much of the rich relationships that can be present among data generated in automated equipment during a highly technical process can be unnoticed unless a specific analysis is designed and focused on a specific type of relationship. More importantly, emergent phenomena that can originate from multiple correlations among disparate data generated by disparate units in the equipment, and that can determine optimal performance of a complex automated tool or machine, can remain unnoticed.

In addition, the various correlations among data and variables associated with a process performed in a machine can deliver substantial information related to the actual operational performance of a set of tools or machines. It should be appreciated that specific calibration correlations can develop during synthetic operation of the set of tools, and disparate production correlations can develop as a result of the operation in production mode. The disparity in the correlations can arise from evolution or adjustment of a tool (e.g., wear and tear, fault(s) in operation such as utilization of an instrument outside prescribed conditions, etc.). Conventional systems and approaches that monitor performance of one or more instruments in a process typically utilize data that fails to capture and exploit such production correlations.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

System(s) and method(s) for optimizing performance of a manufacturing tool are provided. Optimization relies on recipe drifting and generation of knowledge that capture relationships among product output metric(s) and input material measurement(s) and recipe parameters. Optimized recipe parameters for specific processes or sub-system(s) of the manufacturing tool are extracted from a basis of learned functions that predict output metrics for a current state of the manufacturing tool and measurements of input material(s); optimal or nearly-optimal recipe parameters can be determined trough inverse-problem approaches. Drifting and learning are related and lead to dynamic optimization of tool performance, which enables optimized output from the manufacturing tool as the operation conditions of the tool changes. Features of recipe drifting and associated learning can be autonomously or externally configured through suitable user interfaces, which also can be drifted to optimize end-user interaction.

In an aspect, recipe drift component generates a set of incrementally adjusted recipes. An autonomous biologically based learning tool system generates a set of learned predictive functions that relate input measurement and recipe parameters to output metrics. An autonomous optimization component solves an inverse problem to extract a set of recipe parameters provided a set of input material measurement(s) and a set of asset target metrics for a manufactured product.

The autonomous biologically based learning tool system includes (i) one or more tool systems that are either individual systems or hierarchically deployed group and conglomerated systems, which perform a specific task, e.g., a semiconductor manufacturing task, or process, such as oxide etching or ion implantation, and generates data that reflects the process and a tool performance, (ii) an interaction manager that receives data and packages the data for further utilization, and (iii) an autonomous learning system based on biological principles of learning; the learning implemented through spread activation of concepts in a set of semantic networks. The autonomous learning system comprises a functional structure that can be defined recursively from a group of three functional blocks: a memory platform, a processing platform, and a knowledge communication network, through which information is communicated among the memory and processing platforms, as well as the tool system and an external actor (e.g., a computer or a human agent). Memory platform includes a hierarchy of memories, including an episodic memory to receive data impressions and associated learning instructions, a short term memory that is employed for knowledge development, and a long term memory that stores knowledge, casting the knowledge into semantic networks. Functional units in the processing platform operate on the information stored in the memory platform, facilitating learning. Such building blocks and associated functionality are inspired by the biological structure and behavior of the human brain.

To the accomplishment of the foregoing and related ends, the following description and the annexed drawings set forth in detail certain illustrative aspects of the subject disclosure. These aspects are indicative, however, of but a few of the various ways in which the principles of the subject disclosure may be employed and the claimed subject matter is intended to include all such aspects and their equivalents. Other advantages and novel features of the subject disclosure will become apparent from the following detailed description of the subject disclosure when considered in conjunction with the drawings.

DETAILED DESCRIPTION OF THE DRAWINGS

Figure 14:
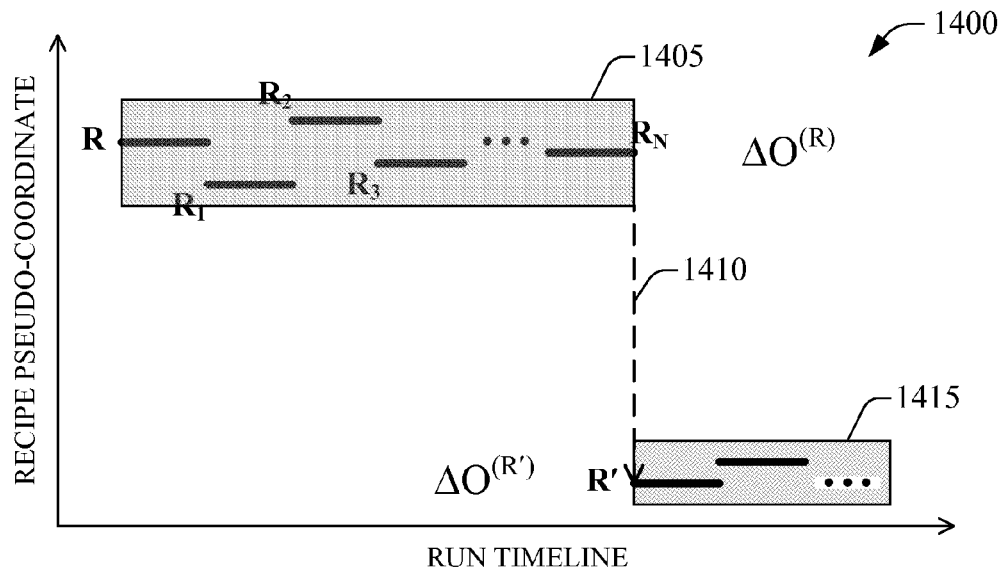

FIG. 14 displays a diagram of recipe adaptation through drifting in accordance to aspects described herein.

Figure 15:
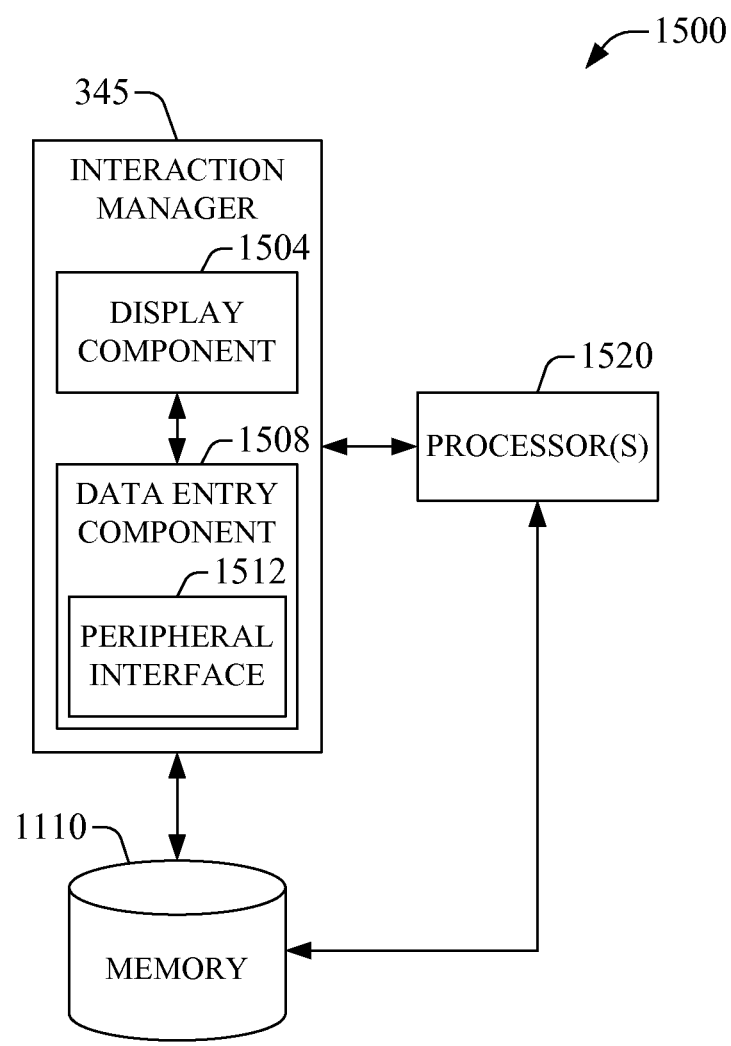

FIG. 15 displays an example embodiment of an interaction manager in accordance with aspects of the subject disclosure.

Figure 16:
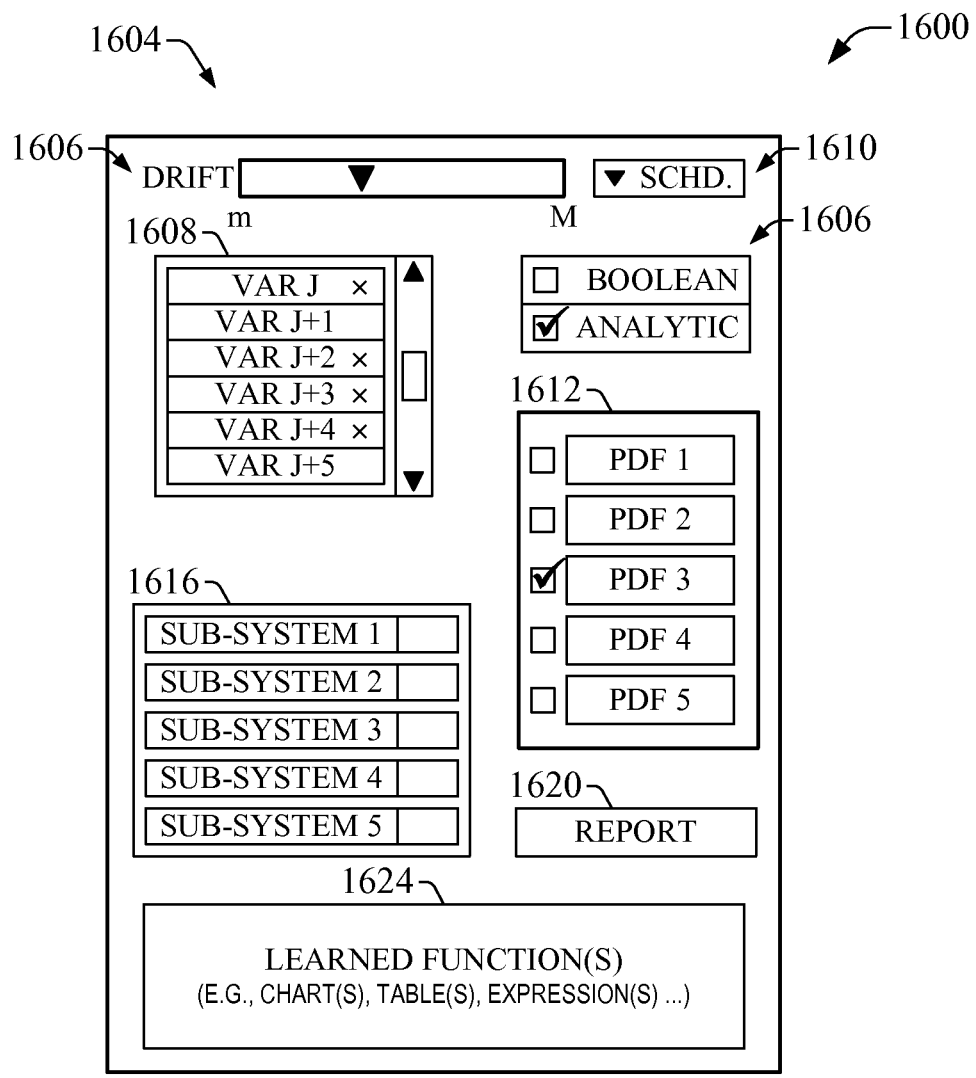

FIG. 16 is an example user interface that can be rendered to regulate, at least in part, drifting and associated knowledge generation of a tool system in accordance with aspects described herein.

Figure 17:
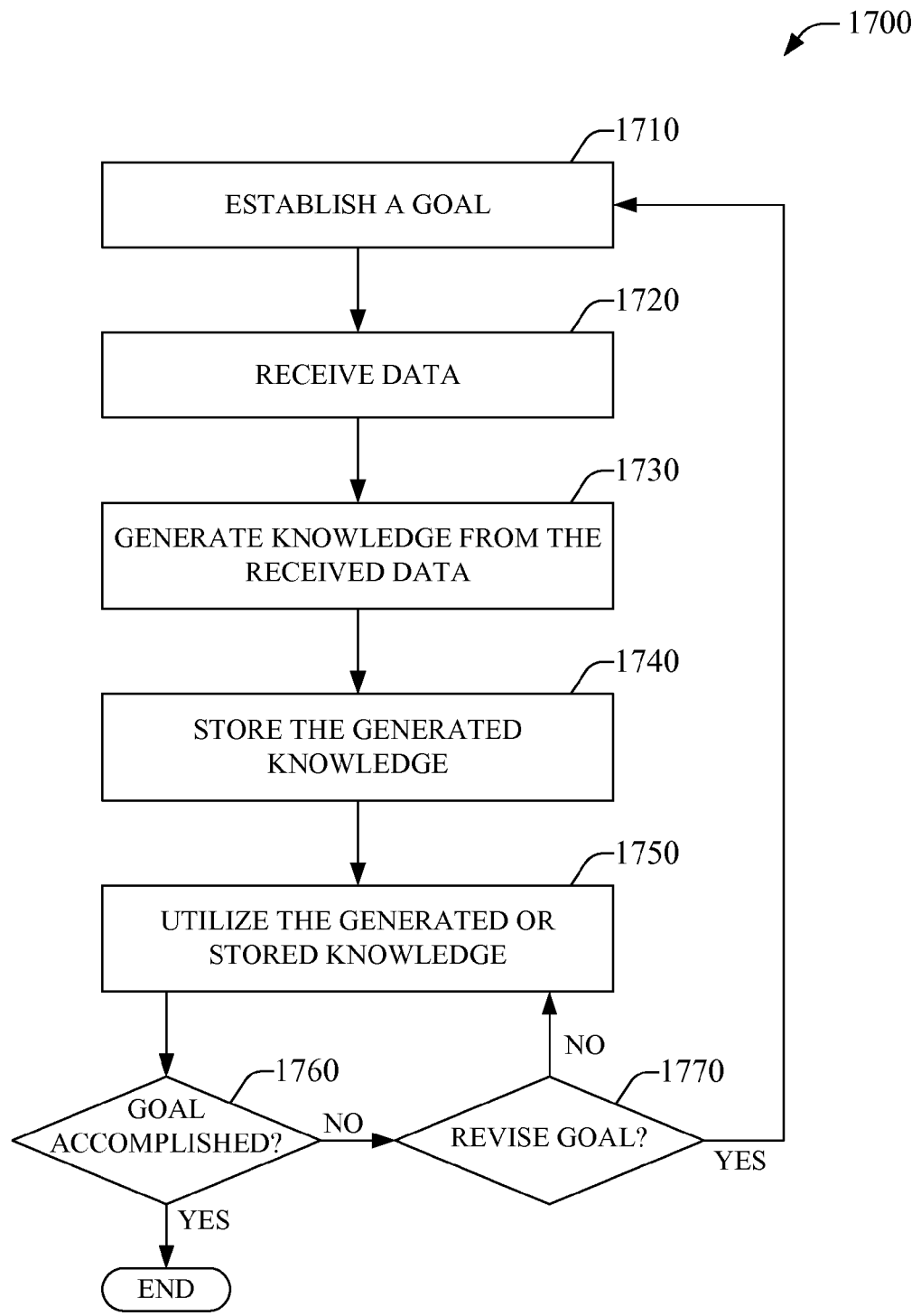

FIG. 17 presents a flowchart of an example method for biologically based autonomous learning according to aspects described herein.

Figure 18:
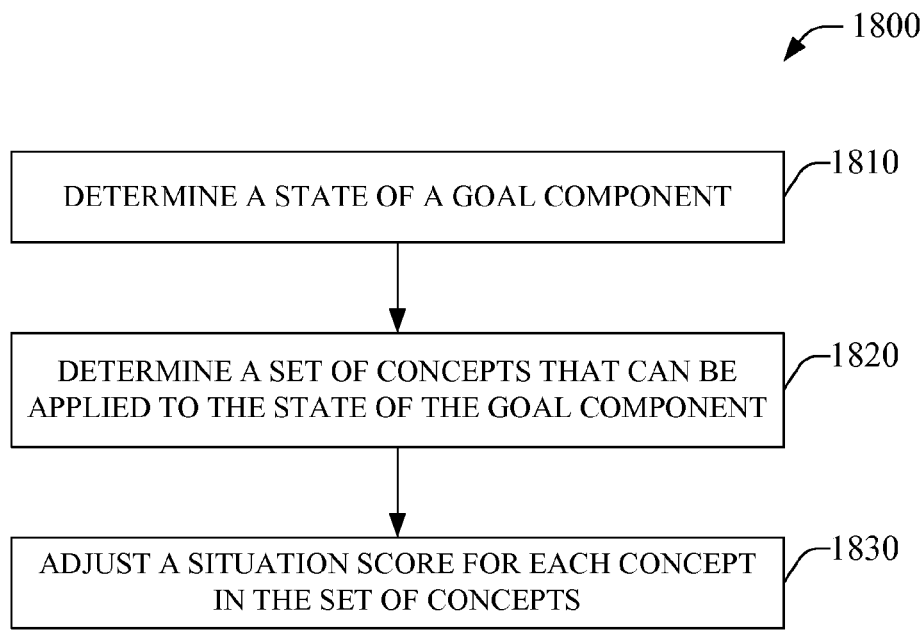

FIG. 18 presents a flowchart of an example method for generating knowledge in accordance with an aspect set forth herein.

Figure 19:
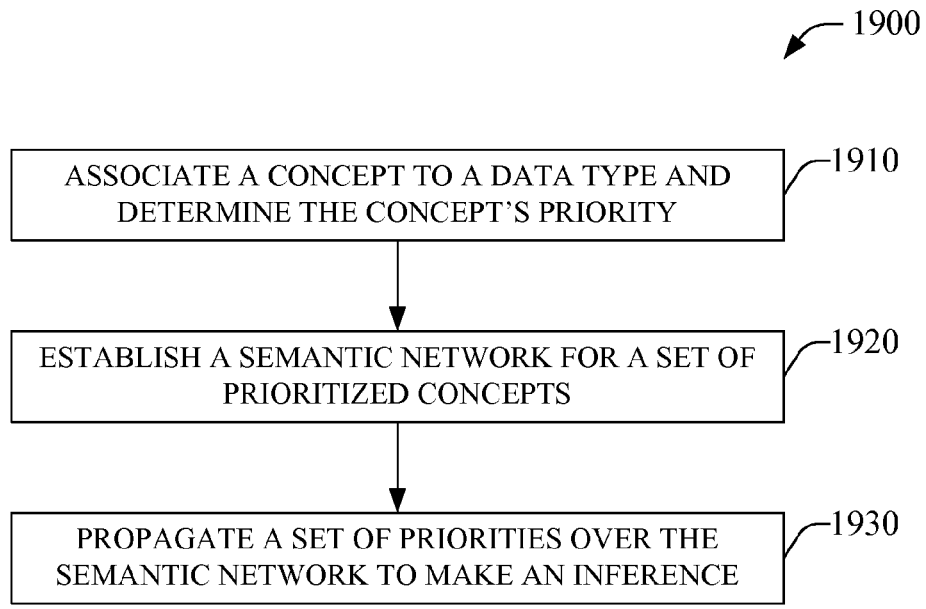

FIG. 19 presents a flowchart of an example method for generating knowledge through inference according to aspects described herein.

Figure 20:
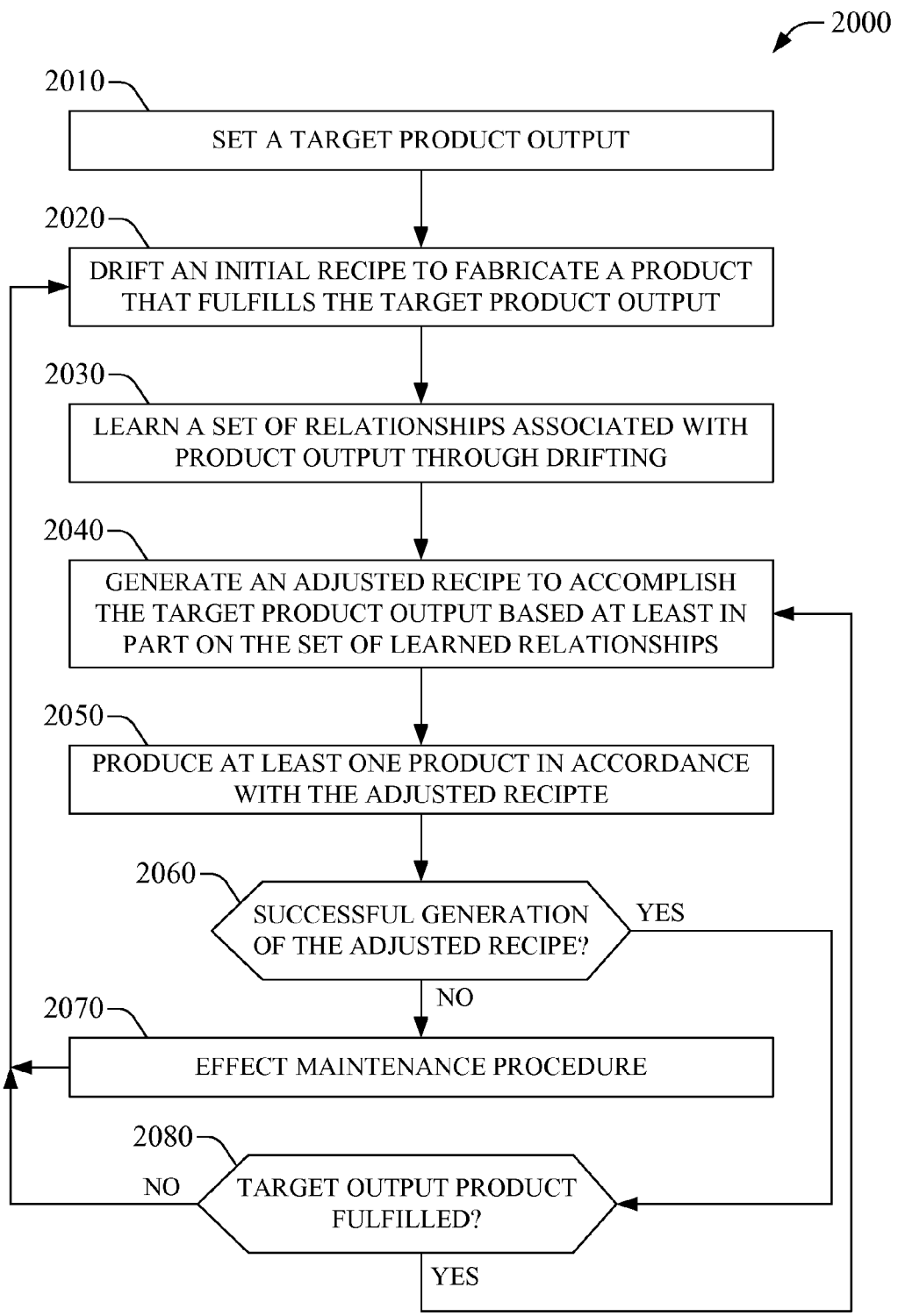

FIG. 20 presents a flowchart of an example method for learning a relationship among a set of variables associated with production data generated by one or more tools that produce, e.g., manufacture, an asset according to aspects described herein.

Figure 21:
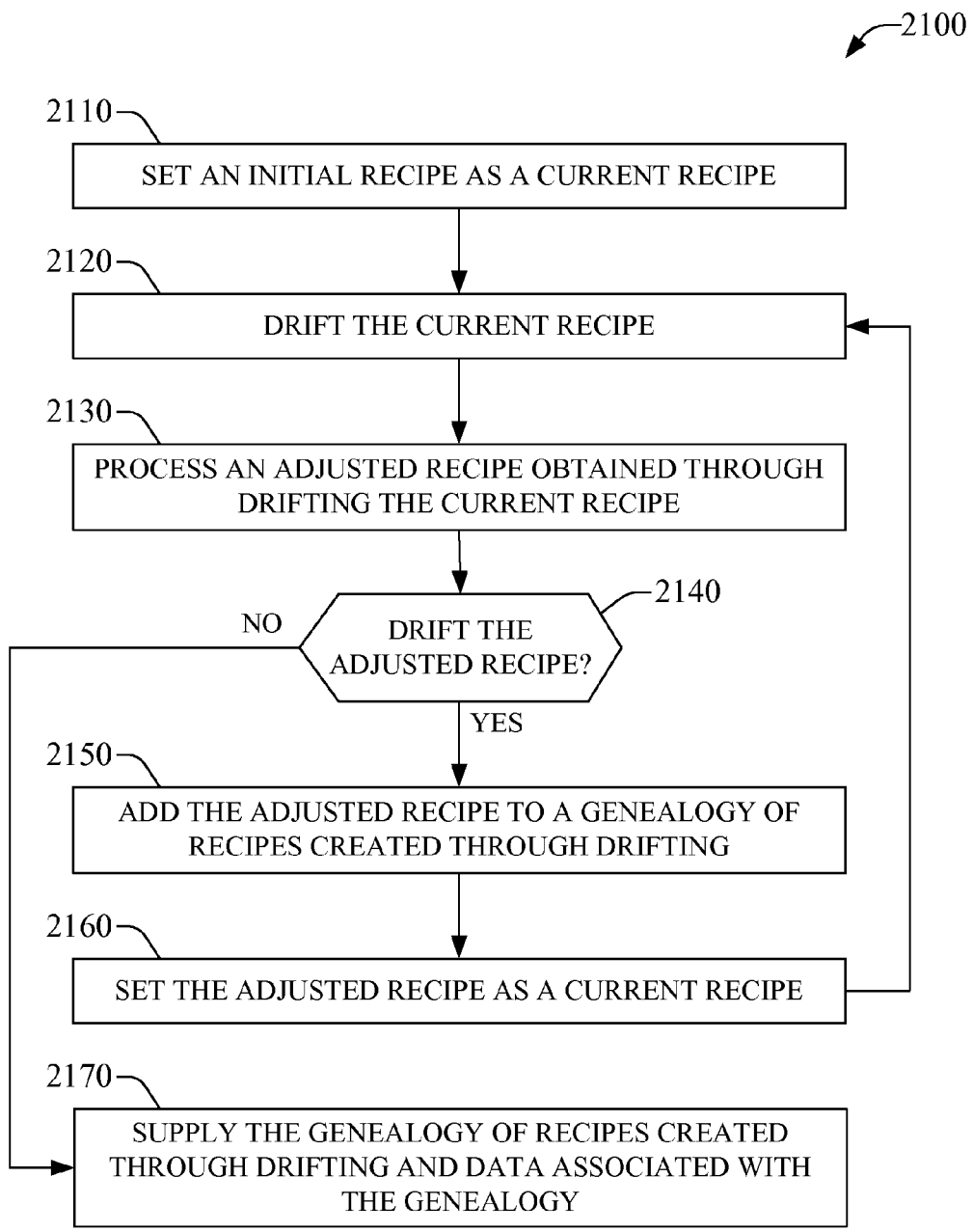

FIG. 21 is a flowchart of an example method for drifting a manufacturing recipe according to aspects described herein.

Figure 22:
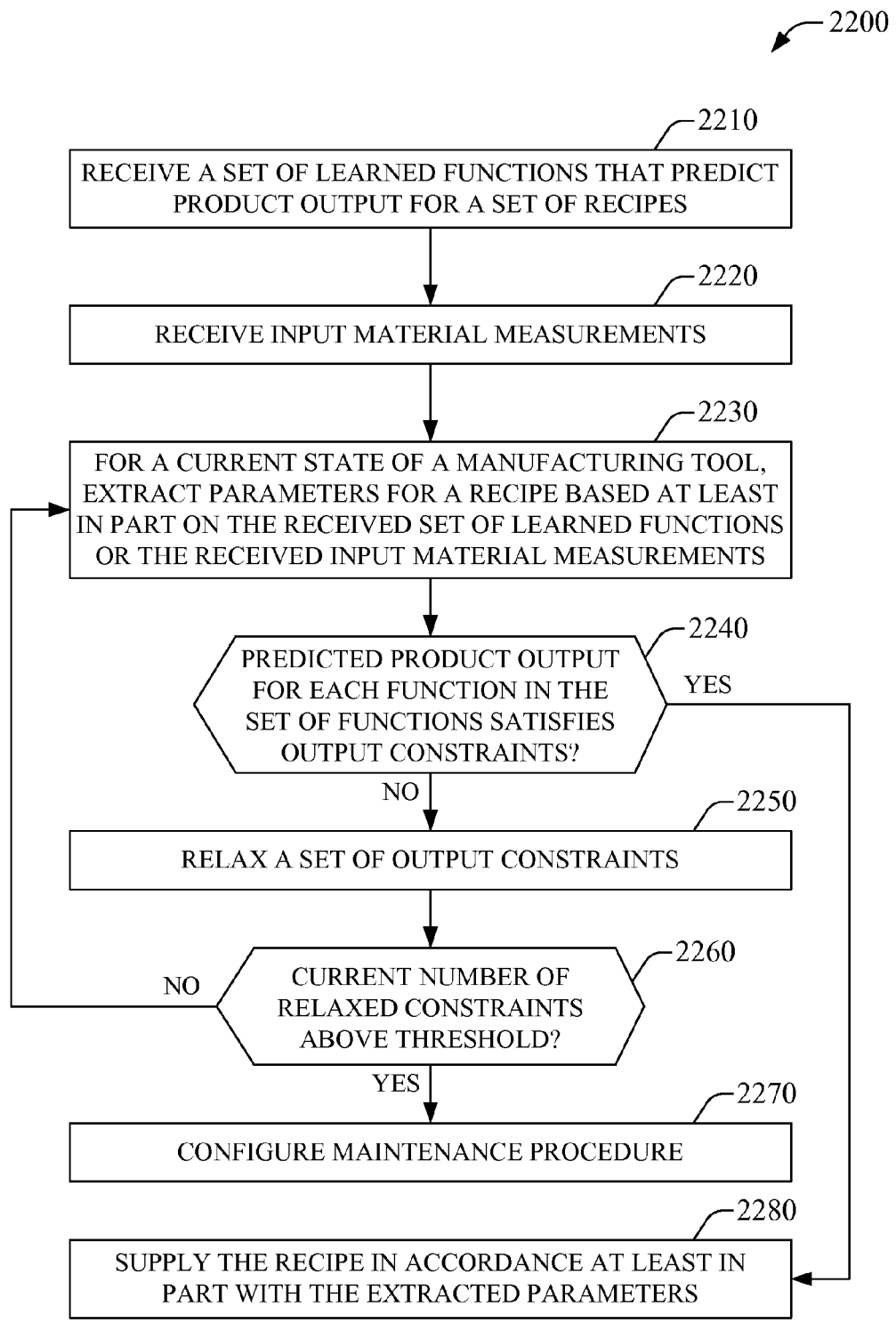

FIG. 22 is a flowchart of an example method for generating an evolved recipe to fabricate a product with target specification(s) for product output according to aspects described herein.

Figure 23:
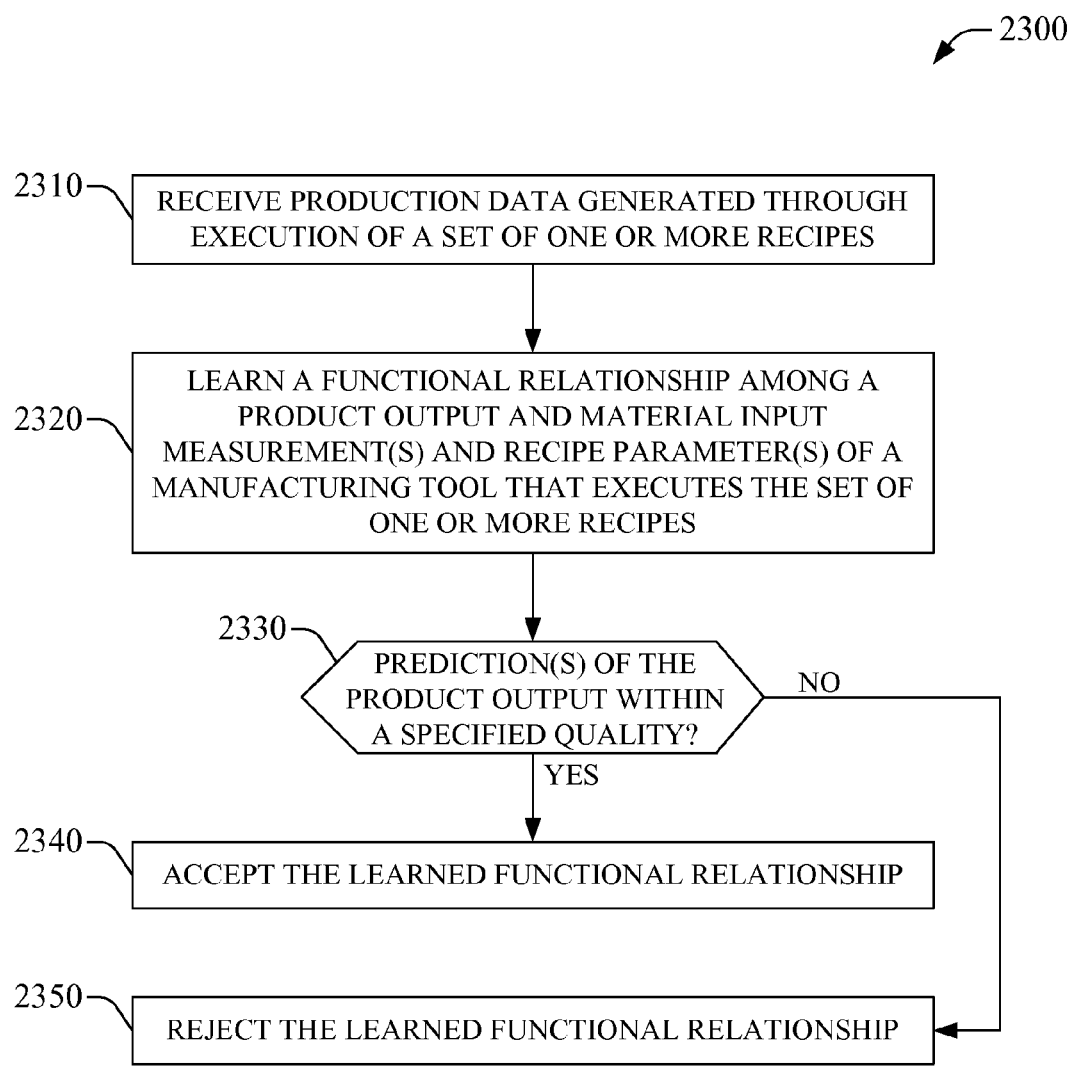

FIG. 23 displays a flowchart of an example method for autonomously generating a predictive functional relationship among input variable(s) and parameter(s) in a manufacturing recipe and product output according to aspects described herein.

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present innovation.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entity(ies) identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the term "set" as employed herein excludes the empty set; e.g., the set with no elements therein. Thus, a "set" in the subject disclosure includes one or more elements or entities. As an illustration, a set of components includes one or more components; a set of variables includes one or more variables; etc.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Figure 1:
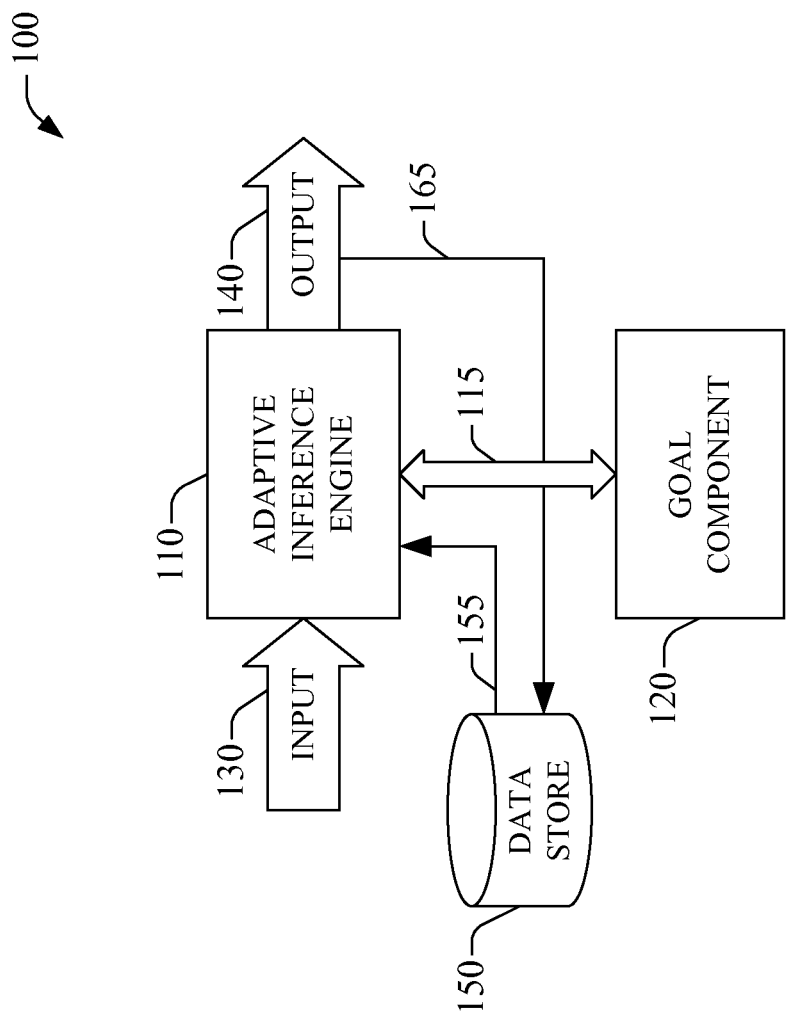
FIG. 1 illustrates a high level block diagram of an autonomous biologically based learning tool in accordance with aspects described herein.

Referring to the drawings, FIG. 1 illustrates an example autonomous biologically based learning system 100 in accordance with aspects described herein. An adaptive inference engine 110 is coupled to a goal component 120. A wired or wireless communication link 115 couples such components. For a specific goal established or pursued by goal component 120, adaptive inference component 110 receives an input 130 that can be employed to accomplish the goal and conveys output 140 that can represent or record aspects of the pursued or accomplished goal. In addition, adaptive inference engine 110 can receive data from a data store 150 through link 155, and can store data or information in such data store, e.g., stored information can be a portion of output 140 that is conveyed through a wired or wireless link 165. It should be appreciated that (i) input 130, output 140, and data in data store 150 (as well as the history of input, output, and data in the data store) comprise a context for the operation of adaptive inference engine 110, and (ii) a feedback of that context into the engine via links 115, 155, and 165 facilitates adaptation based on context. In particular, goal component 120 can exploit feed back context to adapt a specific, initial goal and thus establish and pursue the adapted goal.

Input 130 can be regarded as extrinsic data or information, which can include (1) sounds, e.g., voice commands, environment noises or voices, alarms; (2) images captured by a static or mobile earth-based camera, or an airborne (e.g., plane, satellite) camera, wherein cameras can operate in multiple intervals of the radiation spectrum; (3) biometric indicators; (4) tokens such as batches of manufactured products, samples of materials; data which can include instructions, records, results of measurements; and so on. Output 140 can be substantially the same in nature as input 130, and it can be regarded as intrinsic data. Input and output 140 can be received and conveyed, respectively, by input and output interfaces, e.g., cameras, input pads, media docks (e.g., universal serial bus (USB) ports, infrared (IR) wireless inputs), that can reside in adaptive inference component 110. As indicated above, input 130 and output 140 can be a portion of a context for adaptive inference engine 110. Additionally, adaptive inference component 110 can request input 130 as a result of pursuing a goal.

Components in autonomous biologically based system 100 can be defined recursively, which can confer the autonomous system 100 a substantial degree of competent learning complexity with basic elementary components.

Each link 115, 155, or 165 can include a communication interface that can facilitate manipulation of data or information to be transmitted or received; can utilize databases for data storage and data mining; and can receive and convey information from and to an actor. Wired embodiments of links 115, 155, or 165 can include a twisted-pair line, a T1/E1 phone line, an AC line, an optical fiber line, and corresponding circuitry, whereas wireless embodiments can comprise an ultra-mobile wide band link, a long-term evolution (LTE) link, or an IEEE 802.11 link, and associated electronics. Regarding data store 150, although it is illustrated as a single element, it can be a distributed data warehouse, wherein set of data memories are deployed in disparate physical or logical locations In example system 100, the adaptive inference engine 110 and the goal component 320 are illustrated as separate components, however, it should be appreciated that one of such components can reside within the other.

Goal component 120 can belong to one or more disciplines (e.g., a scientific discipline, a commercial discipline, an artistic discipline, a cultural discipline, and so on) or enterprise sectors (e.g., a market sector, an industry sector, a research sector, energy sector, public policy sector, and so on). Additionally, as goals can typically be multidisciplinary and focus on multiple markets, a goal component can establish multiple disparate goals within one or more particular disciplines or sectors. To pursue a goal, a goal component can comprise a functional component and a monitor component. Specific operations to accomplish a goal are effected through the functional component(s), whereas conditions of variables related to the accomplishment of the goal are determined by the monitor component. Additionally, the functional component(s) can determine a space of goals that can be accomplished by the goal component 120. A space of goals comprises substantially all goals that can be attained with a specific functionality. It should be appreciated that, for such specific functionality afforded by a functional component, a contextual adaptation of a specific goal can adapt a first goal to a second goal within a space of goals. An initial goal within a space of goals can be determined by one or more actors; wherein an actor can be a machine or a device, or a human agent (e.g., an end user). It should be noted that an initial goal can be a generic, high-level objective, as the adaptation inference engine 110 can drive goal component 120 towards a complex detailed objective through goal drifting. Goals, goal components and goal adaptation are illustrated next.

In example system 100, one or more processors (not shown) configured to confer, and that confer, at least in part, the described functionality of the various components can be included. To confer such functionality, the one or more processors (not shown) can exploit links 155, 115, and 165 for data or any other information exchange. The one or more processors (not shown) can execute code instructions (not shown) stored in data storage 150, or a memory component or element therein, to provide the described functionality of example system 100 and component therein.

Figure 2:
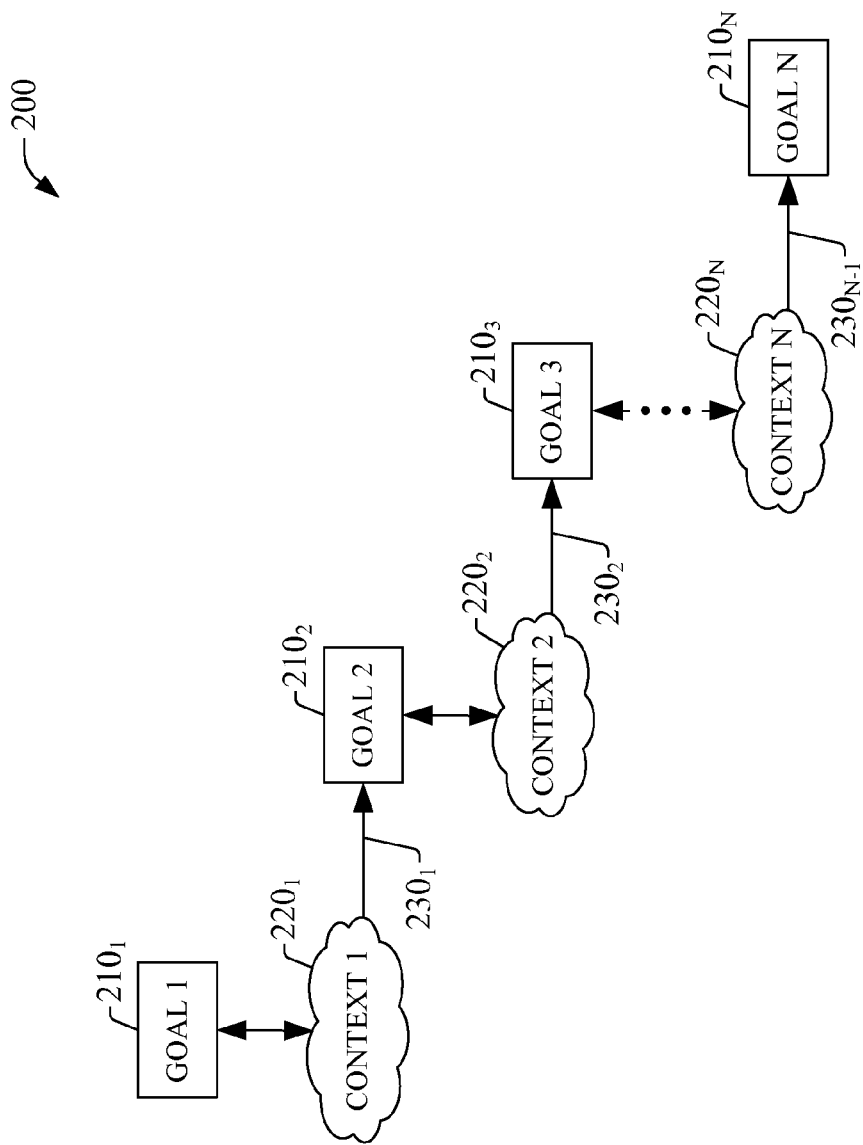
FIG. 2 is a diagram that delineates contextual goal adaptation according to aspects described herein.

FIG. 2 is a diagram 200 that delineates contextual goal adaptation in accordance with aspects herein. A goal (e.g., goal $210_1$, or goal $210_3$) can typically be an abstraction that is associated with the functionality of a goal component (e.g., component 120). A goal can be a high level abstraction: "Save for retirement," "secure a profit," "be entertained," "learn to cook," "to travel to a locale," "develop a database," "manufacture a product," and so on. Additionally, goals can be more specific refinements such as "save to retire early with an annual income in the range of $60,000-$80,000," "travel from the United States to Japan in low season, with travel costs including housing not to exceed $5000," or "reach a job interview site to deliver a 35 minute presentation to a group of associates of the prospective employer." Furthermore, a goal (e.g., $210_1$) possesses an associated context (e.g., $220_1$). As indicated above, goal component 120 coupled to adaptive inference engine 110 generally is compatible with an established goal (e.g., goal $210_1$, or goal $210_3$). For instance, the goal "manufacture a product" (e.g., goal $210_1$) can rely on a manufacturing tool system such as a molecular beam epitaxy reactor (an example goal component 120) that adopts standard or custom specifications to manufacture the product. During the accomplishment of such a goal (e.g., goal $210_1$), output 140 can include the manufactured product. In addition, an adaptive inference component (e.g., component 110) can adapt (e.g., adaptation $230_1$) the "manufacture a product" goal (e.g., goal $210_1$) based on context (e.g., context $220_1$) like the one that can be generated by tool system specifications or data gathered by a monitor component in the goal component. In particular, the initial high-level goal (e.g., goal $210_1$) can be adapted to "manufacture a semiconductor device" (e.g., goal $210_2$). As indicated above, a goal component 120 can be composed of multiple functional components in order to accomplish a goal. Additionally, goal component 120 can be modular, wherein goal sub-component can be incorporated as a goal is adapted. As an example, a goal component that pursues the "manufacture a product" goal can comprise a multi-market evaluation and forecast component that is coupled to a massively parallel, intelligent computing platform which can analyze market conditions in various markets in order to adapt (e.g., $230_1$) the goal to "manufacture a multicore-processor that utilizes molecular electronics components" (e.g., goal $210_N$). It should be noted that such an adaptation can involve a number of intermediate adaptations $230_1$-$230_{N-1}$, as well as intermediate adapted goals $210_2$-$210_{N-1}$ wherein intermediated adaptation is based on intermediate contexts $220_2$-$220_N$ generated from a previously pursued goals.

In another illustration of goal, goal component and goal adaptation, a goal can be to "purchase a DVD of movie A at store B," the goal component 120 can be a vehicle with a navigation system that comprises an adaptive inference engine 110. (It should be noted that in this illustration the adaptive inference engine 110 resides in the goal component 120.) An actor (e.g., a vehicle operator) can enter or select the location of store B and goal component can generate directions to accomplish the goal. In the instance that the adaptive inference engine 110 receives input 130 that store B has ceased to carry in inventory movie A (e.g., an RFID reader has updated an inventory database and an update message has been broadcasted to component 110) while the actor is traveling to the store, adaptive inference engine 110 can (i) request additional input 330 to identify a store C with movie A in stock, (ii) evaluate the resources available to the actor to reach store C, and (iii) assess the level of interest of the actor in accomplishing the goal. Based on the modified context developed through input 130 as illustrated in (i)-(iii), goal component can receive an indication to adapt the goal "to purchase a DVD of movie A at store C."

It should be appreciated that adaptive inference engine 110 can establish sub-goals associated with a goal determined by goal component 120. A sub-goal can facilitate accomplishing the goal by enabling adaptive inference engine to accomplish complementary task or to learn concepts associated with the goal.

As a summary, autonomous biologically based system 100 is a goal-driven system with contextual goal-adaptation. It should be appreciated that goal adaptation based on received context introduces an additional layer of adaptation to the analysis of input information to generate actionable information output 140. The capabilities of (a) adapting the process of information or data analysis and (b) adapting an initial goal based on context render the system massively adaptive or autonomous.

Figure 3:
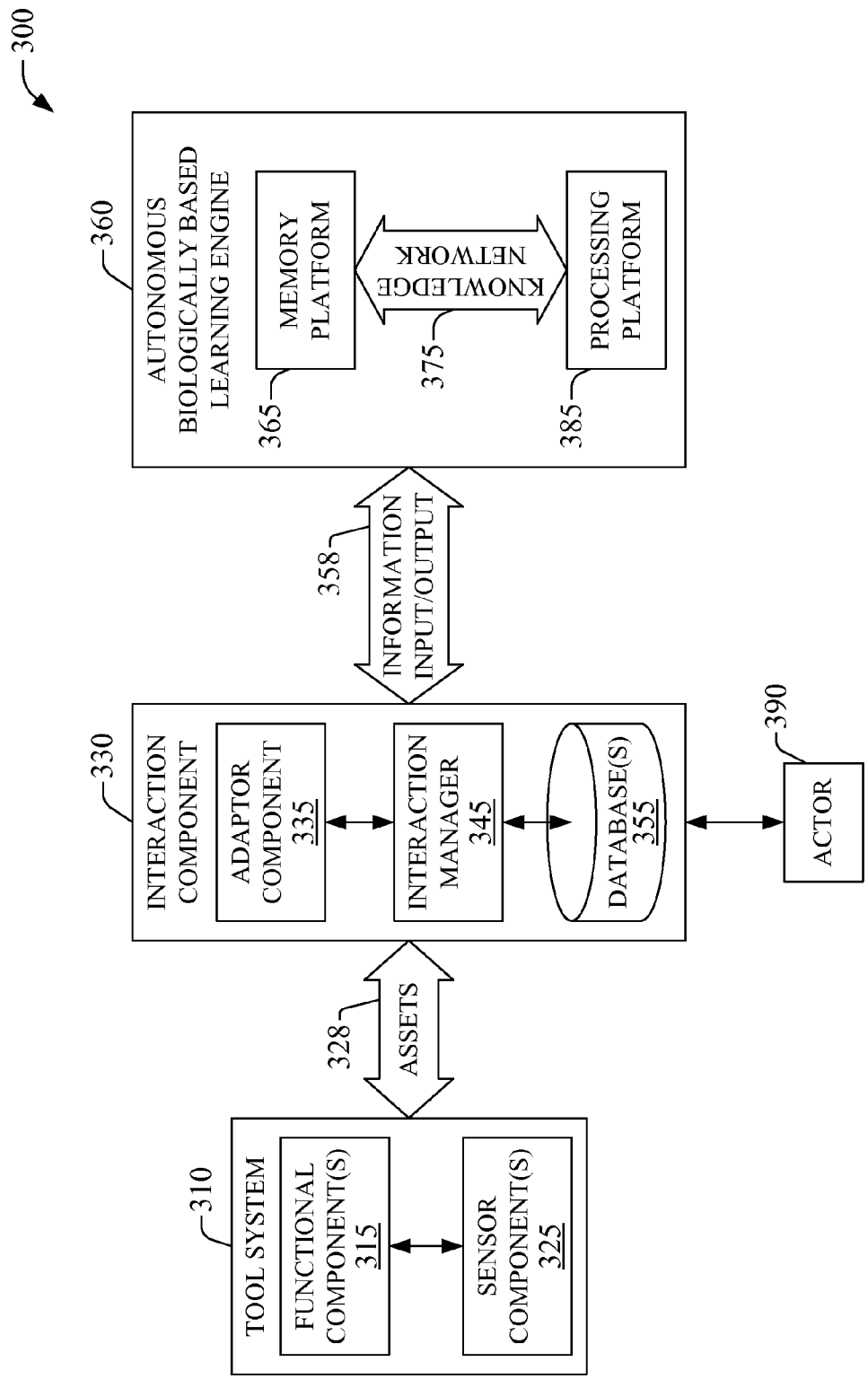
FIG. 3 illustrates a high level block diagram of an example autonomous biologically based learning tool in accordance with an aspect described herein.

FIG. 3 illustrates a high level block diagram of an example autonomous biologically based learning tool 300 in accordance with aspects of the subject disclosure. In embodiment 300, the autonomous learning system includes a tool system 310 (e.g., manufacturing tool or processing tool) that comprises functional component(s) 315 which provides the tool system 310 its specific functionality and can comprise a single functional tool component or a collection of substantially identical or diverse functional tool components, and a sensor component(s) 325 that can probe several observable magnitudes related to a process performed by the tool system 310, like a thermal treatment of a semiconductor wafer, and generates one or more assets 328 associated with the process. Asset(s) in the subject disclosure can include products or devices of varying degrees of complexity; for instance, assets 328 can include semiconductor substrates possessing integrated circuits (ICs), plasma-discharge based flat panel display(s) (FPD(s)), organic light emitting diode (OLED)-based FPD(s), liquid crystal display (LCD)-based FPD(s), or elements thereof such as for example thin-film-transistor active matrix array, color filters, polarizers, etc. The collected one or more assets 328, can include data assets such as production process data or test run data; such data assets can be conveyed to an interaction component 330 which includes an adaptor component 335 that can serve as an interface to receive the one or more assets 328; an interaction manager component 345, also referred to as interaction manager 345, which can process the received one or more assets 328; and database(s) 355 that can store the received and processed data. Data asset(s) that can be part of the one or more assets 328 can be conveyed to interaction component 330 in accordance with various communication protocols such as SECS (Semiconductor Equipment and Materials International Equipment Communication Standards)/GEM (Generic Equipment Model), hypertext transfer protocol (HTTP), etc. Interaction component 330 facilitates interaction of tool system 310 with autonomous biologically based learning engine 360. Information associated with the data generated in the process performed by tool system 310 which can be received and incrementally supplied to autonomous biologically based learning engine 360.

Autonomous biologically based learning engine 360 includes a memory platform 365 that stores received information 358 (e.g., data, variables and associated relationships, causal graphs, templates, and so on) which can be communicated via a knowledge network 375 to a processing platform 385 that can operate on the received information, and can communicate back a processed information through the knowledge network 375 to the memory platform 365. In an aspect, the constituent components of autonomous biologically based learning system 360 can generally resemble biological aspects of the brain, in which a biological memory is networked with biological processing components to manipulate information and generate knowledge. It is noted that such comparison, or analogy, does not intends to cast neither memory platform 365 nor processing platform 385 as biological entities. Additionally, knowledge network 375 can receive information from, and convey information to, interaction component 330, which can communicate the information to tool system 310, or an actor 390 via interaction manager 345. As information 358 is received, stored, processed and conveyed by the autonomous learning system 360, multiple improvements can be effected in tool system 310 and actors that rely on it. Namely, improvements include (a) the autonomous learning system 360 and tool system 310 become increasingly independent as time progresses, and require lesser actor intervention (e.g., human direction and supervision supplied through a device), (b) the autonomous system improves the quality of its outputs to actors (for example, better identification of root causes of failures, or prediction of system failure before occurrence thereof), and (c) the autonomous learning system 360 improves its performance over time—the autonomous system 360 delivers improved results at a faster rate and with fewer resources consumed.

Memory platform 365 comprises a hierarchy of functional memory components, which can be configured to store knowledge (e.g., information 358) received during initialization or configuration of tool system 310 (e.g., a priori knowledge). A priori knowledge can be conveyed as information input 358 through the interaction component 330. In addition, memory platform 365 can store (a) training data (e.g., information input 358) employed to train the autonomous learning system 360 after initialization/configuration of tool system 310, and (b) knowledge generated by the autonomous learning system 360; the knowledge can be conveyed to tool system 310 or actor 390 through interaction component 330, via interaction manager 345.

Information input 358 (e.g., data) supplied by an actor 390, e.g., a human agent, can comprise data identifying a variable associated with a process, a relationship between two or more variables, a causal graph (e.g., a dependency graph), or an episode information. Such information can facilitate to guide the autonomous biologically based system 360 in a learning process. Additionally, in one aspect, such information input 358 can be deemed important by actor 390, and the importance can be related to the relevance of the information to a specific process performed by tool system 310. For instance, an operator (e.g., actor 390 is a human agent) of an oxide etch system can determine that etch rate is critical to the outcome of the manufacturing process; thus, etch rate can be an attribute communicated to autonomous learning system 360. In another aspect, information input 358 supplied by actor 390 can be a hint, whereby an indication to learn a particular relationship among process variables is made. As an example, hint can convey a suggestion to learn the behavior of pressure in a deposition chamber in tool system 310, within a specific deposition step, as a function of chamber volume, exhaust pressure and incoming gas flow. As another example, a hint can indicate to learn a detailed temporal relationship for a chamber pressure. Such example hints can activate one or more functional processing units in the autonomous learning system that can learn the functional dependence of pressure on multiple process variables. Moreover, such hints can activate one or more functional units that can apply and compare a learnt functionality with respect to model or empirical functionalities available to actor 390.

A tool system 310, e.g., a semiconductor manufacturing tool such as a plasma-enhanced vapor deposition (PECVD) system, a sputter system, or a metalorganic chemical vapor deposition (MOCVD) system, can be complex and therefore disparate actors can specialize in manipulating and operating the tool system through disparate types of specific, complete or incomplete knowledge. As an example, a human agent, e.g., a tool engineer can know that different gases have different molecular weight and thus can produce different pressures, whereas a process/tool engineer can know how to convert a pressure reading resulting from a first gas to an equivalent pressure resulting from a second gas; an elementary example of such knowledge can be to convert a pressure reading from a unit (e.g., Pa) to another (e.g., $lb/in^2$, or PSI). An additional type of general, more complex knowledge present in the autonomous biologically based learning system can be functional relationships between properties of a tool system (e.g., volume of a chamber) and measurements performed in the tool system (e.g., measured pressure in the chamber). For example, etch-engineers know that the etch rate is dependent on the temperature in the etch chamber. To allow for the diversity of knowledge and the fact that such knowledge can be incomplete, an actor (e.g., a human agent such as an end-user) can guide an autonomous learning system 360 through multiple degrees of conveyed knowledge: (i) No knowledge specified. Actor delivers no guidance for the autonomous learning system. (ii) Basic knowledge. Actor can convey a valid relationship between properties of a tool system and measurements in the tool system; for instance, actor conveys a relationship (e.g., relationship ($\kappa_E$, T)) between an etch rate ($\kappa_E$) and process temperature (T) without further detail. (iii) Basic knowledge with identified output. Further to a relationship between a tool system property and a tool system measurement, actor can provide specific output for a dependent variable in a relationship (e.g., relationship(output ($\kappa_E$),T). (iv) Partial knowledge about a relationship. Actor knows the structure of a mathematical equation among a tool system property and a measurement, as well as relevant dependent and independent variables (e.g., $\kappa_E = k_1 e^{-k2/T}$ without concrete values for $k_1$ or $k_2$). The actor, however, can fail to know a precise value of one for more associated constants of the relationship. (v) Complete knowledge. Actor possesses a complete mathematical description of a functional relationship. It should be noted that such guidance can be incrementally provided over time, as the autonomous learning system 360 evolves and attempts to learn tool functional relationships autonomously.

Knowledge network 375 is a knowledge bus that communicates information (e.g., data) or transfers power according to an established priority. The priority can be established by a pair of information source and information destination components or platforms; for instance, communication from awareness working memory 710 to awareness knowledge memory 730 can be assigned a higher priority than communication from conceptualization knowledge memory 910 to conceptualization working memory 940. Moreover, communication from source to destination can occur within a global functional component like self-awareness component 550, e.g., intra-communication, or communication enabled by network component 375 can occur between self-awareness component 550 and self-optimization component 570, e.g., intercommunication. Additionally, priority can be based on the information being transmitted (e.g., a specific information must be dispatched in real-time); it should be appreciated that communication priority determines at least in part a degree of communication urgency for transmitted or received communications. It should be noted that priorities can be dynamic instead of static and change as a function of learning development in the autonomous learning system 360, and in view of one or more demands in the one or more components present in the autonomous biologically based learning tool 300—e.g., a problem situation can be recognized and a communication can be warranted and effected in response. Communication, and power transfer, via knowledge network 375 can be effected over a wired link (e.g., a twisted pair link, a T1/E1 phone line, an AC line, an optical fiber line, a coaxial cable) and related protocols such as internet protocol (IP) packet-based communication, or a wireless link (e.g., Ultra Mobile Broadband (UMB), Long Term Evolution (LTE), IEEE 802.11), and can occur among components (not shown) within a functional platform (e.g., memory platform 365 and processing platform 385) or among components in disparate platforms (e.g., a component in memory platform of self-awareness component communicating with another sub-component of self-awareness component) or the communication can be between components (e.g., a component of self-awareness component communicates with a component in self-conceptualization component).

Processing platform 385 comprises functional processing units that operate on information: Input information of a specific type (e.g., specific data types such as a number, a sequence, a time sequence, a function, a class, a causal graph, and so on) is received or retrieved and a computation is performed by a processing unit to generate output information of a specific type. Output information can be conveyed to one or more components in memory platform 365 via knowledge network 375. In an aspect, the functional processing units can read and modify data structures, or data type instance, stored in memory platform 335, and can deposit new data structures therein. In another aspect, functional processing units can provide adjustments to various numeric attributes like suitability, importance, activation/inhibition energy, and communication priority. Each functional processing unit has a dynamic priority, which determines a hierarchy for operating on information; higher priority units operate on data earlier than lower priority units. In case a functional processing unit that has operated on specific information fails to generate new knowledge (e.g., learn), like generating a ranking number or ranking function that distinguishes a bad run from a good run associated with operation of a tool system 310, the priority associated with the functional processing unit can be lowered. Conversely, if new knowledge is generated, the processing unit's priority is increased.

It should be appreciated that processing platform 385, through prioritized functional processing units, emulates a human tendency to attempt a first operation in a specific situation (e.g., a specific data type), if the operation generates new knowledge, the operation is exploited in a subsequent substantially identical situation. Conversely, when the first operation fails to produce new knowledge, a tendency to employ the first operation to handle the situation is reduced and a second operation is utilized (e.g., spread activation). If the second operation fails to generate new knowledge, its priority is reduced, and a third operation is employed. Processing platform 385 continues to employ an operation until new knowledge is generated, and another operation(s) acquire higher priority.

In an aspect, actor 390 can provide process recipe parameters, instructions (e.g., a temperature profile for an annealing cycle of an ion implanted wafer, a shutter open/close sequence in a vapor deposition of a semiconductor, an energy of an ion beam in an ion implantation process, or an electric field magnitude in a sputtering deposition), as well as initialization parameters for the autonomous learning system 360. In another aspect, an actor can supply data associated with maintenance of tool system 310. In yet another aspect, actor 390 can generate and provide results of a computer simulation of the process performed by tool system 310. Results generated in such a simulation can be employed as training data to train the autonomous biologically based learning system. Additionally, a simulation or an end-user can deliver optimization data associated with a process to tool system 370.

Autonomous learning system 360 can be trained through one or more training cycles, each training cycle can be utilized to develop the autonomous biologically based learning tool 300 to (i) be able to perform a larger number of functions without external intervention; (ii) provide better response such as improved accuracy, or correctness, when diagnosing root cause of manufacturing system health root causes; and (iii) increase performance such as faster response time, reduced memory consumption, or improved quality of product. Training data can be supplied to the autonomous learning system via adaptor component 335, in case training data is collected from data 328 associated with a process calibration or standard run in tool system 310—such data can be deemed to be internal—or through interaction manager 345. When training data is retrieved from database(s) 355 (e.g., data related to external measurements conducted through an external probe, or records of repair intervention in tool system 310); such training data can be deemed external. When training data is supplied by an actor, data is conveyed through interaction manager 345 and can be deemed external. In an aspect of the subject innovation, a training cycle based on internal or external training data facilitates autonomous learning system 360 to learn an expected behavior of tool system 310.

As indicated above, functional component 315 can comprise multiple functional tool components (not shown) associated with the tool specific semiconductor manufacturing capabilities and that enable the tool to be used to (a) manufacture semiconductor substrates with various degrees of complexity (e.g., wafers, flat panel displays and related TFT active matrix array, liquid crystal displays (LCDs), OLEDs, and so forth), (b) conduct epitaxial vapor deposition or non-epitaxial vapor deposition, (c) facilitate ion implantation or gas cluster ion infusion, (d) perform a plasma or non-plasma (dry or wet) an oxide etch treatment, (e) implement a lithographic process (e.g., photo-lithography, e-beam lithography, etc.), and so on. The tool system 310 can also be embodied in a furnace; an exposure tool for operation in a controlled electrochemical environment; a planarization device; an electroplating system; a test device for optical, electrical, and thermal properties, which can included lifespan (through operation cycling) measurements; a metrology tool, a wafer cleaning machine, and the like.

In the process conducted by tool system 310, sensors and probes comprising sensor component 325 can collect data (e.g., data assets) on different physical properties (e.g., pressure, temperature, humidity, mass density, deposition rate, layer thickness, surface roughness, crystalline orientation, doping concentration, defect density, electro-photoluminescence yield, etc.) as well as mechanical properties (valve aperture or valve angle, shutter on/off operation, gas flux, substrate angular velocity, substrate orientation, and the like) through various transducers and techniques with varying degrees of complexity depending on the intended use of the gathered data. Such techniques can include, but are not limiting to including, X-ray diffraction, transmission electron microscopy (TEM), scanning electron microscopy (SEM), mass spectrometry, light-exposure assessment, magnetoelectric transport measurements (e.g., Hall measurements), optical properties measurements (e.g., photoluminescence spectra, optical absorption spectra, time-resolved photoluminescence, time-resolved optical absorption), and so on. Additional data assets that are relevant to a product (e.g., a semiconductor substrate) include development inspection (DI) critical dimension (CD), and final inspection (FI) CD. It should be appreciated that probes can be external to tool system 310 and can be accessed through an interface component (not shown). For instance, such external probes can provide DI CD and FI CD. It should be appreciated that such data assets, which are part of the one or more assets 328, effectively characterize output assets, e.g., physical products manufactured or fabricated by tool system 310.

In an aspect, data sources in sensor component(s) 325 can be functionally coupled to adaptor component 335, which can gather or be configured to gather data asset(s) within the one or more assets 328 in analog or digital form. Data asset(s) within the one or more assets 328 can be conveyed to adaptor component 335 in accordance with various communication protocols such as SECS/GEM protocol, HTTP, etc. Adaptor component 335 can enable data, e.g., information input/output (I/O) 358, collected in a process run performed by tool system 310 to be composed or decomposed according to the intended utilization of the data in autonomous biologically based learning system 360 before the data is deposited, or retained, into memory platform 365. Adaptors in adaptor component 335 can be associated with one or more sensors in sensor component(s) 325 and can read (e.g., poll) the one or more sensors at specific frequencies, or in other specific conditions. An external data source adaptor (not shown) may have the ability to pull data as well as pass through data that is pushed from outside the tool system 310. For example, an MES/historical database adaptor can consult (e.g., access and request) an MES database to extract information and package or deposit the extracted data into working memory for one or more components of the autonomous biologically based learning system 360. Particularly, as an illustration, adaptor component 335 can gather wafer-level run data one wafer at a time as the tool system 310 (e.g., manufacturing tool) processes the wafer. Then, adaptor component 335 can consolidate individual runs in a batch to form "lot-level-data," "maintenance-interval-data", etc. Alternatively, if tool system 310 outputs a single file (or computer product asset) for lot-level data, adaptor component 335 can extract wafer-level data, step-level data, and the like. Furthermore, decomposed data elements can relate to one or more components of tool system 310; e.g., variables during times at which a pressure controller in sensor component(s) 325 is operating. Subsequent to processing, or packaging, received data asset(s) included in the one or more assets 328 as described above, adaptor component 335 can store processed data in database(s) 355.

Database(s) 355 can include data originated in (i) tool system 310 (e.g., manufacturing tool), through measurements performed by sensor(s) in sensor component(s) 325; (ii) a manufacturing execution system (MES) database or a historical database; or (iii) data generated in a computer simulation of tool system 310, e.g., a simulation of semiconductor wafer manufacturing performed by actor 390. In an aspect, an MES is a system that can measure and control a manufacturing process, can track equipment availability and status, can control inventory, and can monitor for alarm(s).

It is to be appreciated that products, or product assets, fabricated by tool system 310 can be conveyed or delivered to actor 390 through interaction component 330. Product assets can be part of the one or more assets 338. It should be appreciated that product assets can be analyzed by actor 390 (e.g., quality assurance equipment, or quality assurance equipment and operators thereof) and the resulting information, or data assets, conveyed to autonomous biologically based learning system 360. In one or more scenarios, such data assets can be communicated to autonomous biologically based learning system 360 through interaction component 330, and one or more components therein, or directly through one or more dedicated communication links (not shown) that can transport information I/O 358. In another aspect, interaction component 330 can perform analysis of a product asset 328 via adaptor component 335.

In addition it is to be noted that in example embodiment 300 the interaction component 330 and autonomous learning system 360 are externally deployed with respect to tool system 310. Alternative or additional deployment configurations of autonomous biologically based learning tool 300 can be realized, such as embedded deployment wherein interaction component 330 and autonomous biologically based learning system 310 can reside within tool system 310, in a single specific tool component; e.g., single embedded mode, or in a cluster of tool components; e.g., multiple embedded mode. Such deployment alternatives can be realized in a hierarchical manner, wherein an autonomous learning system supports a set of autonomous learning tools that form a group tool, or a tool conglomerate. It should be readily appreciated that in one or more additional or alternative embodiments, interaction component 330 and autonomous biologically based learning engine 360 can be integrated into a single functional element (component, system, platform, etc.).

Next, an illustrative tool system 310 is discussed in connection with FIG. 4, and an example architecture for the autonomous biologically based learning engine 360 is presented and discussed in detail with respect to FIGS. 5-10.

Figure 4:
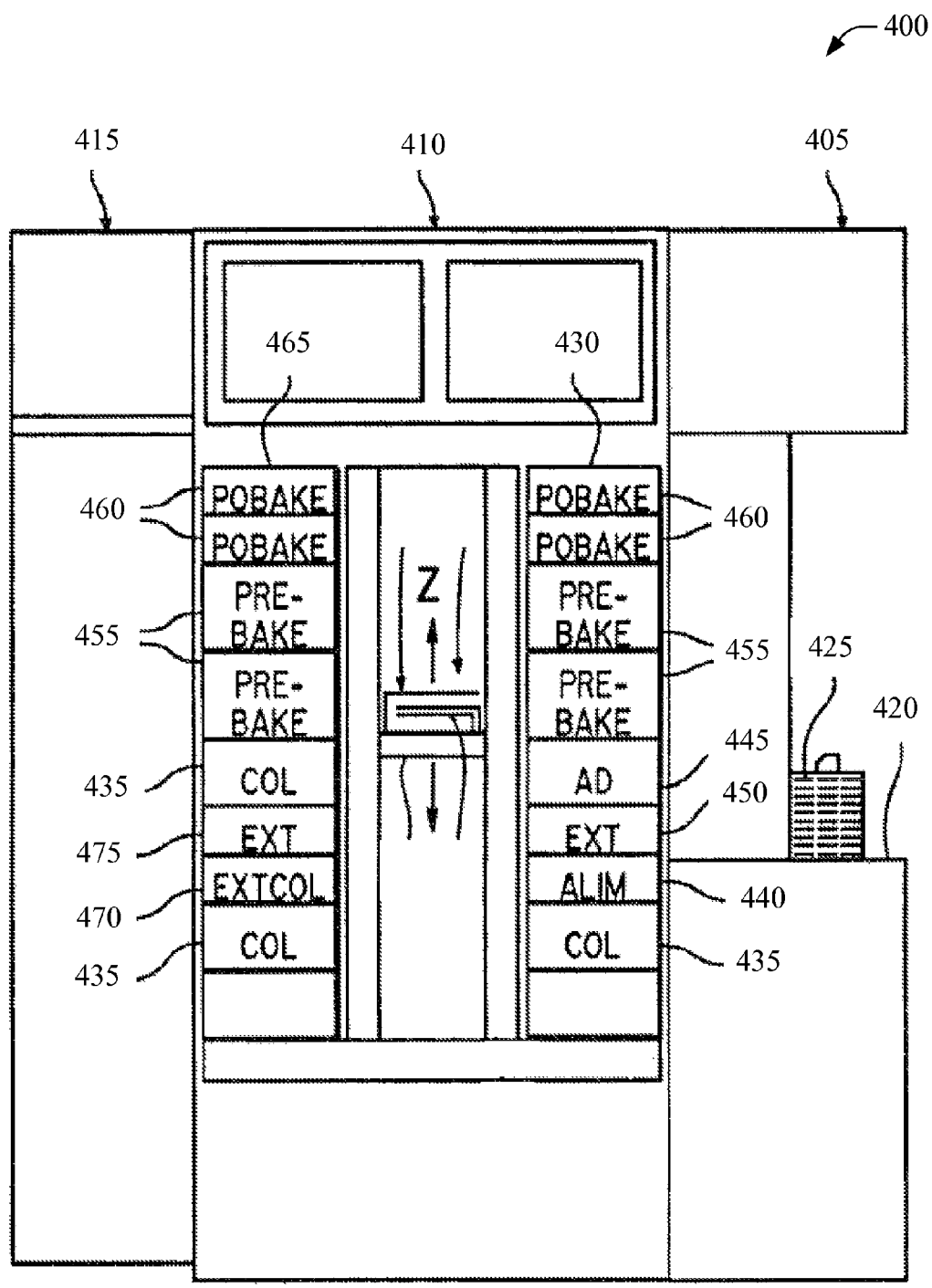
FIG. 4 is a diagram of an example tool system for semiconductor manufacturing that can exploit an autonomous biologically based learning system in accordance with aspects herein.

FIG. 4 is a diagram of an example semiconductor manufacturing system 400 that can exploit an autonomous biologically based learning engine 360 to monitor, analyze, and improve operation in accordance with aspects of the subject disclosure. In particular, example system 400 is a thermal development and coating system that illustrates a tool system 310 discussed above in connection with FIG. 3. The system 400 includes a load/unload section 405, a process section 410, and an interface section 415. In an aspect the load/unload section 405 has a cassette table 420 on which cassettes 425 each storing a plurality of semiconductor substrates are loaded into and unloaded from the system 400. It is noted that cassette table 420 can also enable loading/unloading of glass or plastic substrates for flat panel display manufacturing. The process section 410 has various single substrate processing units for processing substrates sequentially one by one. The interface section 415 can facilitate access to multiple probes and sensors for quality assurance, process development, in situ root cause analysis. Collected data (e.g., data 368) can be conveyed to the autonomous biologically based learning engine 360, through an interface component.

In an aspect, process unit 410 comprises a first process unit group 430 which possesses a cooling unit (COL) 435, an alignment unit (ALIM) 440, an adhesion unit (AD) 445, an extension unit (EXT) 450, two prebaking units (PREBAKE) 455, and two postbaking units (POBAKE) 460, which are stacked sequentially from the bottom. Additionally, a second process unit group 465 includes a cooling unit (COL) 435, an extension-cooling unit (EXTCOL) 470, an extension unit (EXT) 475, a second cooling unit (COL) 435, two prebaking units (PREBAKE) 455 and two postbaking units (POBAKE) 460. Cooling unit (COL) 435 and the extension cooling unit (EXTCOL) 470 may be operated at low processing temperatures and arranged at lower stages, and the prebaking unit (PREBAKE) 455, the postbaking unit (POBAKE) 460 and the adhesion unit (AD) 445 are operated at high temperatures and arranged at the upper stages. With this arrangement, thermal interference between units can be reduced. Alternatively, these units can have alternative or additional arrangements. The prebaking unit (PREBAKE) 455, the postbaking unit (POBAKE) 460, and the adhesion unit (AD) 445 each comprise a heat treatment apparatus in which substrates are heated to temperatures above room temperature. Postbaking units 460 can be utilized for curing photoresist materials employed for photolithographic masking for preparation of devices such as TFTs. In an aspect, temperature and pressure data can be supplied to the autonomous biologically based learning engine 360 through interface component 340, from prebaking unit 455, postbaking unit 460, and adhesion unit 445. Rotational speed and positional data for a substrate can be conveyed from alignment unit 440.

Figure 5:
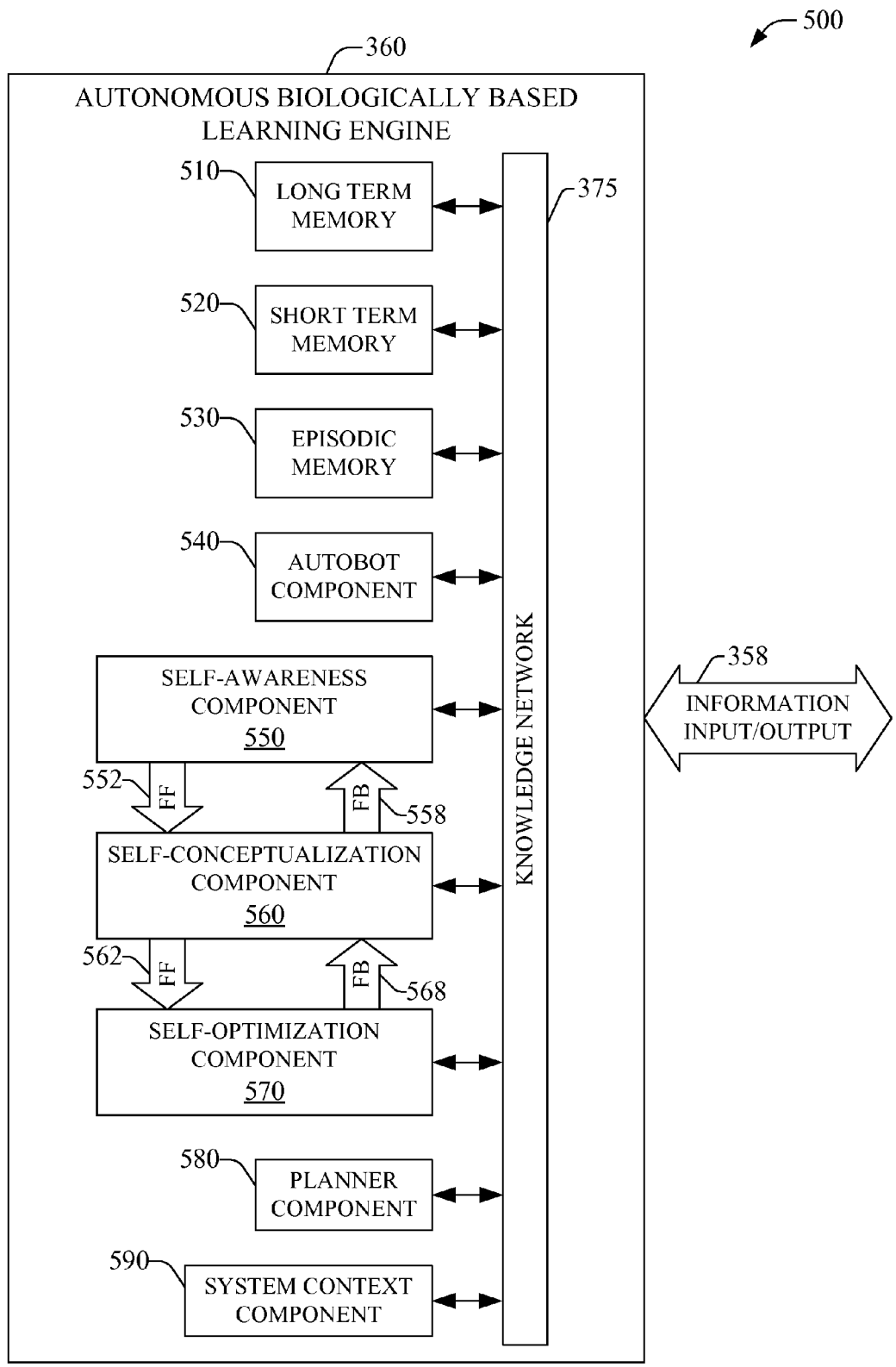
FIG. 5 illustrates a high level block diagram of example architecture of autonomous biologically based learning system in accordance with aspects of the subject disclosure.

FIG. 5 illustrates a high level block diagram of example architecture 500 of an autonomous biologically based learning engine in accordance with aspects of the subject disclosure. In embodiment 500, autonomous biologically based learning engine 360 comprises a hierarchy of functional memory components that include a long term memory (LTM) 510, a short term memory (STM) 520, and an episodic memory (EM) 530. Each of such functional memory components can communicate through knowledge network 375, which operates as described in discussed in connection with FIG. 3. In addition, autonomous biologically based learning engine 360 can include an autobot component 540 that includes functional processing units identified as autobots, which can include a processor, with substantially the same characteristics as those functional units described in connection with processing platform 385. It is to be noted that that autobot component 540 can be a part of processing platform 385.

Furthermore, autonomous learning system 360 can comprise one or more primary functional units which include a self-awareness component 550, a self-conceptualization component 560, and a self-optimizing component 570. A first feed forward (FF) loop 552 can act as a forward link and can communicate data among self-awareness component 550 and self-conceptualization 560. In addition, a first feed back (FB) loop 558 can act as a reverse link and can communicate data among self-conceptualization component 560 and self-awareness component 550. Similarly, forward link and reverse link data communication among self-conceptualization component 560 and self-optimization component 570 can be accomplished, respectively, through a second FF loop 562 and a second FB loop 568. It should be appreciated that in a FF link, data can be transformed prior to communication to the component that receives the data to further process it, whereas in a FB link a next data element can be transformed by the component that receives the data prior to process it. For example, data transferred through FF link 552 can be transformed by self awareness component 550 prior to communication of the data to self-conceptualizing component 560. It should further be appreciated that FF links 552 and 562 can facilitate indirect communication of data among components 550 and component 570, whereas FB links 568 and 558 can facilitate an indirect communication of data among components 570 and 550. Additionally, data can be conveyed directly among components 550, 360, and 370 through knowledge network 375.

Long term memory 510 can store knowledge supplied through interaction component 330 during initialization or configuration of a tool system (e.g., a priori knowledge) to train the autonomous learning tool system 300 after initialization/configuration. In addition, knowledge generated by autonomous learning system 360 can be stored in long term memory 510. It should be appreciated that LTM 510 can be a part of a memory platform 365 and thus can display substantially the same characteristics thereof. Long term memory 510 can generally comprise a knowledge base that contains information about tool system components (e.g., manufacturing components, probe components, and so on), relationships, and procedures. At least a portion of the knowledge base can be a semantic network that describes or classifies data types (for example as a sequence, an average, or a standard deviation), relationships among the data types, and procedures to transform a first set of data types into a second set of data types.

A knowledge base may contain knowledge elements, or concepts. In an aspect, each knowledge element can be associated with two numeric attributes: a suitability ($\xi$) and an inertia ($\iota$) of a knowledge element, or concept; collectively such attributes determine a priority of a concept. A well-defined function, e.g., a weighted sum, a geometric average, of these two numeric attributes can be a concept's situation score ($\sigma$). For example, $\sigma=\xi+\iota$. The suitability of a knowledge element can be defined as a relevance of the knowledge element (e.g., concept) to a tool system or a goal component situation at a specific time. In an aspect, a first element, or concept, with a higher suitability score than a second element can be more relevant to a current state of the autonomous learning system 360 and a current state of a tool system 310 than the second element with a lower suitability score. The inertia of a knowledge element, or concept, can be defined as the difficulty associated with utilization of the knowledge element. For example, a low first value of inertia can be conferred to a number element, a list of numbers can be attributed a second inertia value higher than the first value, a sequence of numbers can have a third value of inertia that is higher than the second value, and a matrix of numbers can have a fourth value of inertia which can be higher than the third value. It is noted that inertia can be applied to other knowledge or information structures like graphs, tables in a database, audio files, video frames, code snippets, code scripts, and so forth; the latter items can substantially all be a portion of input 130. The subject innovation provides for a well defined function of the suitability and the inertia that can influence the likelihood that a knowledge element is retrieved and applied. Concepts that have the highest situational score are the most likely concepts to be rendered to short term memory 520 for processing by processing units.

Short term memory 520 is a temporary storage that can be utilized as a working memory (e.g., a workspace or cache) or as a location where cooperating/competing operations, or autobots, associated with specific algorithms or procedures, can operate on data types. Data contained in STM 520 can possess one or more data structures. Such data structures in STM 520 can change as a result of data transformations effected by autobots and planner überbots (e.g., autobots dedicated to planning) The short term memory 305 can comprise data, learning instructions provided by the interaction manager 345, knowledge from the long term memory 310, data provided and/or generated by one or more autobots or überbots, and/or initialization/configuration commands provided by an actor 390. Short term memory 520 can track a state of one or more autobots and/or überbots used to transform data stored therein.

Episodic memory 530 stores episodes which can include an actor-identified set of parameters and concepts which can be associated with a process. In an aspect, an episode can comprise extrinsic data or input 130, and it can provide with a specific context to autonomous learning system 300. It is noted that an episode can generally be associated with a particular scenario identified or generated (e.g., by tool system 310, a goal component 120, or an autonomous learning system 360) while pursuing a goal. An actor that identifies an episode can be a human agent, like a process engineer, a tool engineer, a field support engineer, and so on, or it can be a machine. It should be appreciated that episodic memory 530 resembles a human episodic memory, wherein knowledge associated with particular scenario(s)—e.g., an episode—can be present and accessible without a recollection of the learning process that resulted in the episode. Introduction, or definition, of an episode typically is a part of a training cycle or substantially any extrinsic provision of input, and it can lead to an attempt by the autonomous biologically based learning system 360 to learn to characterize data patterns, or input patterns, that can be present in data associated with the episode. A characterized pattern of data associated with an episode can be stored in episodic memory 530 in conjunction with the episode and an episode's name. The addition of an episode to episodic memory 530 can result in a creation of an episode-specific autobot that can become active when a set of parameters in a process conducted by a tool system 310, or a generally a goal component 120, enter an operating range as defined in the episode; the episode-specific autobot receives sufficient activation energy when the first feature associated with a pursued goal or process is recognized. If the parameters meet the criteria established through a received episode, the episode-specific autobot compares the pattern of data in the episode with the current data available. If the current situation (as defined by the recognized pattern of data) of the tool system 310, or a goal component, matches the stored episode, an alarm is generated to ensure the tool maintenance engineers can become aware of the situation and can take preventive action(s) to mitigate additional damage to functional component 315 or sensor component 325 or material utilized in a tool process.

Autobot component 540 comprises a library of autobots that perform a specific operation on an input data type (e.g., a matrix, a vector, a sequence, and so on). In an aspect, autobots exist in an autobot semantic net, wherein each autobot can have an associated priority; a priority of an autobot is a function of its activation energy ($E_A$; e.g., 617$_1$) and its inhibition energy ($E_I$; e.g., 619$_1$). Autobot component 540 is an organized repository of autobots that can include autobots for the self-awareness component 550, self-conceptualization component 560, self-optimization component 570, and additional autobots that can participate in transforming and passing data among components and among the various memory units. Specific operations that can be performed by an autobot can include a sequence average; a sequence ordering; a scalar product among a first and a second vector; a multiplication of a first matrix and a second matrix; a time sequence derivative with respect to time; a sequence autocorrelation computation; a cross-correlation operation between a first and a second sequence; a decomposition of a function in a complete set of basis functions; a wavelet decomposition of a time sequence numeric data stream, or a Fourier decomposition of a time sequence. It should be appreciated that additional operations can be performed depending on input data; namely, feature extraction in an image, sound record, or biometric indicator, video frame compression, digitization of environment sounds or voice commands, and so on. Each of the operations performed by an autobot can be a named function that transforms one or more input data types to produce one or more output data types. Each function for which there exists an autobot in autobot component 540 can possess an element in LTM, so that überbots can make autobot activation/inhibition energy decisions based on the total "attention span" and needs of the autonomous learning system 360. Analogously to the autonomous learning system 360, an autobot in autobot component 540 can improve its performance over time. Improvements in an autobot can include better quality of produced results (e.g., outputs), better execution performance (e.g., shorter runtime, capability to perform larger computations, and the like), or enhanced scope of input domain for a particular autobot (e.g., inclusion of additional data types that the autobot can operate on).

Knowledge—concepts and data—stored in LTM 510, STM 520 and EM 530 can be employed by primary functional units, which confer autonomous biologically based learning system 360 a portion of its functionality.

Self-awareness component 550 can determine a level of tool system degradation between a first acceptable operating state of the tool system 310 and a subsequent state, at a later time, in which tool system has degraded. In an aspect, autonomous learning system 360 can receive data that characterizes an acceptable operating state, and data associated with a product asset fabricated in such acceptable state; such data assets can be identified as canonical data. Autonomous biologically based learning system 360 can process the canonical data and the associated results (e.g., statistics about important parameters, observed drift in one or more parameters, predictive functions relating tool parameters, and so on) can be stored by self-awareness component 550 and employed for comparison to data supplied as information input 358; e.g., production process data or test run data. If a difference between generated, learnt results of the canonical data and the device process run-data is small, then the manufacturing system degradation can be considered to be low. Alternatively, if the difference between stored learnt results of the canonical data and the sample process data is large, then there can be a significant level of tool system (e.g., semiconductor manufacturing system) degradation. A significant level of degradation can lead to a process, or goal, contextual adjustment. Degradation as described herein can be computed from a degradation vector ($Q_1, Q_2, \ldots, Q_U$) where each component $Q_\lambda$ ($\lambda=1, 2, \ldots, U$) of the degradation vector is a different perspective of an available data set—e.g., $Q_1$ may be a multivariate mean, $Q_2$ the associated multivariate deviation, $Q_3$ a set of wavelet coefficients for a particular variable in a process step, $Q_4$ may be the mean difference between a predicted pressure and measured pressure, etc. Normal training runs produce a specific set of values (e.g., a training data asset) for each component, which can be compared with component $Q_1$-$Q_U$ generated with run data (e.g., a run data asset) from each component. To assess degradation, a suitable distance metric can be to employed to compare the (e.g., Euclidean) distance of a run degradation vector from its "normal position" in $\{Q\}$ space; the large such Euclidean distance, the more a tool system is said to be degraded. In addition, a second metric can be to compute a cosine similarity metric among the two vectors.

Self-conceptualization component 560 can be configured to build an understanding of important tool system 310 relationships (e.g., one or more tool behavior functions) and descriptions (e.g., statistics regarding requested and measured parameters, influence of parameters on degradation, etc.). It is to be appreciated that relationships and descriptions are also data, or soft, assets. The understanding is established autonomously (e.g., by inference and contextual goal adaptation originated from input data; inference can be accomplished, for example, via multivariate regression or evolutionary programming, such as genetic algorithms) by autonomous learning system 360, or through an actor 390 (e.g., a human agent) supplied guidance. Self-conceptualization component 560 can construct a functional description of a behavior of a single parameter of a tool system 310, or generally a goal component like component 120, such as pressure in a deposition chamber in a semiconductor manufacturing system as a function of time during a specific deposition step. In addition, self-conceptualization component 560 can learn a behavior associated with a tool system, like a functional relationship of a dependent variable on a specific set of input information 358. In an aspect, self-conceptualization component 560 can learn the behavior of pressure in a deposition chamber of a given volume, in the presence of a specific gas flow, a temperature, exhaust valve angle, time, and the like. Moreover, self-conceptualization component 560 can generate system relationships and properties that may be used for prediction purposes. Among learnt behaviors, self-conceptualization component can learn relationships and descriptions that characterize a normal state. Such normal state typically is employed by autonomous learning system 360 as a reference state with respect to which variation in observer tool behavior is compared.

Self-optimization component 570 can analyze a current health or performance of an autonomous biologically based learning system 300 based on the level of a tool system 310 deviation between predicted values (e.g., predictions based on functional dependence or relationships learnt by self-conceptualization component 560 and measured values) in order to identify (a) a potential cause of failure of tool system 360, or (b) one or more sources of root cause of the tool system degradation based on information gathered by autonomous learning system 360. Self-optimizing component 570 can learn over time whether autonomous learning system 360 initially incorrectly identifies an erroneous root cause for a failure, the learning system 300 allows for input of maintenance logs or user guidance to correctly identify an actual root cause. In an aspect, the autonomous learning system 360 updates a basis for its diagnosis utilizing Bayesian inference with learning to improve future diagnosis accuracy. Alternatively, optimization plans can be adapted, and such adapted plans can be stored in an optimization case history for subsequent retrieval, adoption, and execution. Moreover, a set of adaptations to a process conducted by tool system 310, or generally a goal pursued by a goal component 120, can be attained through the optimization plans. Self-optimization component 570 can exploit data feedback (e.g., loop effected through links 565, 555, and 515) in order to develop an adaptation plan that can promote process or goal optimization.

In embodiment 500, autonomous biologically based learning system 360 can further comprise a planner component 580 and a system context component 590. The hierarchy of functional memory components 510, 520, and 530, and the primary functional units 550, 560, and 570 can communicate with planner component 580 and the system context component 590 through knowledge network 375.

Planner component 580 can exploit, and comprise, higher level autobots in autobot component 540. Such autobots can be identified as planner überbots, and can implement adjustments to various numeric attributes like a suitability, an importance, an activation/inhibition energy, and a communication priority. Planner component 580 can implement a rigid, direct global strategy; for instance, by creating a set of planner überbots that can force specific data types, or data structures, to be manipulated in short term memory 520 through specific knowledge available in short term memory 520 and specific autobots. In an aspect, autobots created by planner component 580 can be deposited in autobot component 540, and be utilized over the knowledge network 375. Alternatively, or in addition, planner component 580 can implement an indirect global strategy as a function of a current context of an autonomous learning system 360, a current condition of a tool system 310, a content of short term memory 520 (which can include associated autobots that can operate in the content), and a utilization cost/benefit analysis of various autobots. It should be appreciated that the subject autonomous biologically based learning tool 300 can afford dynamic extension of planner components.

Planner component 580 can act as a regulatory component that can ensure process, or goal, adaptation in an autonomous biologically based tool 300 does not result in degradation thereof. In an aspect, regulatory features can be implemented through a direct global strategy via creation of regulatory überbots that infer operational conditions based on planned process, or goal, adaptation. Such an inference can be effected through a semantic network of data types on which the regulatory überbots act, and the inference can be supported or complemented by cost/benefit analysis. It should be appreciated that planner component 580 can preserve goals drifting within a specific region of a space of goals that can mitigate specific damages to a goal component, e.g., a tool system 310.

System context component 590 can capture the current competency of an autonomous biologically based learning tool 300 that exploits autonomous learning system 360. System context component 590 can include a state identifier that comprises (i) a value associated with an internal degree of competency (e.g., a degree of effectiveness of a tool system 310 in conducting a process (or pursuing a goal), a set of resources employed while conducting the process, a quality assessment of a final product or service (or an outcome of a pursued goal), a time-to-delivery of devices, and so on), and (ii) a label, or identifier, to indicate the state of the autonomous learning tool 300. For instance, the label can indicate states such as "initial state," "training state," "monitoring state," "learning state," or "applying knowledge." The degree of competency can be characterized by a numerical value, or metric, in a determined range. Competency can be a measure of the total age of the autonomous system (e.g., example system 300), or a measure of the relative age, e.g., the age since the start of a current state of context. Thus, a context provided by system context component 590 can serves as a proxy for age or experience. Further, the system context component 590 can include a summary of learning performed by the autonomous learning system 360 over a specific time interval, as well as a summary of possible process or goal adaptations that can be implemented in view of the performed learning.

Figure 6A:
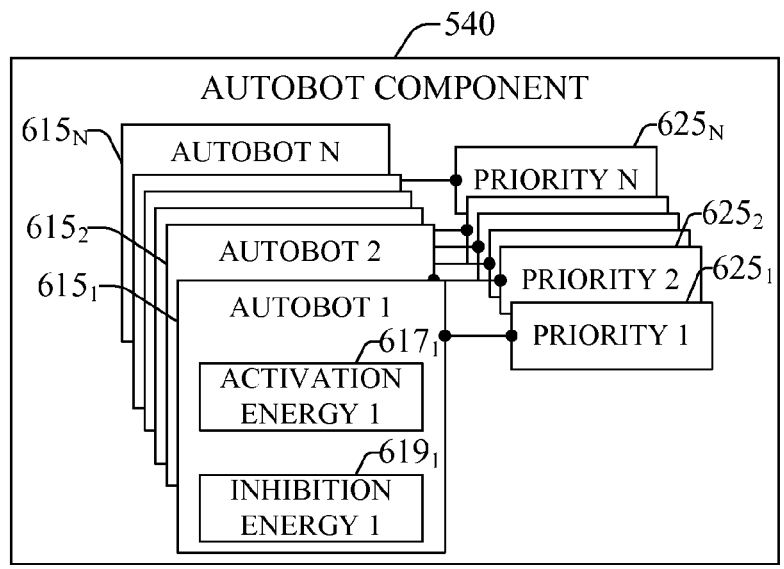
FIGS. 6A and 6B illustrate, respectively an example autobot component and an example autobot architecture in accordance with aspects described herein.

FIG. 6A illustrates an example autobot component 540 in accordance with aspects of the subject innovation. Autobots $615_1$-$615_N$ represent a library of autobots and überbots, each with specific dynamics priority $625_1$-$625_N$, with N a natural number. Autobots $615_1$-$615_N$ can communicate with a memory (e.g., a long term or short term memory, or an episodic memory). As indicated supra, an autobot's priority is determined by the autobot's activation energy and inhibition energy. An autobot (e.g., autobot $615_1$, or $615_N$) gains activation energy (through überbots) when data that can be processed by the autobot is in STM. A weighted sum of an autobot (e.g., autobot $615_2$) activation energy and inhibition energy, e.g., $\Sigma=w_A E_A+w_I E_I$, can determine when the autobot can activate itself to perform its functional task: The autobot self-activate when $\Sigma>\psi$, where $\psi$ is a predetermined, inbuilt threshold. It should be appreciated that the subject autonomous biologically based learning tool 300 can afford dynamic augmentation of autobots.

Figure 6B:
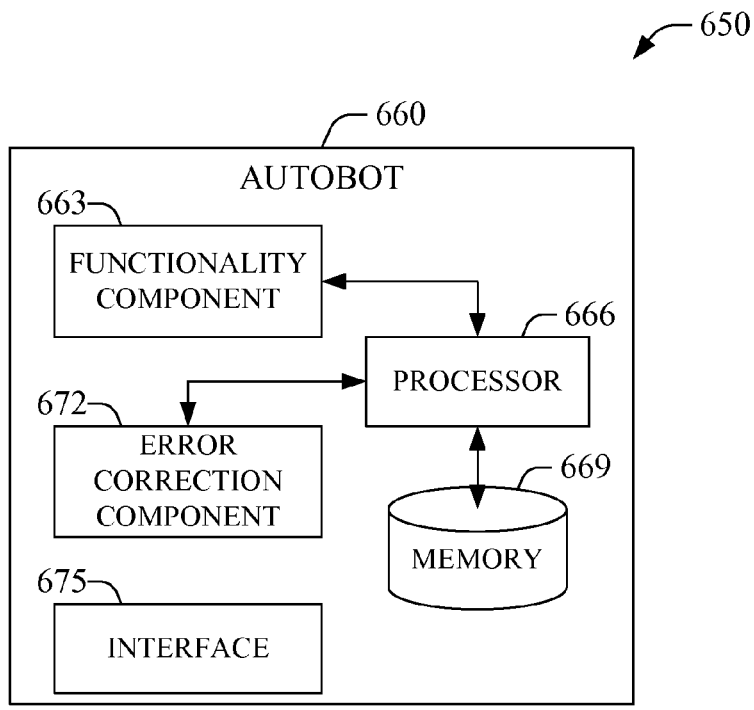

FIG. 6B illustrates an example architecture 650 of an autobot in accordance with aspects of the subject disclosure. The autobot 660 can be substantially any of the autobots included in an autobot component 540. A functionality component 663 determines and executes at least a portion of an operation that autobot 660 can perform on input data. Processor 666 can execute at least a portion of the operation(s) performed by the autobot 660. In an aspect, processor 666 can operate as a co-processor of functionality component 663. Autobot 660 can also comprise an internal memory 669 in which a set of results of previously performed operations are retained. In an aspect, internal memory operates as a cache memory that stores input data associated with an operation, current and former values of $E_A$ and $E_I$, a log of the history of operation of the autobot, and so on. Internal memory 669 can also facilitate autobot 660, e.g., via processor 666, to learn how to improve quality of forthcoming results when a specific type and quantity of error, as established, for example, through error correction component 672, is fed back or back propagated to the autobot 660. Therefore, autobot 660 can be trained through a set of training cycles to manipulate specific input data in a specific manner. Memory 669 also can include code instructions that when executed by processor 666 implement, at least in part, the functionality of autobot 660 described in the subject disclosure.

An autobot (e.g., autobot 660) can also be self-describing in that the autobot can specify (a) one or more types of input data the autobot can manipulate or require, (b) a type of data the autobot can generate, and (c) one or more constraints on input and output information; manipulation and generation can be accomplished at least in part through processor 666. In an aspect, interface 675 can facilitate autobot 660 to self-describe and thus express the autobot's availability and capability to überbots, in order for the überbots to supply activation/inhibition energy to the autobots according to a specific tool scenario. Interface 675 can be functionally coupled to one or more components within autobot 660, including processor 666. In addition, interface 675 also can functionally couple autobot 660 to other component(s) or other functional elements or various memory(ies) in autonomous biologically based learning engine 360, or external to autonomous biologically based learning engine 360.

Figure 7:
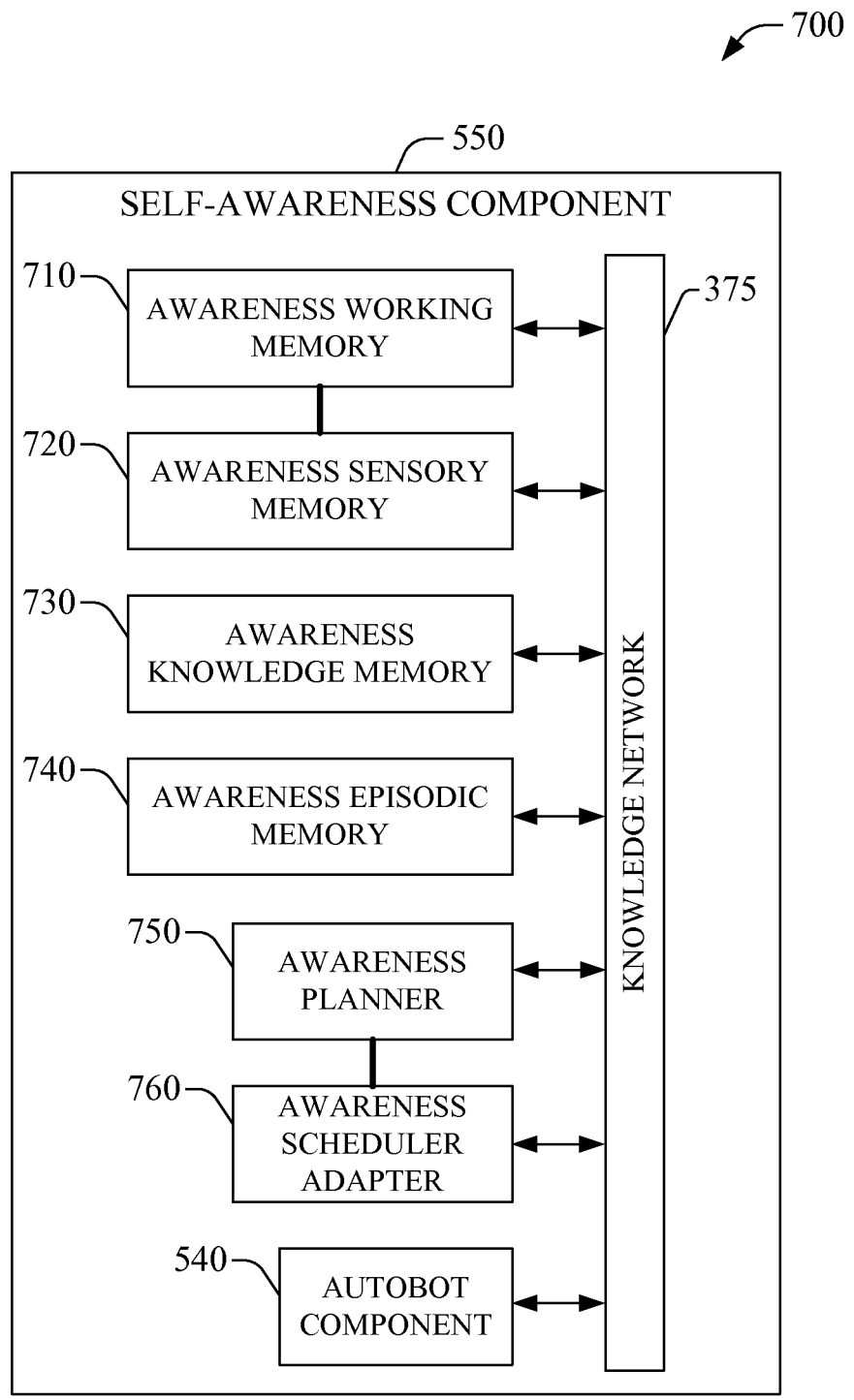
FIG. 7 illustrates an example architecture of a self-awareness component of an autonomous biologically based learning system in accordance with as aspect of the subject disclosure.

FIG. 7 illustrates example architecture 700 of a self-awareness component 550 in an autonomous biologically based learning engine in accordance with aspects described herein. Self-awareness component 550 can determine a current level of degradation with respect to a learned normal state in a tool system (e.g., tool system 310). Degradation can arise from multiple sources such as wear-and-tear of mechanical parts in the tool system; improper operation or developmental operation to develop recipes (e.g., a data asset) or processes that can force tool system to operate outside one or more optimal ranges; improper customization of tool system; or inadequate adherence to maintenance schedules. Self-awareness component 550 can be recursively assembled, or defined, through (i) a hierarchy of memories, e.g., awareness memories (710-740) which can be part of memory platform 365, (ii) functional operational units such as awareness autobots that can reside in an autobot component 540 and be a part of processing platform 385, and (iii) a set of one or more awareness planners 750, also referred to herein as one or more awareness planner components 750. Based on the level of degradation, autonomous learning system 360 can analyze available data assets 328 as well as information 358 to rank the possible faults. In an aspect, in response to an excessive level of degradation, e.g. a tool system fault, an actor (e.g., a field engineer) can perform one or more maintenance activities like cleaning a chamber, replacing a focus ring, etc. In case of a successful repair of tool system, as confirmed, for example, by recovering degradation levels consistent with degradation prior to the system fault, and associated symptoms (e.g., data assets and patterns, relationships, and substantially any other type of understanding extracted from such combination) that preceded the maintenance activities can be retained by autonomous learning system 360. Thus, in forthcoming instances in which learned symptoms are identified through new understanding autonomously gleaned from data assets, and degradation analysis, a stored repair plan can be replayed to reduce costs and improve mean time to repair (MTTR).

Awareness working memory (AWM) 710 is a STM that can include a special region of memory identified as awareness sensory memory (ASM) 720 that can be utilized to store data, e.g., information input 358, that can originate in a sensor in sensor component 325 or in actor 390, can be packaged by one or more adaptors in adaptor component 335, and can be received by knowledge network 375. Self-awareness component 550 can also comprise multiple special functionality autobots, which can reside in autobot component 540 and include awareness planner überbots (APs).

In addition, self-awareness component 550 can comprise an awareness knowledge memory (AKM) 730 which is a part of a LTM and can include multiple concepts—e.g., an attribute; an entity such as a class or a causal graph; a relationship, or a procedure—relevant to the operation of self-awareness component 550. In an aspect, a self-awareness component 550 for a semiconductor manufacturing tool can include domain specific concepts like a step, a run, a batch, a maintenance-interval, a wet-clean-cycle, etc., as well as general purpose concepts like a number, a list, a sequence, a set, a matrix, a link, and so on. Such concepts can enter a higher level of abstraction; for instance, a wafer run can defined as an ordered sequence of steps where a step has both recipe parameter settings (e.g., desired values), and one or more step measurements. Furthermore, AKM 730 can include functional relationships that can link two or more concepts like an average, a standard deviation, a range, a correlation, a principal component analysis (PCA), a multi-scale principal component analysis (MSPCA), a wavelet or substantially any basis function, etc. It should be noted that multiple functional relationships can be applicable, and hence related, to a same concept; for example, a list of numbers is mapped to a real number instance by the average, which is a (functional) relation and a standard-deviation relation, as well as a maximum relation, and so forth). When a relationship from one or more entities to another entity is a function or a functional (e.g., a function of a function), there can be an associated procedure that can executed by an überbot in order to effect the function. A precise definition of a concept can be expressed in a suitable data schema definition language, such as UML, OMGL, etc. It should be further noticed that a content of AKM 730 can be augmented dynamically at (tool system) runtime without shutting the system down.

Each concept in AKM 730, as any concept in a knowledge base as described herein, can be associated with a suitability attribute and an inertia attribute, leading to the concept's specific situation score. Initially, before the autonomous system is provided with data, the suitability value for all elements in AKM 730 is zero, but the inertia for all concepts can be tool dependent and can be assigned by an actor, or based on historical data (e.g., data in database(s) 355). In an aspect, inertia of a procedure that produces an average from a set of numbers can be substantially low (e.g., $\iota=1$) because computation of an average can be regarded as a significantly simple operation that can be applicable to substantially all situations involved collected data sets, or results from computer simulations. Similarly, maximum and minimum value procedures, which transform a set of numbers into a single number, can be conferred a substantially low inertia value. Alternatively, compute a range and compute a standard deviation can be afforded higher inertia values (e.g., $\iota=2$) because such knowledge elements are more difficult to apply, whereas calculate a PCA can display a higher level of inertia and calculate a MSPCA can have a yet higher value of inertia.

A situation score can be employed to determine which concept(s) to communicate among from AKM 730 and AWM 710 (see below). Knowledge elements, or concepts, that exceed a situation score threshold are eligible to be conveyed to AWM 710. Such concepts can be conveyed when there is sufficient available storage in AWM 710 to retain the concept and there are no disparate concepts with a higher situation score that have not been conveyed to AWM 710. A concept's suitability, and thus a concept's situation score, in AWM 710 can decay as time progresses, which can allow new concepts with a higher suitability to enter awareness working memory 710 when one or more concepts already in memory are no longer needed or are no longer applicable. It is noted that the larger the concept's inertia the longer it takes the concept to both be conveyed to and be removed from AWM 710.

When a tool system (e.g., tool system 310) state changes, e.g., a sputter target is replaced, an electron beam gun is added, a deposition process is finished, an in situ probe is initiated, an annealing stage is completed, and so on, awareness planner 550 überbots can document which concepts (e.g., knowledge elements) can be applied in the new state, and can increase a suitability value, and thus a situation score, of each such a concept in AKM 730. Similarly, the activation energy(ies) $617_1$-$617_N$ of autobots $615_1$-$615_N$ can be adjusted by überbots in order to reduce the activation energy of specific autobots, and to increase $E_A$ for autobots that are appropriate to a new situation. The increment in suitability (and situation score) can be spread by planner überbots to those concepts' first neighbors and then to second neighbors, and so forth. It should be appreciated that a neighbor of a first concept in AKM 730 can be a second concept that resides, in a topological sense, within a specific distance from the first concept according to a selected measure, e.g. number of hops, Euclidean distance, etc.) It is noted that the more distant a second concept is from a first concept that received an original increment in suitability, the smaller the second concept's increment in suitability. Thus, suitability (and situation score) increments present a dampened spread as a function of "conceptual distance."

In architecture 500, self-awareness component 550 comprises an awareness schedule adapter (ASA) 760 which can be an extension of awareness planner component 750 and can request and effect changes in collection of extrinsic data or intrinsic data (e.g., via sensor component 325 through interaction component 330, via input 130, or via (feedback) link 155). In an aspect, awareness schedule adapter 760 can introduce data sampling frequency adjustments—e.g., it can regulate a rate at which different adaptors in adaptor component 335 can convey data to knowledge network 375 (e.g., information input 358) intended for ASM 720. Moreover, awareness schedule adapter 760 can sample at low frequency, or substantially eliminate, collection of data associated with process variables that are not involved in the description of normal patterns of data, or variables that fail to advance the accomplishment of a goal as inferred from data received in an adaptive inference engine. Conversely, ASA 760 can sample at higher frequency a set of variables extensively used in a normal pattern of data, or that can actively advance a goal. Furthermore, when the autonomous learning system 360 acknowledges a change of state tool system 310 (or a change in a situation associated with a specific goal) wherein data indicate that product quality or process reliability are gradually deviating from normal data patterns (or a goal drift is resulting in significant departure from an initial goal in the space of goals), the autonomous learning system can request, via ASA 760, a more rapid sampling of data to collect a larger volume of actionable information (e.g., input 130) that can effectively validate the degradation and trigger an appropriate alarm accordingly. In an aspect, a goal component can display a goal drift summary to an actor that entered an initial goal; e.g., a customer in an electronics store that has substantially departed from an initial expenditure goal when procuring a home entertainment system can be displayed a log with changes in a projected expense after budget adaptation; or a database architect can be shown costs associated with memory space and associated infrastructure upon adaptation of a goal to optimize a data warehouse.

An actor 390 (e.g., a human agent or a device employed by the human agent) can train self-awareness component 550 in multiple manners, which can include a definition of one or more episodes (including, for instance, illustrations of successfully adapted goals). A training of the autonomous biologically based learning system 360, through self-awareness component 550, for an episode can occur as follows. The actor 390 creates an episode and provides the episode with a unique name. Data for the newly created episode can then be given to autonomous learning system 360. The data can be data for a specific sensor during a single specific operation step of a tool system, a set of parameters during a single specific step, a single parameter average for a run, etc.

Alternatively, or additionally, more elementary guidance can be provided by actor 390. For example, a field support engineer can perform preventive tool maintenance (PM) on tool system 310. PM can be planned and take place periodically, or it can be unplanned, or asynchronous. It should be appreciated that preventive tool maintenance can be performed on the manufacturing system in response to a request by the autonomous learning system 360, in response to routine preventive maintenance, or in response to unscheduled maintenance. A time interval elapses between consecutive PMs, during such a time interval one or more processes (e.g., wafers/lots manufacturing) can take place in the tool system. Through data and product assets (e.g., data assets, flat panel display devices, wafer . . . ) and associated information, such as effected planner and unplanned maintenance, autonomous learning system can infer a "failure cycle." Thus, the autonomous learning system can exploit asset(s) 328 to infer a mean time between failures (MTBF). Such inference is supported through a model of time-to-failure as a function of critical data and product assets. Furthermore, autonomous learning system 360 can develop models, through relationships among disparate assets received as information input/output (I/O) 358 or through historical data resulting from supervised training sessions delivered by an expert actor. It should be appreciate that an expert actor can be a disparate actor that interacts with a trained disparate autonomous learning system.

Actor 390 (e.g., an end user or a device utilized by an end user) can guide the autonomous system by informing the system that it can average wafer level run data and assess a drift in critical parameters across PM intervals. A more challenging exercise can also be performed by the autonomous system, wherein the actor 390 indicates through a learning instruction to autonomous learning system 360 to learn to characterize a pattern of data at the wafer average level before each unplanned PM. Such an instruction can promote the autonomous learning system 360 to learn a pattern of data prior to an unplanned PM, and if a pattern of data can be identified by an awareness autobot, the self-awareness component 550 can learn such a pattern as time evolves. During learning a pattern, awareness component 550 can request assistance (or services) from self-conceptualization component 560 or awareness autobots that reside in autobot component 540. When a pattern for the tool system is learned with a high degree of confidence (e.g. measured by a degree of reproducibility of the pattern as reflected in coefficients of a PCA decomposition, a size of a dominant cluster in a K-cluster algorithm, or a prediction of the magnitude of a first parameter as a function of a set of disparate parameters and time, and so forth), autonomous biologically based learning system 360 can create a reference episode associated with the malfunction that can lead to the need of tool maintenance so that an alarm can be triggered prior to occurrence of the reference episode. It is noted that awareness autobots, which can reside in autobot component 540, can fail to characterize completely a data pattern for the malfunction reference episode, or substantially any specific situation that can require unplanned maintenance, before it is necessary. It should be appreciated nonetheless that such a preventive health management of a tool system 310, which can include a deep behavioral and predictive functional analysis, can be performed by autobots in self-conceptualization component 560.

Figure 8:
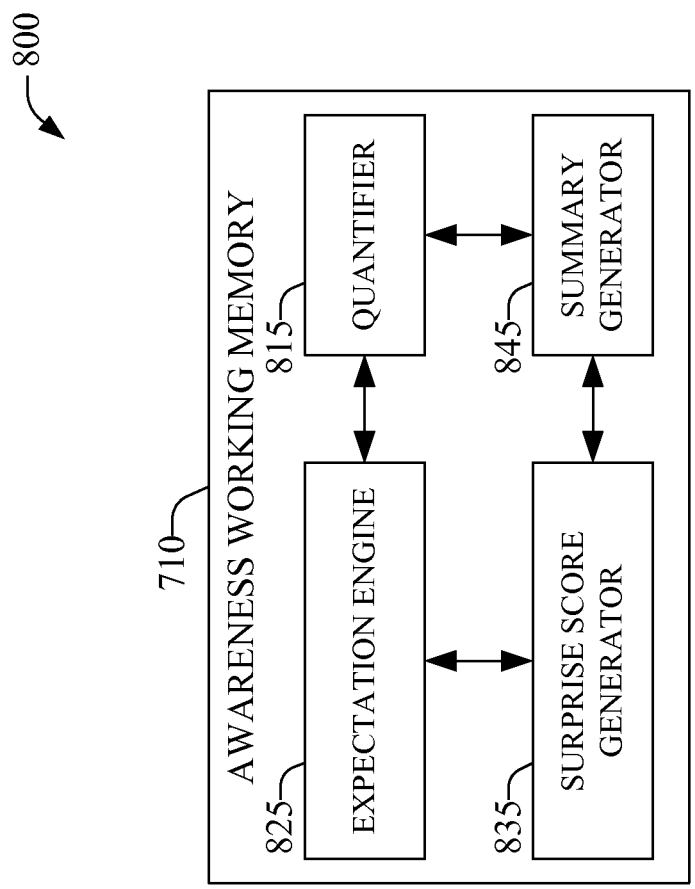
FIG. 8 is a diagram of example autobots that operate in an awareness working memory according to aspects described herein.

FIG. 8 is a diagram 800 of autobots that can operate in an awareness working memory 520 in accordance with aspects described herein. Illustrated autobots—quantifier 815, expectation engine 825, surprise score generator 835, and summary generator 845—can compose an awareness engine; a virtual emergent component, whose emergent nature arises from the concerted operation of elementary constituents, e.g., autobots 815, 825, 835, and 845. It should be appreciated that the awareness engine is an example of how one or more planning überbots can use a collection of coordinated autobots to perform a sophisticated activity. The planning überbots employ the various autobots (e.g., average, standard deviation, PCA, wavelet, derivative, etc.) or the services of self-conceptualization component 560 to characterize a pattern of the data received in an autonomous biologically based learning system. Data for each step, run, lot, etc. run can be labeled by an external entity as being normal or abnormal during training. Quantifier 815 can be employed by planning überbots to exploit normal data to learn a pattern of data for a prototypical, normal process. In addition, quantifier 815 can assess an unlabeled data set (e.g., information input 358) that is deposited into ASM 720 and compare the normal data pattern with a data pattern of unlabeled data. Expected patterns for normal data or equations to predict parameters with normal data can be stored and manipulated through expectation engine 825. It should be noted that the pattern of unlabeled data can differ from the normal data pattern in various ways, according to multiple metrics; for instance, a threshold for a Hotelling T2 statistic (as applied to PCA and MS-PCA and derived from training runs) can be exceeded; an average of a data subset of the unlabeled data set can differ by more than 3σ (or other predetermined deviation interval) from the average computed with normal, training run data; a drift of measured parameters can be substantially different from that observed in the data associated with a normal run; and so forth. Summary generator 845 thus generates a vector of components for normal data, whereas surprise score generator 835 can incorporate, and rank or weight substantially all such differences in components of the vector and compute a net degradation surprise score for the tool system that reflect a health condition of the tool system and reflect how far "away from normal" the tool system is. It should be appreciated that discrepancies among a normal and unlabeled metric can vary as a function of time. Thus, through collection of an increasing amount of normal data, the autonomous learning system 360 can learn various operational limits with greater level of statistical confidence as time evolves and can adjust manufacturing process recipes (e.g., a goal) accordingly Degradation condition, as measured through a surprise score, for example, can be reported to an actor via summary generator 845.

Figure 9:
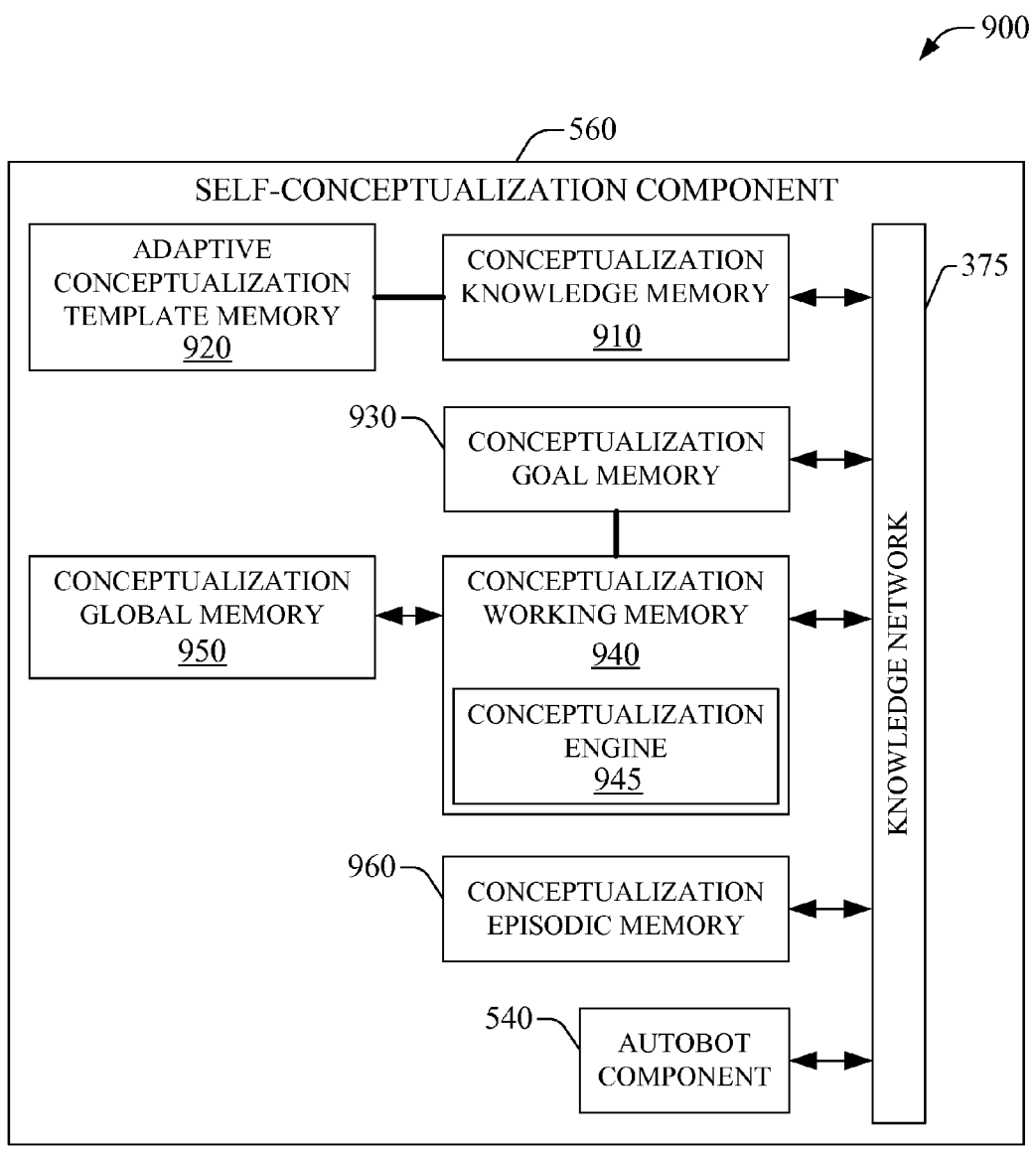
FIG. 9 illustrates an example embodiment of a self-conceptualization component of an autonomous biologically based learning system in accordance with an aspect described herein.

FIG. 9 illustrates and example embodiment 900 of a self-conceptualization component of an autonomous biologically based learning engine in accordance with aspects described herein. A functionality of self-conceptualization component is to build an understanding of important semiconductor manufacturing tool relationships and descriptions. Such an understanding can be employed to adjust a manufacturing process (e.g., a goal). This acquired understanding is built autonomously or in conjunction with end-user (e.g., actor 390) supplied guidance. Similarly to the other primary functional components 550 and 560, self-conceptualization component 570 is assembled or defined recursively in terms of a hierarchy of memories, operational units, or autobots, and planners; such components can communicate a priority-enabled knowledge network.

Embodiment 900 illustrates a conceptualization knowledge memory (CKM) 910 that includes concepts (e.g., attributes, entities, relationships, and procedures) necessary for operation of self-conceptualization component 570. Concepts in CKM 910 include (i) domain specific concepts such as a step, a run, a lot, a maintenance-interval, a wet-clean-cycle, a step-measurements, a wafer-measurements, a lot-measurements, a location-on-wafer, a wafer-region, a wafer-center, a wafer-edge, a first-wafer, a last-wafer, etc.; and (ii) general purpose, domain independent concepts like a number, a constant (e.g., e, π), a variable, a sequence, a time-sequence, a matrix, a time-matrix, a fine-grained-behavior, a coarse-grained-behavior, etc. Self-conceptualization component also includes a vast array of general purpose functional relations such as add, subtract, multiply, divide, square, cube, power, exponential, log, sine, cosine, tangent, erf, and so forth, as well as other domain specific functional relations that can present various levels of detail and reside in adaptive conceptualization template memory (ACTM) 920.

ACTM 920 is an extension of CKM 910 that can hold functional relationships that are either completely or partially known to an actor (e.g., an end user) that interacts with a tool system 310 (e.g., a semiconductor manufacturing tool). It should be noted that while ACTM is a logical extension of CKM, autobots, planners, and other functional components are not affected by such separation, as the actual memory storage can appear a single storage unit within self-conceptualization component 560. Self-conceptualization component 560 can also include a conceptualization goal memory (CGM) 930 which is an extension of a conceptualization working memory (CWM) 940. CGM 930 can facilitate autobots of a current goal, e.g., to learn (f, pressure, time, step); for a particular process step, learn a function $f$ of pressure wherein the function depends on time. It should be noted that learning function $f$ represents a sub-goal that can facilitate accomplishing the goal of manufacturing a semiconductor device utilizing tool system 310.

Concepts in ACTM 920 also have a suitability numeric attribute and an inertia numeric attribute, which can lead to a situation score. A value of inertia can indicate a likelihood of a concept to be learnt. For example, a higher inertia value for a matrix concept and a lower inertia for a time-sequence concept can lead to a situation where self-conceptualization component 560 can learn a functional behavior of time-sequences rather than a functional behavior of data in a matrix. Similarly to self-awareness component 550, concepts with lower inertia are more likely to be conveyed from CKM 910 to CWM 940.

Conceptual planners (CPs) provide activation energy to the various autobots and provide situation energy to various concepts in CKM 910 and ACTM 920, as a function of a current context, a current state of tool system 310 (or generally a goal component 120), a content of CWM 940, or current autobot(s) active in CWM 940. It should be appreciated that activation energy and situation energy alterations can lead to goal adaptation based on the knowledge generated (e.g., based on learning) as a result of the altered semantic network for concepts in CWM 940 or CKM 910—as inference by an adaptive inference engine can be based on propagation aspects of concepts.

Contents of CTM 920 are concepts which can describe the knowledge discussed above, and thus those concepts can have suitability and inertia numeric attributes. The contents of CTM 920 can be used by autobots to learn the functional behavior of the tool system 310 (subject to the constraint that concepts with lower inertia are more likely to be activated over concepts with higher inertia.). It is not necessary for all guidance to have the same inertia; for instance, a first complete function can be provided a lower inertia than a second complete function even though both concepts represent complete functions.

When partial knowledge like a partially-defined equation is uploaded in CWM 940, it can be completed, e.g., with existing knowledge—CPs coordinate autobots to employ available data to first identify values for unknown coefficients. A set of ad hoc coefficients can thus complete the partially-defined equation concept into a complete function concept. The complete equation concept can then be utilized in a pre-built functional-relation concept such as add, multiply, etc. Basic knowledge with output (e.g., relationship(output($\kappa_E$),T)) can facilitate autobots in CWM 940 to construct and evaluate various functional descriptions that involve data for $\kappa_E$ and T in order to identify the best function that can describe a relationship among $\kappa_E$ and T. Alternatively, basic knowledge without output can facilitate autobots, with assistance of CPs, to specify a variable as an output, or independent, variable and attempt to express it as a function of the remaining variables. When a good functional description is not found, an alternative variable can be specified as an independent variable the process is iterated until it converges to an adequate functional relationship or autonomous learning system 360 indicates, for example to actor 390, that an adequate functional relationship is not found. An identified good functional relationship can be submitted to CKM 910 to be utilized by autobots in autonomous biologically based learning engine 360 with a level of inertia that is assigned by the CPs. For instance, the assigned inertia can be a function of the mathematical complexity of the identified relationship—a linear relationship among two variables can be assigned an inertia value that is lower than the assigned inertia to a non-linear relationship that involve multiple variables, parameters, and operators (e.g., a gradient, a Laplacian, a partial derivative, and so on).

Conceptualization engine 945 can be a "virtual component" that can present coordinated activities of awareness autobots and conceptualization autobots. In an aspect, self-awareness component 550 can feed forward (through FF loop 552) a group of variables (e.g., variables in the group can be those that display good pairwise correlation properties) to self-conceptualization component 560. Forwarded information can facilitate self-conceptualization component 560 to check CKM 910 and ACTM 920 for function relation templates. The availability of a template can allow an autobot of a conceptualization learner (CL), which can reside in the conceptualization engine 945, to more quickly learn a functional behavior among variables in a forwarded group. It should be appreciated that learning such a functional behavior can be a sub-goal of a primary goal. A CL autobot with the assistance of a CP autobot can also use autobots of a conceptualization validator (CV). CV autobots can evaluate a quality of proposed functional relationships (e.g., average error between a predicted value and a measurement is within instrument resolution). A CL autobot can independently learn a functional relationship either autonomously or through actor-supplied guidance; such actor supplied guidance can be regarded as extrinsic data. Functions learned by a CL can be fed back (e.g., via FB link 558) to self-awareness component 550 as a group of variables of interest. For example, after learning the function $\kappa_E = \kappa_0 \exp(-U/T)$, wherein $\kappa_0$ (e.g., an asymptotic etch rate) and U (e.g., an activation barrier) possess specific values known to the CL, self-conceptualization component 560 can feed back the guidance group (output($\kappa_E$, T) to self-awareness component 550. Such feed back communication can afford self-awareness component 550 to learn patterns about such group of variables so that degradation with respect to the group of variables can be quickly recognized and, if necessary, an alarm generated (e.g., an alarm summary, an alarm recipient list verified) and triggered. Memory 960 is a conceptualization episodic memory.

The following two aspects related to CL and CV should be noted. First, CL can include autobots that can simplify equations (e.g., through symbolic manipulation), which can facilitate to store a functional relationships as a succinct mathematical expression. As an example, the relationship $P=((2+3)\Phi((1+0) \div \theta)$ is simplified to $P=5\Phi \div \theta$, where P, $\Phi$ and $\theta$ indicate, respectively, a pressure, a flow and an exhaust valve angle. Second, CV can factor in the complexity of the structure of an equation when it determines a quality of the functional relationship—e.g., for parameters with substantially the same characteristics, like average error of predicted values versus measurements, a simpler equation can be preferred instead of a more complicated equation (e.g., simpler equation can have lower concept inertia).

Additionally, important FF 552 communication of information from self-awareness component 550 to self-conceptualization component 560, and FB 558 communication from self-conceptualization component 560 to self-awareness component 550, can involve cooperation of awareness autobots and conceptualization autobots to characterize a pattern of data for an episode. As discussed above in connection with FIG. 5, when self-awareness component 550 fails to learn an episode, self-conceptualization component 560 can assist self-awareness component 550 through provision of a set of relevant functional relationships. For example, characterization of an episode can require a fine-grained description of time dependence of a pressure in a stabilization step in a process run in a tool system 310. Self-conceptualization component 560 can construct such a detailed (e.g., second by second) time dependence of the pressure in the stabilization step. Thus, through FB loop 558, self-awareness component 550 can learn to characterize the pattern of pressure during the stabilization step in a normal tool situation and to compare the learnt pressure time dependence with a pattern of pressure in a specific episode data. As an illustration, presence of a spike in a measured pressure prior to a stabilization step for data in an episode, and the absence of the spike in pressure data during normal tool operation can be detected as a data pattern that identifies the occurrence of the episode in an autonomous biologically based learning tool 300.

Similarly, a prediction of an unscheduled PM can rely on knowledge of temporal fluctuations of critical measurements of tool system data and the availability of a set of predictive functions conveyed by self-conceptualization component 570. The predictive functions can assist a self-awareness component (e.g., component 550) to predict an emerging situation of an unplanned PM in cases where the prediction depends on projected values of a set of variables as a function of time.

Figure 10:
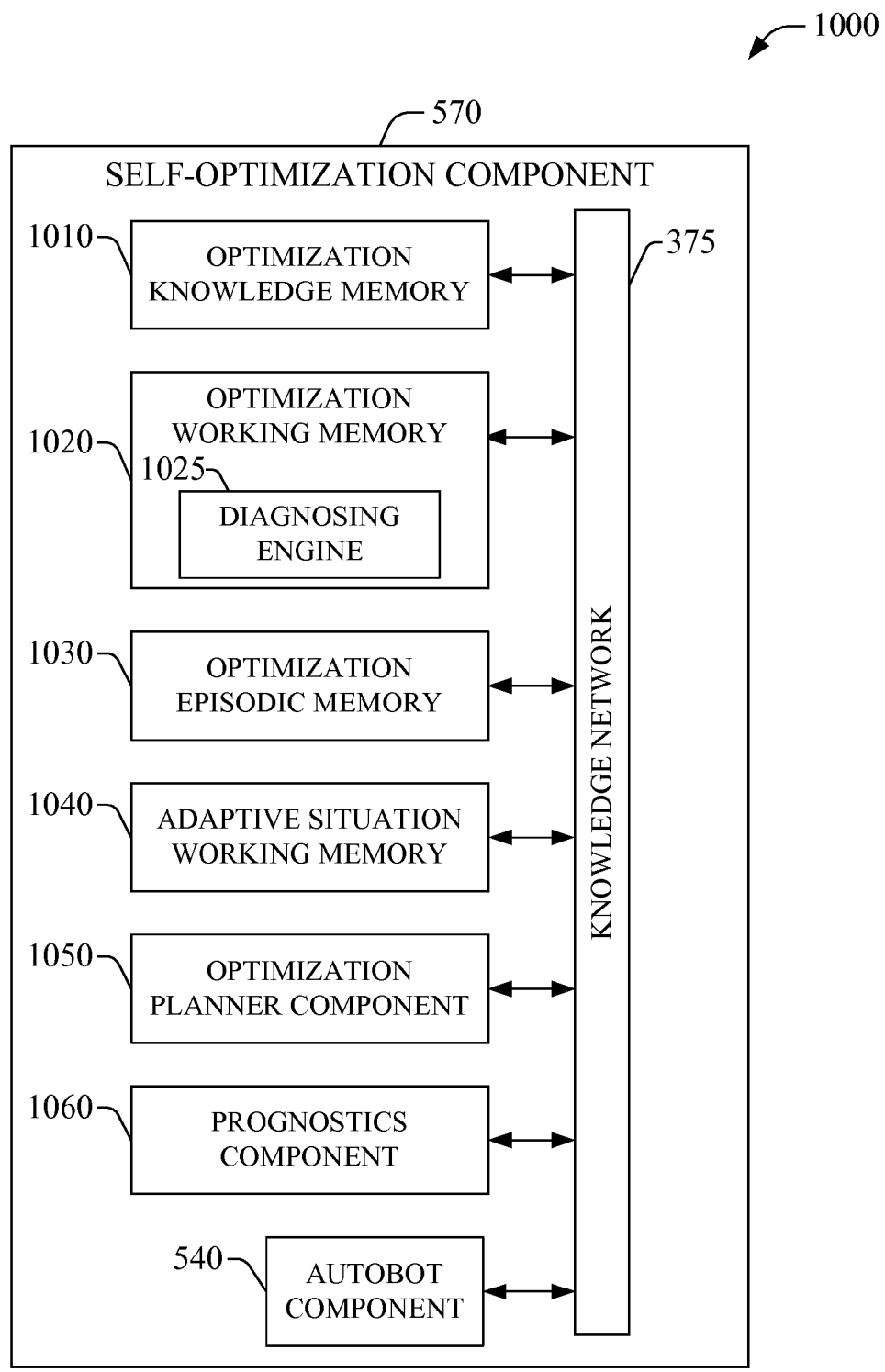
FIG. 10 illustrates and example embodiment of a self-optimization component in an autonomous biologically based learning system in accordance with aspects described herein.

FIG. 10 illustrates and example embodiment 1000 of a self-optimization component in an autonomous biologically based learning engine in accordance with aspects of the subject disclosure. As indicated above, self-optimization component functionality is to analyze the current health (e.g., performance) of a tool system 310 and, based on the results of the current health analysis, diagnose or rank substantially all potential causes for health deterioration of the tool system 310, and identify a root cause based on learning acquired by autonomous learning system 360. Analogously to the other primary functional components 550 and 560, self-optimization component 570 is built recursively from a hierarchy of memories that can belong to a memory platform 365, and autobots and planners which can be a part of a processing platform 385.

Optimization knowledge memory (OKM) 1010 contains concepts (e.g., knowledge) related to diagnosis and optimization of the behavior of tool system 310. It should be appreciated that a behavior can include a goal or a sub-goal. Accordingly, OKM 1010 contains domain, or goal, specific concepts such as step, step-data, run, run-data, lot, lot-data, PM-time-interval, wet-clean-cycle, process-recipe, sensor, controller, etc. The latter concepts are associated with a tool system 310 that manufactures semiconductor devices. In addition, OKM 1010 comprises domain independent concepts, which can include a reading (e.g., readings from a pressure sensor in sensor component 325), a sequence, a comparator, a case, a case-index, a case-parameter, a cause, an influence, a causal-dependency, an evidence, a causal-graph, etc. Furthermore, OKM 1010 can comprise a set of functional relations like compare, propagate, rank, solve, etc. Such functional relations can be exploited by autobots, which can reside in autobot component 540 and can confer OKM 1010 at least a portion of its functionality through execution of procedures. Concepts stored in OKM 1010 possess a suitability numeric attribute and an inertia numeric attribute, and a situation score attribute derived there from. The semantics of suitability, inertia and situation score is substantially the same as that for self-awareness component 550 and self-conceptualization component 560. Therefore, if a run-data is provided with a lower inertia than step-data, self-optimization component 570 planners (e.g., überbots) are more likely to communicate the concept of run-data from OMK 1010 to optimizing working memory (OWM) 1020. In turn, such inertia relationship between run-data and step-data can increase the activation rate of optimization autobots that work with run related concepts.

It should be noted that through FF links 552 and 562, self-awareness component 550 and self-conceptualization component 560 can influence the situation score of concepts stored on OKM 1010, and the activation energy of optimization autobots through optimization planners (OPs), which can reside in optimization planner component 1050. It should be appreciated that concepts which are stored in OKM 1010, and are influenced through self-awareness component 550 and self-conceptualization component 560, can determine aspects of a specific goal to be optimized as a function of a specific context. As an illustration, if self-awareness component 550 recognizes that a pattern of data for a process step has degraded significantly, the situation score of the associated step concept can be increased. Accordingly, OPs can then supply additional activation energy to optimizing autobots related to the step concept in order to modify a set of steps executed during a process (e.g., while pursuing a goal). Similarly, if self-conceptualization component 560 identifies a new functional relationship among tool measurements for a product lot, FF information received from self-conceptualization component 560 (via FF 562, for example) self-optimization component 570 can increase (1) a situation score of a lot concept and (2) an activation energy of an optimization autobot with a functionality that relies on a lot concept; therefore, modifying aspects of the lot concept (e.g., number or type of wafers in a lot, number of TFTs in an active matrix array or a set of arrays, cost of a lot, cost of a set of active matrix arrays, resources utilized in a lot, resources utilized in one or more TFT active matrix arrays, and so on). Adaptive situation working memory 1040 can enable adaptive adjustment of situation scores and retain data for operation of self-optimization component 570. Optimization episodic memory 1030 can retain data impressions and knowledge collected through various optimizations such as self-optimization.

Health assessment of a tool system 310 can be performed through diagnosing engine 1025 as discussed next. It should be noted that a health assessment can be a sub-goal of a manufacturing process. Diagnosing engine 1025 autonomously creates a dependency graph and allows actor 390 to augment the dependency graph. (Such a dependency graph can be regarded as extrinsic data or as intrinsic data.) The causal graph can be conveyed incrementally, according to the dynamics of the process conducted by the tool system 310, and a diagnosis plan that can be devised by the actor 390. For example, a causal graph can show that a "pressure" malfunction is caused by one of four causes: a deposition chamber has a leak, gas flow into the chamber is faulty, exhaust valve angle (which controls the magnitude of gas flow) is faulty, or a pressure sensor is in error. Components of tool system 310 have a priori probabilities of failure (e.g., a chamber leak can occur with probability 0.01, a gas flow can be faulty with probability 0.005, and so on). In addition, actor 390, or self-conceptualization component 560, can define a conditional dependency for pressure malfunction which can be expressed as a conditional probability; e.g., probability of pressure being at fault given that the chamber has a leak can be p(P|leak). Generally, conditional probabilities causally relating sources of tool failure can be provided by actor 390. It should be noted that autonomous learning system 360 assumes that probability assignments defined by actor 390 can be approximate estimates, which in many cases can be significantly different from a physical probability (e.g., actual probability supported by observations). Examples of causal graphs are presented and discussed next in connection with FIGS. 11A and 11B below.

Self-optimization component 570 can also comprise a prognostic component 1060 which can generate a set of prognostics regarding performance of tool system 310 through information I/O 358 associated with the tool 310. Such information can comprise quality of materials employed by functional component, physical properties of product assets 328 produced by tool system 310, such as index of refraction, optical absorption coefficient, electro-photoluminescence yield, Raman spectroscopy cross-sections, defect density(ies), or magnetotransport properties in cases product assets 328 are doped with carriers, etc. Multiple techniques can be utilized by prognostics component 1060. The techniques comprise first characterization techniques substantially the same as those techniques that can be employed by self-awareness component when processing information 358; namely, such as (i) frequency analysis utilizing Fourier transforms, Gabor transforms, wavelet decomposition, non-linear filtering based statistical techniques, spectral correlations; (ii) temporal analysis utilizing time dependent spectral properties (which can be measured by sensor component 325), non-linear signal processing techniques such as Poincaré maps and Lyapunov spectrum techniques; (iii) real- or signal-space vector amplitude and angular fluctuation analysis; (iv) anomaly prediction techniques; and so forth. Information, or data assets generated through analysis (i), (ii), (iii) or (iv), can be supplemented with predictive techniques such as neural-network inference, fuzzy logic, Bayes network propagation, evolutionary algorithms, like genetic algorithm, data fusion techniques, simulated annealing, and so on. The combination of analytic and predictive techniques can be exploited to facilitate optimization of tool system 310 via identification of ailing trends in specific assets, or properties, as probed by sensor component 325, as well as information available in OKM 1010, with suitable corrective measures generated by optimization planner component 1050, and optimization autobots that can reside in component 540.

In one or more embodiments, autonomous biologically based learning engine 360, and component(s) therein, can be implemented in the general context of computer-executable instructions that can run, or be executed, on one or more computers. In alternative or additional embodiments, various of features of example system 300 and autonomous biologically based learning engine 36 also can be implemented in combination with other program modules and/or as a combination of hardware and software. Generally, program modules include routines, programs, components, data structures, etc., that perform particular tasks or implement particular abstract data types. Various computer architectures can be employed to implement the foregoing embodiments.

Figure 11A:
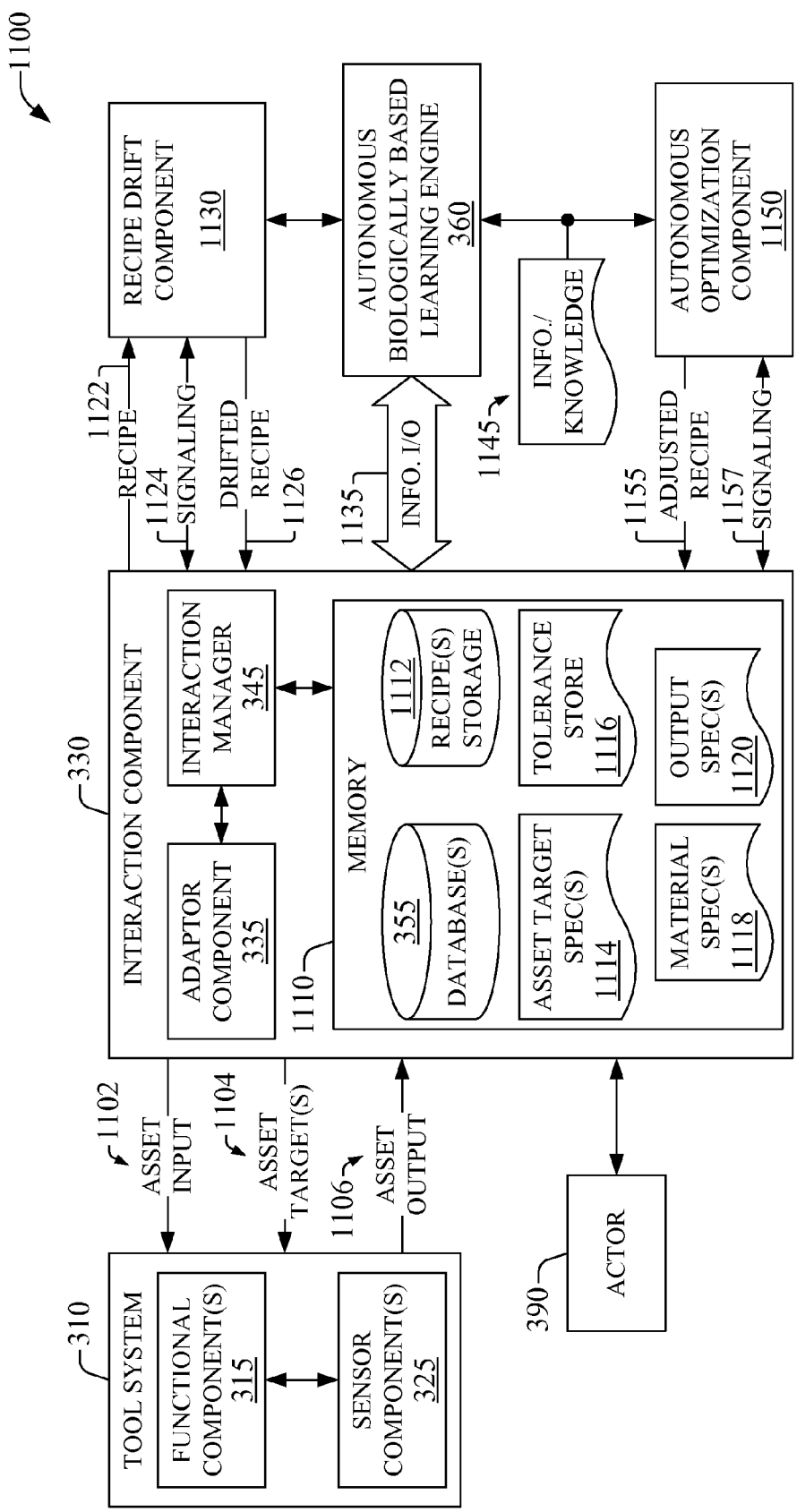
FIGS. 11A and 11B are block diagrams of example evolutionary tool systems in accordance with aspects described herein.

FIG. 11A is a block diagram of an example evolutionary tool system 1100 that autonomously improves performance as time progresses in accordance with aspects described herein. Evolutionary tool system 1100 includes a tool system 310, which can be a semiconductor manufacturing tool, and includes functional component(s) 315 and sensor component(s) 325 as described herein. Tool system 310 operates on input material(s), e.g., wafers, and receives asset input 1102 that can include specifications and tolerances for each input measurement attribute, wherein sensor component(s) 325 conducts measurements such as DI CD, FI CD; feature(s) uniformity, such as etch bias, or line(s) resolution; wafer thickness; electrical properties; optical properties, or the like, on input material(s), or input asset(s). Optical properties can be measured over a spectrum of photon wavelengths or frequencies; optical property (e.g., optical emission or optical absorption) can be measured in continuous-wave (CW) mode or time-resolved mode, in which spectral intensity of absorbed or emitted light is measured for a set of at one or more wavelengths as a function of time. Input specification(s) and tolerance(s) can be configured by an actor 390 (e.g., a device employed by an operator of tool system 310) through interaction component 330, which receives the input specification(s) and tolerance(s) from the actor 390 and retains them, respectively, in material specification(s) 1118 and tolerance store 1116. In one or more embodiments, interaction component 330 can be part of functional component(s) 315, which can provide, at least in part, the functionality of interaction component 330 described herein. In an aspect, the input specification(s) can comprise a set of one or more minimum values or a maximum values for a respective set of one or more specified input measurement attributes. In addition, the tolerance(s) can include equipment resolution for a specified input measurement attribute; the equipment resolution indicates the minimum variation in a value of the specified input measurement attribute, or parameter, that a sensor in sensor component(s) 325 can detect or a piece of equipment in functional component(s) 315 can regulate. As an example, the input specification(s) can establish minimum (min) and maximum (max) values for pressure (P) in an etching chamber that is part of functional component(s) 315 in tool system 310, e.g., $P_{min}$=80 mTorr and $P_{max}$=90 mTorr, while the tolerance(s) can determine a resolution for achievable or measureable pressure changes, e.g., $\sigma P$=1 mTorr. As another example, for an etching gas employed in an etching procedure implemented by tool system 310, the input specification(s) can define a minimum and maximum gas flow ($\Phi$), e.g., $\Phi_{min}$=10.0 and $\Phi_{mac}$=12.0, whereas the tolerance(s) can establish a resolution of 0.1 sccm for achievable or detectable variations in gas flow. As yet another example, in a plasma etching chamber that operates as part of tool system 310, the input specification(s) can define minimum and maximum values of upper RF power (UΠ): $U\Pi_{min}$=1400 W and $U\Pi_{max}$=1600 W, whereas the tolerance(s) can establish a resolution of 1 W for detectable or supported changes in upper RF power.

Tool system 310 also receives, via asset input 1102, one or more recipes to process the input material; a recipe in the one or more recipes can be configured by an actor 390 (e.g., a device employed by an operator of tool system 310) through interaction component 330, which receives the recipe and retains it in recipe(s) storage 1112. The recipe includes a portion of parameters that are included in asset input 1102; parameters in the recipe are controllable and can be utilized to regulate a result of a process, such as an etch process or any other manufacturing process, that is effected by tool system 310. In addition to the one or more recipes, tool system 310 receives asset target(s) 1104 that determines, at least in part, a set of desired or intended output quality or specific features for a product or asset manufactured through tool system 310; product(s) or asset(s) can be part of asset output 1106. In example system 1100 or one or more alternative embodiments thereof, asset output 1106 can be part of the one or more assets 328. Asset target(s) 1104 of a product such as a semiconductor device, or other type of device, can include multiple device output attributes or characteristics such as etch bias, etch bias uniformity, micro-loading, or the like. For instance, a set of one or more etch bias values in respective locations in a manufactured device can be specified. In addition, in an aspect of the subject disclosure, for a specific feature of a product or device attribute (e.g., etch bias), values of asset target(s) 1104 can be different at various positions in the manufactured product or device; e.g., DI CD lines at the edge of a processed wafer may be thicker than in other regions in the wafer and thus require smaller etch-bias target(s) at or near the edge of the processed wafer. Such flexibility in specification of an asset target for a specific feature of a product or device allows to compensate for process variations introduced in processing steps prior to the process that leads to the specific feature of the product or device for which the asset target is defined.

Moreover, through asset input 1102, tool system 310 (e.g., a manufacturing tool) also receives specifications and tolerances for measurements of a manufactured product or asset characteristics. Sensor component(s) 325 conducts the measurements of one or more characteristics of a manufactured product. Tool system 310 delivers, as part of asset output 1106, at least one of data on output characteristics of a manufactured product or data on input measurements. Such data can be a data asset, as described hereinbefore, and retained in database(s) 355. Asset output 1106 comprises product asset(s), which include specific product(s) or device(s) of various complexities, as indicated supra.

To autonomously improve performance of tool system 310 (e.g., manufacturing tool), interaction component 330 conveys a recipe 1122 to recipe drift component 1130 and directs it, via signaling 1124, to effect changes, which can be incremental and random, to one or more parameters that define the recipe, and supply a drifted recipe 1126 to interaction component 330. Recipe drift component 1130 also retains a drifted recipe 1126. In an aspect, recipe 1122 and drifted recipe 1126 can be retained within memory platform 365, e.g., in long term memory 510, in autonomous biologically based learning engine 360. Drift recipe component 1130 can modify a recipe through selection of one or more recipe parameters from a list of parameters selected to drive the recipe drift; the list of parameters can be supplied by interaction component 330. Selection of the one or more recipe parameters can be effected by an actor, e.g., 390, and received by interaction component 330, and retained in the list of parameters or directly conveyed to recipe drift component 1130 for recipe modification. Alternatively or additionally, in the absence of the list of parameters, recipe drift component 1130 can autonomously select the one or more recipe parameters based at least in part on at least one of historical information or arbitrary choice. To effect such autonomous determination, recipe drift component 1130 can exploit, at least in part, autonomous biologically based learning engine 360 and inference capabilities thereof. An incremental change can be a small fraction, e.g., 0.005 relative value, or 0.5%, of the magnitude of a recipe parameter selected to be modified. In addition, a specific magnitude of change can occur according to a probability distribution function, e.g., Gaussian distribution, Poissonian distribution, etc. Recipe drift component 1130 tags, or otherwise identifies, a generated drifted recipe 1126 prior to delivery thereof to interaction component 330. Tagging or identification includes a label, e.g., $R_1$ or other name(s), for the drifted recipe 1126 and magnitude of adjustment(s) effected to one or more recipe parameters.

Interaction component 330, through signaling 1124, can supply recipe drift component 1130 with a set of tolerances (e.g., maximum and minimum values) for each recipe parameter that is to be modified. The set of tolerances can be received from an actor (e.g., actor 390, which can be embodied in a device utilized by an operator of tool system 310) via interaction component 330, and configured at least in part to mitigate catastrophic operation of, or avalanche scenarios in, tool system 310 when a drifted recipe is processed by the tool system 310. In an aspect, recipe component 1130 can cease recipe drifting when a tolerance within the set of tolerances is exceeded. The set of tolerances also can force recipe drift component 1130 to maintain adjustment(s) to recipe parameters within a range specified by the set of tolerances. In addition, interaction component 330 can store drifted recipe $R_1$ in recipe(s) storage 1112, and convey $R_1$ to tool system 330 to process a new input material, or input asset, according to the drifted recipe $R_1$. Tool system 310 (e.g., manufacturing tool, processing tool) implements recipe $R_1$ for a predetermined number of instances, where the number of instances can be configured by an actor, e.g., actor 390, or by autonomous biologically based learning system 360, and can adopt a value $N_R^{(1)}$ (with $N_R^{(1)}$ a natural number) that allows learning relevancy of changes effected to the recipe on one or more product output metrics (e.g., output values of measurements of product features or characteristics) in the presence of noise and variation(s) of tool system 310; the changes can be revealed through measurements performed in a product, or output asset, which is part of asset output 1106. As described above, data extracted from measurements of product output metric(s), or product output characteristics, can be conveyed, e.g., fed back, as part of asset output 1106 to interaction component 330 and retained in database(s) 355. The measurements of product output metric(s) can be delivered to interaction component 330 in continuous or nearly-continuous mode.

When recipe $R_1$ has been employed to process input material, e.g., a wafer, for $N_R^{(2)}$ instances, recipe $R_1$ is conveyed as recipe 1122 to recipe drift component 1130 for adjustment and ensuing generation of a recipe $R_2$. As described above, recipe drift component 1130 modifies a set of recipe parameters, which can be different from a set of parameters modified in a previous iteration of drifting, and generates a drifted recipe $R_2$. Modification can proceed in accordance with a list of specific recipe parameters to be modified, or via random or pseudo-random selection of a recipe parameter in $R_1$. As discussed supra, $R_2$ is retained by recipe drift component 1130 and delivered, as drifted recipe 1126, to interaction component 330. Recipe $R_2$ is employed to process input material(s) for a cycle of $N_R^{(2)}$ instances, prior to interaction component 330 communicating $R_2$ for adjustment, or parameter drift. Measurements of product output metric(s), or product output characteristics, are also conducted and supplied to interaction component 330.

As time progresses, a recipe drift loop implemented by evolutionary tool system 1100 continues. The recipe drift loop includes receiving a recipe $R_{S-1}$, with S a natural number greater than unity; drifting a set of one or more recipe parameters associated therewith, selection of dictated by at least one of record(s) that identify parameters to be modified or autonomous identification; delivering and recording a drifted recipe $R_S$; and processing the adjusted recipe $R_S$ for a production cycle including $N_R^{(S)}$ steps or instances of execution of the adjusted recipe. Drifting of recipes spans a predetermined time interval, which can be configured by an actor, e.g., 390, and can encompass various sub-intervals of drifting interspersed with periods in which drifting is not allowed. It should be appreciated that, in an aspect, interaction manager 345 can enable actor 390 (e.g., a device, mobile or otherwise, utilized by an operator of tool system 310) to switch drifting on and off interactively and asynchronously.

In example evolutionary tool system 1100, interaction component 330 conveys, within information input/output (I/O) 1135 which can be part of information I/O 358, data extracted from tool system 310 (e.g., manufacturing tool)

through measurements of input material and output product metrics implemented in each of the $N_R^{(\lambda)}$, with $\lambda=1, 2, 3 \ldots$, instances a recipe $R_\lambda$ is employed in a production run. For each recipe $R_\lambda$, autonomous biologically based learning engine 360 implements a learning cycle to extract a functional relationship $O_\kappa = f_\kappa(I_1, I_2 \ldots; P_1, P_2 \ldots P_M, \Delta_{RF}, \text{PM, repair} \ldots)$, with $\kappa=1, 2 \ldots G$, among (i) output measurement $O_\kappa$ and (ii) input measurements $\{I_1, I_2 \ldots\}$, recipe parameters $\{P_1, P_2 \ldots P_M\}$, and state of tool system 310, as determined by elapsed active duty $\Delta_{RF}$, preventive maintenance (PM) records, repair records, or the like. Parameter G is a natural number greater or equal than one that indicates the cardinality of a set of collected, e.g., measured variables, which include product output metrics (e.g., device measured attributes); intensity of optical spectral lines, or optical spectrum intensity at a specific wavelength; position-dependent values of device features such as etch bias, critical dimension, wafer thickness; or the like. Data on active duty $\Delta_{RF}$, PM records, repair records, or the like, are state records which include data associated with the state of the tool system 310 (e.g., a manufacturing tool). In the foregoing functional relationship $O_\kappa$, M is a natural number greater than or equal to unity. In an aspect, the learned mathematical relationship $f_\kappa$ that characterizes $O_\kappa$ is an analytic expression or a numerical function; as an example, the learned mathematical relationship f, can be a non-linear equation. However, in another aspect, autonomous biologically based engine 360 can learn a Boolean variable, e.g., $O_{G+1}$, as a function of the set of variables $\{I_1, I_2 \ldots; P_1, P_2 \ldots P_M, \Delta_{RF}, \text{PM, repair} \ldots\}$. It is noted that in the subject disclosure, autonomous biologically based learning engine 360 can generate, through autonomous learning, the functional relationship $O_\kappa$ as a function of a disparate set of variables. In one or more scenarios, the following relationship can be learned: $O_\kappa = f_\kappa(I_1, I_2 \ldots; O_1, O_2 \ldots O_{\kappa-1}, O_{\kappa+1}, \ldots O_G; P_1, P_2 \ldots P_M, \Delta_{RF}, \text{PM, repair} \ldots)$; it should be appreciated, however, that various other combinations of input measurement variables and output measurement variables are also possible as sets of domain variables for extracting the functional relationship $O_\kappa$.

The learning cycle is based at least in part on at least one of (a) received input data and output data such as data included in asset input 1102 or asset output 1106; (b) recipe parameters; or (c) various states of tool system 310, and related data that characterizes such states, associated with the set of one or more recipes $\{R_{\lambda'}\}$ with $\lambda'$ a natural number such that $\lambda' \leq \lambda$—namely, data from all or substantially all recipes is utilized. In an aspect, the data (input data, output data, etc.) can comprise production data; data generated in a maintenance cycle of tool system 310; input and output variables measured, e.g., through sensor component(s) 325; information on instrument(s) that generated the data (e.g., sensor component(s) 325); type of recipe $R_\lambda$ (e.g., wet-clean cycle recipe, a photolithographic etching recipe, plasma etching recipe, deposition of thin film transistors or other chipset integration) to fabricate the product, or asset; production run identifier(s); time stamp(s); operator credential(s) (name, rank or experience level, etc.) and manufacturing or processing plant information; historical data on downtime and continuous operation; or the like.

As described supra, to supply data (input data, output data, etc.) to learn one or more relationships amongst an output measurement variable and a set of disparate domain variables, adaptor component 335 can integrate a plurality of data observed through measurement(s) of one or more input and output variables associated with a product asset, e.g., a manufactured semiconductor device. Such measurement(s) can be performed, at least in part, by one or more sensors in sensor component(s) 325, and can be position-resolved measurement(s), time-resolved measurement(s), spectral measurement(s), or a combination thereof. In addition, adaptor component 335 can normalize the intensity of spectral measurements of scattered, emitted, or absorbed light in one or more processes performed by tool system 310. In one or more embodiments, network adaptor 335 can operate, at least in part, as a network input/output adaptor. Normalization can be performed in accordance with various criteria or approaches; e.g., intensity of a spectral line can be normalized by the total intensity in a measured spectrum that includes the spectral line. Additionally, such normalization is performed to account for systematic error(s) in spectral line intensity determination in disparate tool systems, or part(s) thereof.

In an aspect, learning of $O_\kappa = f_\kappa(I_1, I_2 \ldots; P_1, P_2 \ldots P_M, \Delta_{RF}, \text{PM, repair} \ldots)$ or substantially any or any $O_\kappa$ relationship based on various sets of domain variables is generated objectively, e.g., knowledge generation (effected as described herein) is not externally biased or explicitly controlled for the purpose of learning. It should be appreciated that objective learning conducted with training data is process agnostic; namely, learning proceeds in accordance with concepts generated in one or more semantic networks (e.g., knowledge network 375) through relationships discovered among data available for learning. Learning as described herein can capture or reflect associations from various correlations among recipe variables and specific utilization within process described by a recipe. It should be further appreciated that available data is driven at least in part by specific parameters of recipe $R_\lambda$. In an additional or alternative aspect, learning can be directed in that concept generation or propagation can be effected in accordance with a subset of recipe parameters $\{P_1, P_2 \ldots P_M\}$; for instance, a set of $m \leq M$ can be employed in order to generate $O_\kappa$, such directed learning can enable identification of cause-effect phenomena and relationship(s) among specific subsets of recipe variables associated with subset $\{P_1, P_2 \ldots P_m\}$. The sub-set of parameters can define an m-tuple directional vector in the space of parameters $\{P_1, P_2 \ldots P_M\}$; the direction of the vector can establish a direction of drift. In addition, the sub-set of parameters can be selected in accordance with intrinsic domains: parameters that control power in a recipe or process can be selected; parameters that control sources of chemicals, e.g., shutter opening period in a source chamber in a chemical vapor deposition process; parameters that regulate temperature in various stages of a recipe, e.g., hard bake temperature, soft bake temperature, dehydration bake . . . ; parameters that dictate pressure in one or more chambers in which a process or recipe is performed within tool system 310. The subset $\{P_1, P_2 \ldots P_m\}$ also can be determined based on extrinsic domain, or domain that affects production extrinsic variables such as cost(s) (e.g., utilized materials and quantity thereof, packaging of processed assets such as packaging of deposited thin-film transistors, tolerated defect density in processed device(s)), or process speed (e.g., deposition times, annealing or bake temperatures, lithographic development temperatures, or the like). Moreover, directed subset $\{P_1, P_2 \ldots P_m\}$ can be selected based on external process constraints, such as features of tool system 310 (e.g., manufacturing tool), available materials to produce an asset, pre-determined yield of specific product(s), specific delivery schedule(s) of product(s), or the like.

Figure 11B:
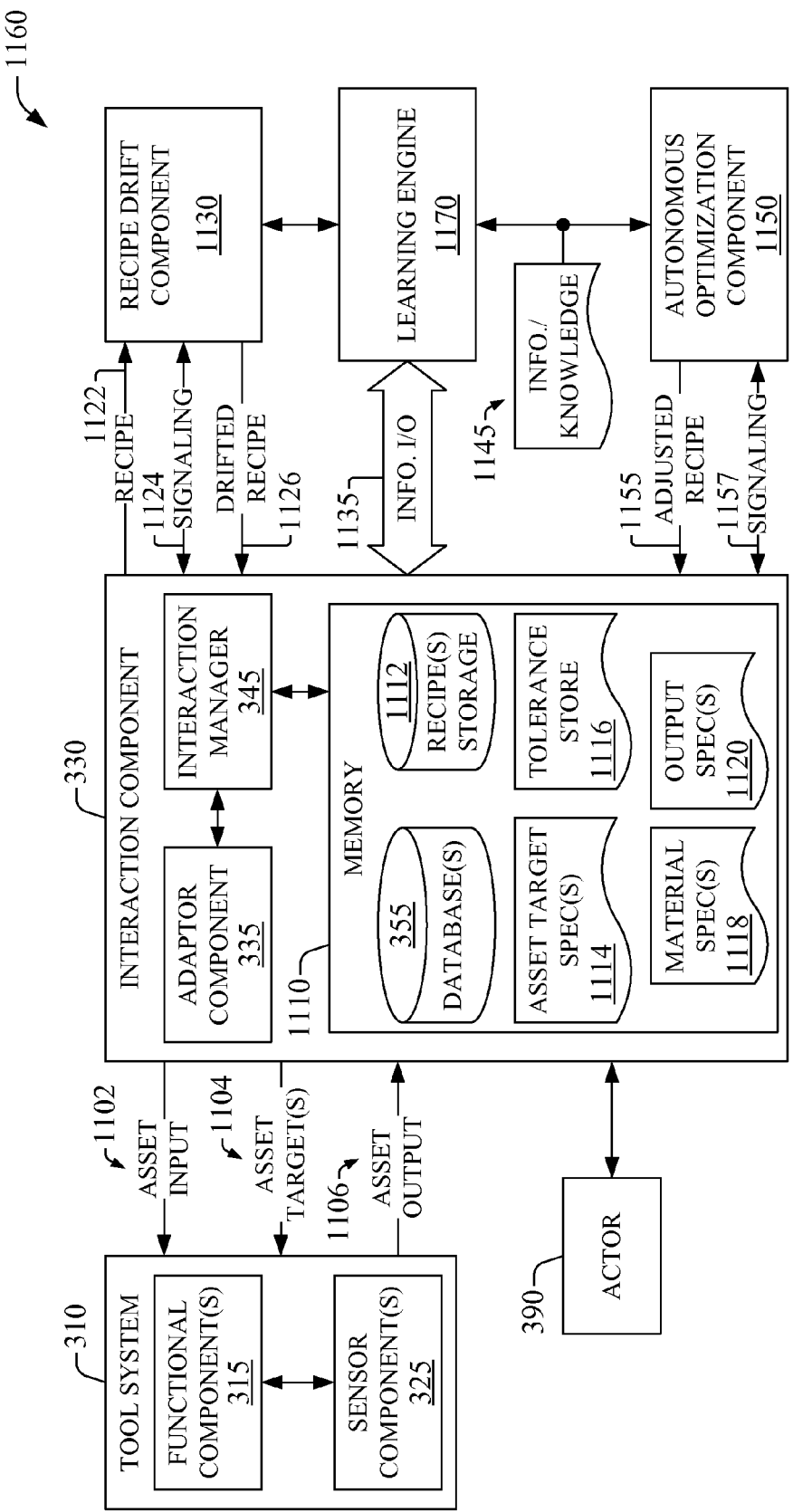

In one or more alternative or additional embodiments, e.g., example system 1160 in FIG. 11B, learning of a relationship $O_\kappa$ as a function of various sets of domain variables can be implemented by a substantially any learning engine 1170 that does not rely in the functionality of autonomous biologically based learning engine 360 as described herein. Learning engine 1170, or one or more components therein (not shown), can implement learning of the relationship $O_\kappa$ through at least one of linear and multi-linear approximation, polynomial curve fitting, neural networks, genetic programming, Tabu search, game theoretic models, or the like. In an aspect, learning engine 1170 can include one or more processors (not shown) and a memory (not shown), wherein the one or more processors execute one or more sets of code instructions retained in the memory to implement learning of a relationship $O_\kappa$. The one or more sets of code instructions stored in the memory can embody one or more components (not shown) that, when executed by the one or more processors, implement the functionality of learning engine 1170. In another aspect, at least one of the one or more components (not shown) can include a processing unit (e.g., a processor) that provides the functionality of the at least one component and part of the functionality of the learning engine 1170.

It should be appreciated that one or more learned functions $O_\kappa = f_\kappa(I_1, I_2 \ldots; P_1, P_2 \ldots P_m, \Delta_{RF}, PM, \text{repair} \ldots)$ or substantially any or any $O_\kappa$ relationship based on various sets of domain variables can be transferred or exported to another replicate copy of tool system 310 (e.g., an equally designed and, nominally, equally deployed tool system) as a model of operation of the replicum. Moreover, the any or substantially any learned function, either analytic expression or Boolean expression, can be delivered to at least one of a centralized repository or a set of distributed repositories that can be accessed by the replicated copy of tool system 310 or any tool system, or component(s) therein or functionally coupled thereto. Such on-the-cloud storage aspect of learned functions has at least the advantage that disparate tool system(s) and operators thereof can readily access a learned operational aspects of the disparate tool system(s) regardless geographical location, schedule(s) of operation, or other operational constraints. In one or more embodiments, interaction manager 345 can request autonomous biologically based learning engine 360 or learning engine 1170 a group of one or more learned functions $O_k$. The request can be delivered as part of information I/O 1135 in accordance with various protocols (HTTP, file transfer protocol (FTP), secure FTP (SFTP), etc.). In response to the request, the autonomous biologically based learning engine 360 or learning engine 1170 can supply a set of learned functions, which can be received by interaction manager 345 and stored in database(s) 355 within memory 1110. Interaction manager 345 can deliver the set of learned functions to one or more disparate tool system(s), and related interaction component(s). In an aspect, in the replicate copy of tool system 310, an interaction component, or one or more components therein such as an interaction manager component, can receive the one or more learned functions $O_\kappa$, which can depend on various combinations of domain variables, e.g., recipe parameters, input measurement variables or output measurement variables. Learned functions $O_\kappa$ also can be exported, or delivered, to a tool system that is not a replicate copy of tool system 310 but is equivalent or substantially equivalent to thereto and produces same or similar product(s) or device(s).

In addition, in an aspect of the subject disclosure for a replicated copy of tool system 310 or equivalent or substantially equivalent deployment thereof, the one or more learned functions $O_\kappa = f_\kappa(I_1, I_2, \ldots; P_1, P_2, \ldots P_m, \Delta_{RF}, PM, \text{repair} \ldots)$ or substantially any or any $O_\kappa$ relationship based on various sets of domain variables can be employed for learning functions of output measurement variables $O_\kappa$, or other variables, in the replicated copy of tool system 310 or the equivalent or substantially equivalent deployment thereof. A learning engine in the tool system, replicated or otherwise, that received the exported one or more learned functions can exploit such functions for learning. In an aspect, the one or more learned functions $O_\kappa$ that are exported can be employed as a basis set for learning specific disparate functions associated with performance of the replicum or to assess or optimize performance thereof according to an autonomous optimization component that operates in accordance with autonomous optimization component 1150. In such scenario, learned function(s) $Q_\kappa = g_\kappa(I_1, I_2 \ldots; P_1, P_2 \ldots P_m, \Delta_{RF}, PM, \text{repair} \ldots)$, or learned functions $Q_\kappa$ that depend on disparate sets of domain variables, for the replicated tool system or equivalent tool system can be expanded in the basis set of learned functions for the original system, such approach can lead to speedier learning since a substantial portion of correlations and inter-dependencies in the original system are likely to hold in the replicated tool system. Learning of functions $Q_\kappa$ based on received learned function(s), e.g., functions $O_\kappa$, can be the result of two or more system not being strictly equivalent. In one or more embodiments, autonomous optimization component 1150, or one or more components therein (see, e.g., solver component 1204), can solve for the coefficients of an expansion in the basis set of learned functions of the original system. At least one advantage of delivery of the one or more learned functions $O_\kappa$ to a replicated copy of tool system 310 or an equivalent or substantially equivalent deployment thereof is that benefits associated with the learning, such as capability to analyze various hypothetical operation scenarios, can be immediately realized in the replicated copy of tool system 310 or the equivalent or substantially equivalent deployment thereof. For instance, regarding the foregoing analysis capability, based on the set of domain variables employed to learn the functional relationship $f_\kappa$ in $O_\kappa$, effects of increase in etch gas flow(s) on spectral lines in an etch chamber can be assessed; likewise, effects of various etch chamber pressures on features (etch bias, FI CD, etc.) of a device can be evaluated.

Figure 12:
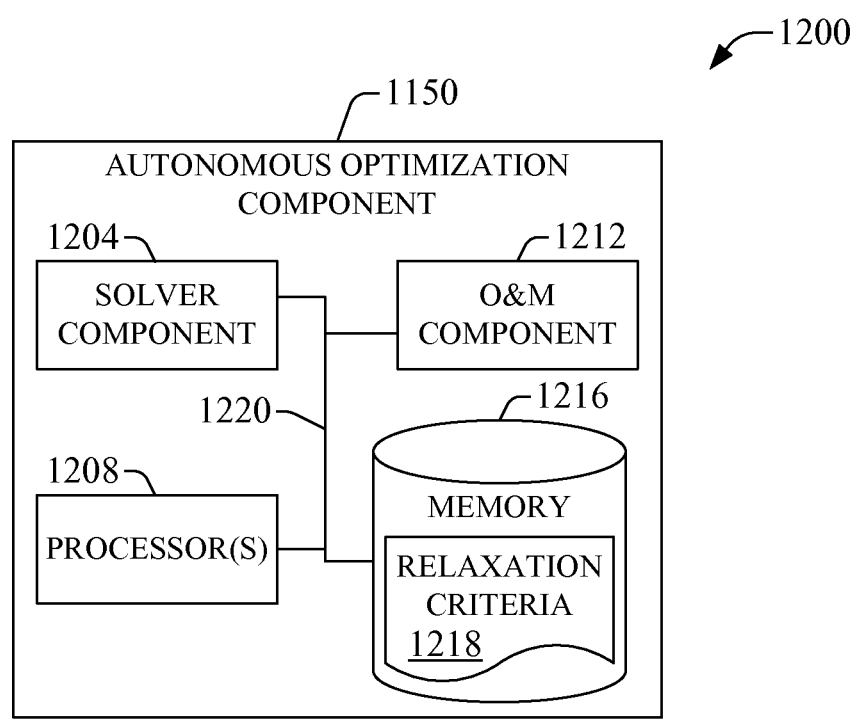
FIG. 12 is a block diagram of an example embodiment of an autonomous optimization component in accordance with aspects of the subject disclosure.

In an aspect of the subject disclosure, the set of a plurality of learned functions $\{\{f\}_1, \{f\}_2 \ldots \{\kappa\}_\gamma\}$ that accurately predicts each product output metric as a function of input data and recipe parameters to be within actor specified bounds, e.g., values of asset target(s) 1104, is conveyed as information/knowledge 1145 to autonomous optimization component 1150. Here, $\{f\}_\mu$, $\mu=1, 2 \ldots \gamma$ indicates a set of one or more learned functions for one or more output variables (e.g., $O_\kappa$) related to recipe $\mu$ and with $\gamma \leq S$ with S the cardinality of the set of drifted recipes. The autonomous optimization component 1150 also can receive input material measurements. Through a solver component and processing unit(s) (e.g., processor(s) or specific set of autobot component(s)) associated therewith, autonomous optimization component 1150 can enable a solution of an inverse problem for recipe parameters, wherein the received set of a plurality of learned functions $\{\{f\}_1, \{f\}_2 \ldots \{\kappa\}_\gamma\}$ and input measurements allow solution of values of recipe parameters such that one or more output measurements are within a configurable tolerance of specified asset target(s) (e.g., retained in memory element 1114), and provided specifications (e.g., retained I memory element 1118 or 1120) and tolerances (e.g., retained in memory element 1116) for product output metrics given a current state of tool system 310 as revealed by current operational parameters or records such as $\Delta_{RF}$, PM history, repair history, etc. Solver component can implement at least one of genetic algorithm, Monte Carlo simulations, simulated annealing, simplex, gradient search, or Tabu search to solve the inverse problem; it should be appreciated, however, that other approaches to inverse problem resolution also can be exploited by the solver component. In an example embodiment, illustrated in FIG. 12, autonomous optimization component 1150 can include solver component 1204 which can determine a solution to the inverse problem described supra. Memory 1216 can include a set of methodologies comprising genetic algorithm, Monte Carlo simulations, simulated annealing, Tabu search, or the like, which can be exploited by solver component 1204 to determine such solution. The set of methodologies can be stored in memory 1212 as one or more sets of code instructions.

If an assignment of values to recipe parameters is not found, e.g., the inverse problem is not solved, autonomous optimization component 1150 relaxes constraints on each output target, or asset target, one at a time or in groups of a few (e.g., 2-5) constraints until the inverse problem is solved and an assignment of settings for recipe parameters can be identified. Such relaxation can proceed in accordance with a set of relaxation criteria. In example embodiment 1200, solver component 1204 can relax such constraints and the set of relaxation criteria can be retained in memory element 1218. In an aspect, the autonomous optimization component 1150 allows an actor 390 (human or otherwise) to specify a set of weights (e.g., a criterion in set of relaxation criteria) for each output parameter, or metric, associated with a manufactured product and thus provide a ranking of metrics according to which the metrics have their target values relaxed; for instance, top-three ranked metrics are relaxed last, whereas lowest-lying metrics are relaxed first. In an aspect, the actor 390 can specify such weight(s) through interaction manager 345; e.g., interaction manager 345 can receive an indication (e.g., a data packet, a command or instruction, a set of bits . . . ) from actor 390 that conveys values(s) for such weight(s), the indication delivered in accordance with various communication protocols (e.g., HTTP, FTP, SFTP, various wireless protocol(s), such as point-to-point short-range wireless communication . . . ). Ranking of metrics also can be determined autonomously, e.g., by autonomous biologically based learning engine 360, based at least in part on a degree of relevancy of an output measurement to a manufacturing goal. Autonomous optimization component 1150 can convey an adjusted recipe 1155 as dictated by the recipe parameters extracted through solution of the inverse problem. In one or more embodiments, autonomous optimization component 1150 can include a recipe constructor component, such as formatter component 1310, to issue and deliver the adjusted recipe 1155, and commit it to memory (e.g., memory 1216).

Autonomous optimization component 1150 also can exploit a relaxation parameter that can dictate logic of how aggressively an output metric is relaxed, such relaxation parameter can be another criterion in the set of criteria (e.g., 1218) and can be configured by the actor 390 (e.g., a device, mobile or otherwise, operated by a human agent that manages utilization of tool system 310): Null relaxation parameter(s) can indicate that a metric associated therewith is not to be relaxed irrespective of its ranking. Such relaxation parameter(s) can be beneficial in scenarios in which tool system 310 (e.g., manufacturing tool) is constrained in performance, e.g., critical dimension such as specific photolithography feature(s) output resolution or packing density on a chipset, and therefore relaxation of such parameter is not viable.

If after exhausting a predetermined number of constraints, no suitable recipe adjustment is found such that each output metric is within specified tolerance, autonomous optimization engine 1150 can configure preventive maintenance parameters, e.g., schedule tests and calibration runs for tool system 310 (e.g., manufacturing tool) or repair procedures, such as replacement of a part or sealing vacuum leak(s) in a set of deposition chambers or a set of etching chambers, in order for tool system 310 to produce output in accordance with asset target(s) and specifications and tolerances. Accordingly, in addition to improving output of tool system 310, example system 1100 can autonomously recommend maintenance or repair procedures that can allow tool system 310 to optimally or nearly-optimally produce output asset(s), e.g., material(s), device(s), production data, calibration data, or the like. In example embodiment 1200, autonomous optimization component 1150 includes Operation and Maintenance (O&M) component 1212, which can generate preventive maintenance or repair parameters and deliver such parameters to a specific recipient (e.g., actor 390) as part of signaling 1157 (not shown in FIG. 12).

To provide described functionality of autonomous optimization component 1150, in example embodiment 1200, processor(s) 1208 can be configured to provide or can provide, at least in part, the described functionality of solver component 1204 and O&M component 1212. Processor(s) 1208 can exploit bus 1220 for data or any other information exchange conduit, protocol, or mechanism among disclosed memory 1216 or component(s) or subcomponents of autonomous optimization component 1150. In an aspect, bus 1220 can be embodied in at least one of a memory bus, a system bus, an address bus, or a message bus. Processor(s) 1208 can execute code instructions (not shown) stored in a memory 1212, or alternative or additional memory components or elements therein, to provide the described functionality of autonomous optimization component 1150 or component(s) thereof.

In additional or alternative embodiments, autonomous optimization component 1150 can be embodied in server(s) that includes at least one of one or more processors (e.g. processor(s) 1208); a system bus, a memory bus, an address bus, or message bus; and one or more memories (e.g., memory 1216), volatile or otherwise, wherein the server(s) can be functionally connected to one or more component(s) of autonomous optimization component 1150. In an example scenario, in such additional or alternative embodiment(s), solver component 1204 or O&M component 1212 can reside within the one or more memories in the server(s) as one or more sets of code instructions which implement the described functionality of autonomous optimization component 1150 when executed by the at least one or more processor in the server(s). In an aspect, execution of the one or more sets of code instructions is akin to executing at least one of solver component 1204 or O&M component 1212. In further alternative or additional embodiments, disparate components in autonomous optimization component 1150 can be embodied in a plurality of servers, with respective processor(s), memories, and buses. Connectivity among servers in the plurality can occur through one or more conventional bus architectures or remote communication, which can proceed in accordance with one or more remote communication protocol(s). Server(s) within the plurality can execute the one or more component embodied thereby, e.g., through the at least one or more processor therein, to provide at least in part the functionality of component(s) of autonomous optimization component 1150. It should be appreciated that the plurality of server(s) in such embodiment(s) can provide, at least in part, a distributed framework for example system 1100.

It is noted that the recipe extracted through autonomous optimization component 1150 optimizes product output metrics for current or nearly-current measurements of input material(s), e.g., set $\{I_1, I_2 \ldots I_M\}$ and current or nearly-current state of tool system 310 (e.g., a manufacturing tool). The state of tool system 310 (e.g., a manufacturing tool) can be determined in part by data observed for functional elements of the manufacturing tool system 310. Such optimization is based at least in part on a basis of knowledge extracted through drifting an original recipe and learning a set of predictive functions, e.g., $\{\{f\}_1, \{f\}_2 \ldots \{\kappa\}_\gamma\}$, and that comprises a basis for solution of recipe parameters, e.g., set $\{P_1, P_2 \ldots P_M\}$, constrained to specific output metrics configured for a product manufactured through tool system 310 (e.g., a manufacturing tool). Accordingly, example evolutionary tool system 1100 continuously or nearly-continuously improves and learns the various trends and the various parameters that affect the tool drift due to normal wear and tear over time, and maintenance and repair performed on the tool.

Figure 13:
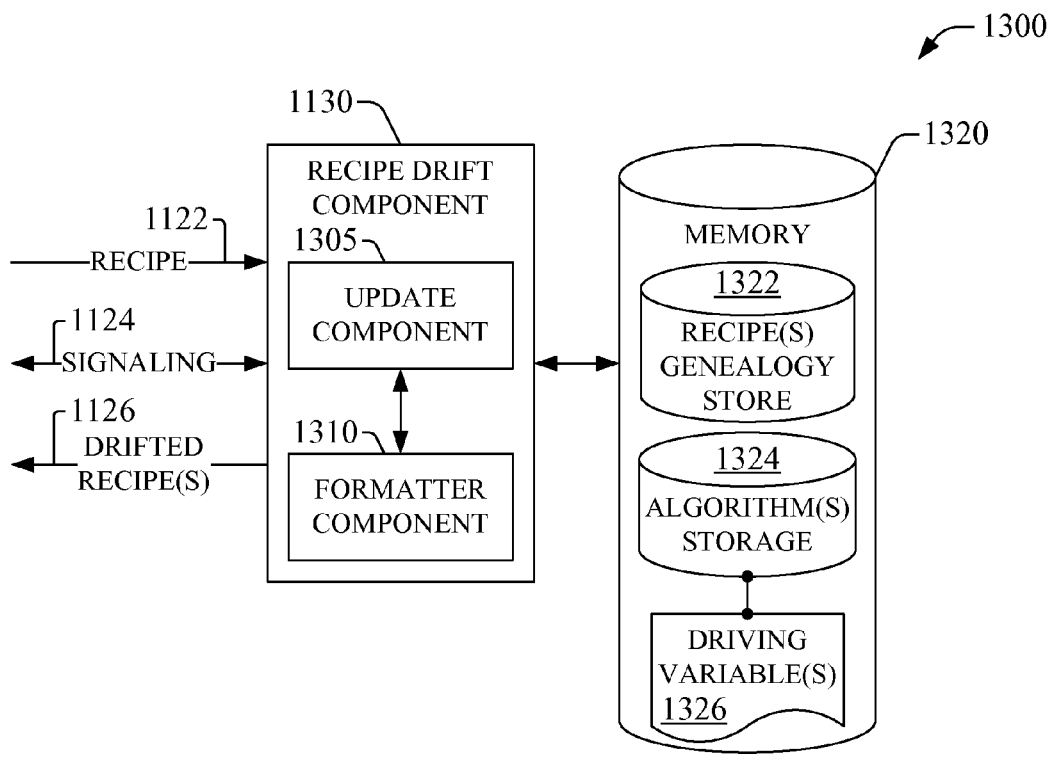
FIG. 13 is a block diagram of an example embodiment of a recipe drift component in accordance with aspects described herein.

FIG. 13 is a block diagram of an example embodiment 1300 of a recipe drift component 1130 in accordance with aspects herein. Update component 1305 can modify recipe parameters received as part of recipe 1122 in accordance at least in part with algorithm(s) retained in memory element 1324. In an aspect, as described above, algorithm(s) can exploit a set of driving variable(s) 1326 that determine a ranking or sequence in which recipe parameters are to be drifted. The set of driving variable(s) 1326 can be configured by actor 390, e.g., via interaction manager 345. Formatter component 1310 can generate and record a recipe(s) genealogy in memory element 1322. A recipe genealogy can collect recipe parameters, e.g., set $\{P_1, P_2 \ldots P_M\}$, and measurements of input material(s) or input condition(s), e.g., set $\{I_1, I_2 \ldots I_M\}$, associated with a tool, such as tool system 310, that processes a recipe, e.g., $R_1$. In addition, output measurements (e.g., features of a manufactured device) collected for a product manufactured with $R_1$ also can be retained as part of recipe genealogy. Moreover, information on condition(s) of tool system 310, or tool condition(s), such as PM records, repair history, hours of active duty cycle, or the like, can be recorded as part of recipe genealogy. In an aspect, memory 1320 can be part of long term memory 510.

To provide described functionality of recipe drift component 1130, in example embodiment 1300, processor(s) (not shown) can be configured to provide or can provide, at least in part, the described functionality of update component 1305 or formatter component 1310. Such processor(s) (not shown) can exploit a bus as a conduit, protocol, or mechanism for data or any other information exchange among disclosed memory 1216 or component(s) or subcomponents of recipe drift component 1130. In an aspect, such bus can be embodied in at least one of a memory bus, a system bus, an address bus, or a message bus. The processor(s) (not shown) can execute code instructions (not shown) stored in a memory 1320, or alternative or additional memory components such as memory platform 365, to provide the described functionality of recipe drift component 1130 or component(s) thereof. In one or more additional or alternative embodiments of example system 1100, recipe drift component 1305 can be part of autonomous optimization component 1150, or it can be distributed amongst autonomous biologically based learning engine 360 and the autonomous optimization component 1150.

FIG. 14 displays a diagram 1400 of recipe adaptation through recipe drifting in accordance to aspects described herein. Drifting of a starting recipe R can result in N (a natural number) drifted recipes which have recipe parameters of a recipe $R_J$ ($1<J<N$) incrementally and randomly modified in order to generate recipe $R_{J+1}$ ($1<J+1\leq N$). It is noted that the target recipe and drifted recipes $R_1$–$R_N$, when processed, yield output metric(s) that are within a tolerance $\Delta O^{(R')}$ from target metric(s). Drifting of recipes and associated learning of functions that predict output measurements allow exploration of the phase-space of recipe parameters and can reveal various relationships among product output metric(s), measurements of input material(s), and recipe parameters. When a recipe drifting cycle 1405 is complete, e.g., N recipes are generated, and based at least in part on a set of learned functions that can predict product output for one or more metrics of an output product (a manufactured product, a processed product, etc.), a set of recipe parameters is extracted— illustrated with arrow 1410—such that predicted output is within a tolerance $\Delta O^{(R')}$ of target metric(s), with tolerance $\Delta O^{(R')}$ smaller that $\Delta O^{(R')}$; namely, through exploration of phase space recipe parameters improved output is achieved for a current state of tool, e.g., tool system 310, and current measurement(s) or input material(s), e.g., set $\{I_1, I_2 \ldots I_M\}$. As illustrated, a drifting cycle 1415 also can be effected for adjusted recipe R'.

It is noted that drifting of recipe parameters and generation of learned functions that can predict one or more product output metrics can effectively drive a manufacturing tool from an first region in performance or output quality space to a second region in output quality space that captures various relationships amongst input measurements and recipe parameters, and output metrics, such that output of the manufacturing tool is optimized for a current state.

FIG. 15 displays an example embodiment 1500 of an interaction manager 345 in accordance with aspects described herein. Display component 1504 can render one or more user interface(s) or other content(s) associated with recipe drifting; to at least such end, display component 1504 can convey visual or aural indicia. Various schemes can be employed to render the one or more user interface(s) or other content(s) such as window-based schemes, e.g., iconic representation, pop-up representation of indicia; or text-based representation, with scroll-down or scroll-sideways delivery, or static rendering. In addition, the one or more user interface(s) or other content(s) can be organized in various configurations within a rendering area (e.g., display screen) that can be a part of display component 1504. In an aspect, display component 1504 can be embodied, at least in part, in a display element within a monitor such as a cathode ray tube (CRT) monitor, a Liquid Crystal Display (LCD) monitor, a plasma monitor, a light emitting diode (LED) monitor, an electrochromic monitor, or the like.

In example embodiment 1500, data entry component 1508 can collect input from actor 390 (e.g., a human agent, an automated machine agent, a device . . . ) as part of configuration of recipe drifting and control parameters thereof. In an aspect, configuration of a recipe can include at least one of a set of driving variable(s) 1326; a set of tolerances (retained in tolerance store 1116); a set of output specification(s) (e.g., 1120); a set of relaxation criteria (e.g., 1218) or a set of weights associated with specific output parameters (e.g., asset output), wherein the set of weights can establish relaxation strategy for target output parameters in a recipe. Display interface 1504 can process (e.g., decode or code), at least in part, the input from actor 390 and convey it as signaling (e.g., 1124, 1157) to at least one of (i) recipe drift component 1130 or component(s) therein; (ii) autonomous optimization component 1150 or component(s) therein; or (iii) memory 1110. As an example, such configuration of recipe drifting can be received by recipe drift component 1130 and retained within algorithm(s) storage 1324. As another example, a configuration of recipe drifting can be retained in memory 1110, as part of database(s) 355.

Various functional elements and associated circuitry that can embody, at least in part, data entry component 1508 allow data input; such functional elements can include a keypad, a touch screen, a microphone, a camera(s); a bar code reader, radio frequency identity (RFID) reader, infrared (IR) wireless-based reader; or the like. Moreover, data entry component 1508 also can include peripheral interface 1512 that enables connection to a peripheral device and communication therewith; as an example, peripheral interface 1512 can be part or include at least a portion of adaptor component 335, which allows data retrieval from tool system 310. In an aspect, peripheral interface 1512 can include a set of ports, the set comprising at least one of parallel ports, serial ports, Ethernet ports, V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394. In another aspect, peripheral 1512 and associated circuitry also can enable wireless communication (e.g., point-to-point, indoor, or cellular).

In an aspect, to provide described functionality of interaction manager 345, processor(s) 1520 can be configured to provide or can provide, at least in part, the described functionality of display component 1504 and data entry component 1508. Processor(s) 1520 can exploit a bus as a conduit, protocol, or mechanism for data or any other information exchange amongst memory 1110 or component(s) of interaction manager 345 or other component(s) of interaction component 330 described herein. Such bus (represented with disjointed arrows) can be embodied in at least one of a memory bus, a system bus, an address bus, or a message bus. Processor(s) 1520 can execute code instructions (not shown) stored in memory 1110, or alternative or additional memory element(s), such as memory platform 365, to provide the described functionality of interaction manager 345 or component(s) therein or functionally coupled thereof.

FIG. 16 is an example user interface 1600 that can be rendered to regulate, at least in part, drifting and associated knowledge generation of a tool system in accordance with aspects described herein. Interaction manager component 345 can render, via display component 1504, user interface 1600. Various gestures, such as motion gestures (trackball manipulation, control movement), touch gestures (e.g., screen touch), speech gestures (e.g., voice commands), or the like, can control sliding tool-bar(s) or sliding soft-button(s) in example user interface 1600. In an aspect, magnitude of recipe drifting can be controlled via a sliding tool-bar, or sliding soft-button, 1604 between minimum (m) and maximum (M) values; a selected value (e.g., 0.5%) can determine the magnitude of changes introduced to a set of one or more selected variables in a recipe that can be drifted. Such minimum and maximum values also can determine a range for safe operation of tool system 310 or functional elements therein. In addition, example user interface 1600 also enables configuration of schedule(s) for drifting, which establish periods in which recipe drifting and associated optimization is to be conducted. Furthermore, user interface 1600 enables configuration of a learning goal, as illustrated by graphical indicia 1606 which provides an option to learn an analytic expression, e.g., $O_\kappa$, as described supra, or a Boolean variable. Example user interface 1600 also allows construction, or composition, of a profile of the set of one or more selected variables. Visual indicia 1608 can enable selection of a set of one or more variables to be drifted in a recipe, e.g., generation of set $\{P_1, P_2 \ldots P_m\}$; as illustrated, the selection can be tagged with a cross symbol, even though it should be appreciated that other tagging indicia can be employed. Selection of a specific variable, e.g., VAR J+2 (with J a natural number greater than or equal to unity), which can correspond, for example, to pressure in a deposition chamber, can lead to a configuration environment (not shown) that enables at least one of definition of bounds of variation of the selected variable (e.g., VAR J+2), wherein the bounds determine cessation of drifting; weight value(s), or relevancy, of the selected variable within criteria (e.g., relaxation criteria 1218) for relaxation in scenarios in which solution to an inverse problem is not found; target output value of the selected variable. The configuration environment (not shown) can be rendered as a pop-up window or any other indicia.

In addition or as an alternative, example user interface 1600 can render indicia 1612 that allows configuration of a probability distribution function (PDF) (e.g., Gaussian distribution, Poisson distribution, exponential distribution . . . ) that dictates likelihood of a predetermined magnitude of change to the selected variable as part of drifting a recipe. Moreover or as another alternative, example user interface 1600 can render indicia 1616 that enables selection of sub-systems (e.g., sub-systems 1-5) or groups of equipment or sensors that are part of tool system 310 in order to drift recipe parameters or variables associated to such equipment or sensors; such selection can isolate disparate parts of tool system 310 to allow analysis of cause-effect relationships amongst parameters in a recipe and asset output characteristics. Rendered selections in indicia 1616 can include sub-systems, e.g., five sub-systems illustrated in FIG. 16, that are remote to a machine or device operated by an end-user, e.g., actor 390. Sub-systems identified in indicia 1616 also can be part of dedicated functional element(s), such as measurement or monitoring equipment, in tool system 310 (e.g., a manufacturing tool, processing tool . . . ); for instance, sub-systems 1-5 can include equipment or sensors for at least one of manufacturing, processing, or assembly of semiconductor substrates possessing one or more integrated circuits (ICs), flat-panel device chipset(s) or IC(s), flexible display(s), or other display technologies such as light emitting diode (LDE) display technology.

Example user interface 1600 also can include indicia, e.g., soft button 1620 (labeled "Report," as an illustration), that can provide feedback associated with recipe drifting; the feedback can include at least one of a set of one or more learned functions; correlation(s) amongst asset output data and asset input data, wherein the asset can be a manufactured product; genealogy of one or more drifted recipes, historical data associated with output asset data and output input data for a specific recipe or manufacturing process, achievement of desired performance; graphs or charts of a set of values of one or more output product metrics, or a set of values of one or more input variables, e.g., optical spectral of various gases in an etching chamber; or the like. Interaction manager 345, e.g., via display component 1504, can cast the feedback into various formats suitable for communication to disparate tool systems or actors. The level or quality of supplied feedback can vary in accordance with credential(s) of an end-user that configures drifting process through a user interface, such as user interface 1600, and the interaction manager (e.g., interaction manager component 345) that renders such user interface. In an aspect, if soft button 1620 is actuated, interaction manager 345 can receive input signaling to generate one or more views of available operational data, e.g., data retained in one or more of memories 1110, 1216, 1320, etc., wherein the input signaling can be produced through data entry component 1508 via, in part, peripheral interface 1512. Moreover, interaction manager 345 can deliver the data conveyed in the one or more views to a tool system or actor. In another aspect, actuation of soft button 1620 can supply a visual representation of the foregoing feedback in a display area 1624 or an aural representation of the foregoing feedback. As an example, learned function(s) or learned Boolean expressions can be displayed. Likewise, chart(s) or table(s) with data related to output product metric(s) or input variables also can be displayed in area 1624.

The space of available selection or indicia included in a user interface such as 1600 can be determined by a set of user profiles, which can be configured by an administrator (human agent or otherwise) of tool system 310 (e.g., a manufacturing tool). The user profiles can establish various degrees of access to one or more subsystem of tool system 310, set of recipe variables a user is allowed to modify, privilege(s) configured for a user to determine relaxation criteria, or the like. In addition or in the alternative, available selection(s) rendered in a user interface (e.g., user interface 1600) can be determined, in part, via at least one of (i) cognitive load of the end-user, e.g., expert knowledge of tool system 310, and related equipment and associated processes, can warrant higher complexity or flexibility of selection; (ii) state of end-user such as trainee, technician, engineer, manager, etc.; or (iii) extrinsic evidence collected through operation of tool system 310 (manufacturing tool, processing tool, characterization tool, etc.) and related recipe drifting, e.g., a set of one or more variables have drifted to a hazardous value, such drifting can occur due to instable solutions of inverse problem solution or defects in operation of tool system 310. The degree of selection(s) available in a user interface (e.g., user interface 1600) or manner in which the available selection(s), and related information, is rendered also can be drifted randomly to establish optimal or near-optimal rendition(s) of information to maximize or nearly-maximize end-user experience, increase safety, improve drifting configuration, or the like. Interaction manager component 345 can exploit recipe drift component 1130 and autonomous biologically based learning engine 360.

Interaction manager component 345 can render user interface(s), such as 1600, locally or deliver data or signaling to render the user interface(s) at one or more actor devices, mobile or otherwise. In an aspect, disparate end-users that are actors and are located in disparate locations can receive rendition(s) of user interface(s) and associated information in disparate devices. Such information delivery feature can be enabled by an access network (e.g., a wide area network, a wireless wide area network, a local area network, and ad-hoc network; not shown) that functionally couples actor(s), e.g., 390, to interaction component 330.

In view of the example systems presented and described above, a methodology that may be implemented in accordance with the disclosed subject matter, will be better appreciated with reference to the flowchart of FIGS. 17-23. While, for purposes of simplicity of explanation, the methodologies are shown and described as a series of blocks, it is to be understood and appreciated that the disclosed aspects are not limited by the number or order of acts, as some acts may occur in different orders and/or concurrently with other blocks from what is depicted and described herein. Moreover, not all illustrated acts may be required to implement the methodologies described hereinafter. It is to be appreciated that the functionality associated with the blocks may be implemented by software, hardware, a combination thereof or any other suitable means (e.g., device, system, process, component). Additionally, it should be further appreciated that the methodologies disclosed hereinafter and throughout this specification are capable of being stored on an article of manufacture to facilitate transporting and transferring such methodologies to various devices for execution, and thus implementation, by at least a processor or processing unit or platform. It is to be understood and appreciated that a methodology could alternatively be represented as a series of interrelated states or events, such as in a state diagram.

Methods disclosed throughout the subject specification and annexed drawings are capable of being stored on an article of manufacture to facilitate transporting and transferring such methodologies to computers for execution, and thus implementation, by a processor or for storage in a memory. In an aspect, one or more processors that enact method(s) described herein can be employed to execute code instructions retained in a memory, or any computer- or machine-readable medium, to implement method(s) described herein; the code instructions, when executed by the one or more processor implement or carry out the various acts in the method(s) described herein. The code instructions provide a computer- or machine-executable framework to enact the method(s) described herein.

FIG. 17 presents a flowchart of an example method 1700 for biologically based autonomous learning with contextual goal adjustment. An adaptive inference engine (e.g., 110), or one or more components functionally coupled thereto, can implement at least in part the subject example method 1700. Alternatively or in addition, a processing platform and functional unit(s) or processor(s) therein that confer functionality to the adaptive inference engine or the one or more components functionally coupled thereto also can implement at least in part the subject example method. At act 1710 a goal is established. A goal is an abstraction associated with a functionality of a goal component that is employed to accomplish the goal or objective. A goal can be multi-disciplinary and span various sectors (e.g., industrial, scientific, cultural, political, and so on). Generally act 1710 can be executed by an actor that can be external, or extrinsic, to a goal component (e.g., 120) that can be coupled to a learning system (e.g., adaptive inference engine 110). In view of the multidisciplinary nature of a goal, a goal component can be a tool, device, or system that possesses multiple functionalities; for instance, a tool system (e.g., tool system 310) that performs a specific process, or a device that provides with a specific outcome to a set of requests, or the like. At act 1720 data is received. Such data can be intrinsic, e.g., data generated in a goal component (e.g., component 120) that pursues a goal. In an aspect, as a part of performing the specific process, a set of sensors or probes associated with the tool can gather the data that is received in an adaptive intelligent component. Received data can also be extrinsic, such as data conveyed by an actor (e.g., actor 390), which can be a human agent or a machine with embedded intelligence or otherwise. Extrinsic data can be data that is utilized to drive a process or, generally, to drive an accomplishment of a specific goal. A human agent can be an operator of the tool system, and can provide instructions or specific procedures associated with the processes performed by the tool. An example of an actor can be a computer performing a simulation of the tool system, or substantially any goal component. It should be appreciated that simulation of the tool system can be employed to determine deployment parameters for the tool system, or for testing alternative conditions of operation for the tool (e.g., conditions of operations that can pose a hazard to a human agent, or can be costly). The received data can be training data or production data associated with a specific process (e.g., deposition of a matrix of TFTs that are part of a flat panel display active matrix), or generally a specific code.

In a further aspect, the received data can be associated with data types or with procedural, or functional, units. A data type is a high level abstraction of actual data; for instance, in an annealing state in the tool system a temperature can be controlled at a programmed level during the span of the annealing cycle, the time sequence of temperature values measured by a temperature sensor in the tool system can be associated a sequence data type. Functional units can correspond at least in part to libraries of received instructions, or processing code patches that, when executed at least by a processor or processing platform, manipulate data necessary for the operation of the tool or for analyzing data generated by the tool. Functional units can be abstracted at least in part into concepts related to the specific functionality of the unit, with the functionality conferred at least by a processor; for example, a multiplication code snippet can be abstracted into a multiply concept. Such concepts can be overloaded, in that a single concept can be made dependent on a plurality of data types, such as multiply(sequence), multiply(matrix), or multiply (constant, matrix). Moreover, concepts associated with functional units can inherit other concepts associated with functional units, like derivative(scalar_product(vector, vector)) which can illustrate a concept that represents a derivative of a scalar product of two vectors with respect to an independent variable. It should be appreciated that functional concepts are in direct analogy with classes, which are in themselves concepts. Furthermore, data types can be associated a priority and according to the priority can be deposited in a semantic network. Similarly, functional concepts (or at least part of autobots; see FIG. 6B), can also be associated with a priority, and deposited in a disparate semantic network. Concept priorities are dynamic, and can facilitate concept activation in the semantic networks.

At act 1730 knowledge is generated from the received data, which can be represented in semantic networks, as discussed above. Generation of knowledge can be accomplished by propagating activation in the semantic networks. Such propagation can be determined by a situation score assigned to a concept in addition to a score combination. In an aspect, score combination can be a weighted addition of two scores, or an average of two or more scores. It should be appreciated that a rule for score combination can be modified, depending on at least one of tool system conditions or information input received from an external actor. It should be appreciated that a priority can decay as time progresses to allow concepts that are seldom activated to became obsolete, allowing new concepts to become more relevant.

The generated knowledge can be retained in a memory, and employed as actionable information; for instance, a steady-state pressure in a deposition step can be cast as a precise, well-defined mathematical function (e.g., a single-valued function with all parameters that enter the function deterministically assessed, rather than being stochastic or unknown) of two independent variables like steady-state flow and steady-state exhaust valve angle. Alternatively, or in addition, pressure during transition can be cast as a function of independent variables and/or parameters or alternatively, or pressure during execution of a recipe (e.g., photolithographic etching of a TFT structure in a FPD (plat panel display) pixel), wherein all time instances are included, can be cast as a function of other measured variables/parameters during execution of the recipe.

At act 1740 the generated knowledge is stored for subsequent utilization of the autonomous tool and for the generation of further knowledge. In an aspect, knowledge can be stored in a hierarchy of memories. A hierarchy can be determined on the persistence of knowledge in the memory and the applicability of knowledge for creation of additional knowledge. In an aspect, a third tier in the hierarchy can be an episodic memory (e.g., episodic memory 530, or awareness episodic memory 740), wherein received data impressions and knowledge can be collected. In such a memory tier manipulation of concepts is not significant, the memory acting instead as a reservoir of available information received from a tool system or an external actor. In an aspect, such a memory can be identified as a meta-database, in which multiple data types and procedural concepts can be stored. In a second tier, knowledge can be stored in a short term memory wherein concepts can be significantly manipulated and spread activation in semantic networks can take place. In such a memory tier, functional units or procedural concepts operate on received data, and concepts to generate new knowledge, or learning. A first tier memory can be a long term memory (e.g., LTM 510) in which knowledge is maintained for active utilization, with significant new knowledge stored in this memory tier. In addition, knowledge in a long term memory can be utilized by functional units in short term memory (e.g., 520).

At act 1750 the generated or stored knowledge is utilized. Knowledge can be employed to (i) determine a level of degradation of a goal component (e.g., tool system 310) by identifying differences based on stored knowledge (data and procedures) and newly received data (see self-awareness component 550), wherein the received data can be extrinsic (e.g., input 130) or intrinsic (e.g., a portion of output 140); (ii) characterize either extrinsic or intrinsic data or both, for example by identifying data patterns or by discovering relationships among variables (such as in a self-conceptualization component 560), wherein the variables can be utilized to accomplish the established goal; or (iii) generate an analysis of the performance of the tool system that generates the data (e.g., self-optimization component 570), providing indications of root cause for predicted failures or existing failures as well as necessary repairs, or triggering alarms for implementing preventive maintenance before degradation of the tool system causes tool failure. It is to be noted that utilization of the stored and generated knowledge is affected by the received data—extrinsic or intrinsic—and the ensuing generated knowledge.

Act 1760 is a validation act in which the degree of accomplishment of a goal can be inspected in view of generated knowledge. In case the established goal is accomplished, example method 1700 can end. Alternatively, if the established goal has not been accomplished, the established goal can be reviewed at act 1770. In the latter, flow of method 1700 can lead to establishing a new goal in case a current goal is to be revised or adapted; for instance, goal adaptation can be based on generated knowledge. In case no revision of a current goal is to be pursued, flow of method 1700 is returned to generate knowledge, which can be utilized to continue pursuing the currently established goal.

FIG. 18 presents a flowchart 1800 of an example method for adjusting a situation score of a concept associated with a state of a goal component. An autonomous biologically based learning engine (e.g., 360), and one or more components functionally coupled thereto, can implement at least in part the subject example method 1800. Alternatively or in addition, a processing platform (e.g., 385) and functional unit(s) or processor(s) therein, that confer functionality to the autonomous biologically based learning engine or the one or more components functionally coupled thereto also can implement at least in part the subject example method. At act 1810 a state of a goal component is determined A state typically is established through a context, which can be determined by various data input (e.g., input 130), or through a network of concepts associated with the input and exhibiting specific relationships. The input data relates to a goal that is pursued by the goal component; for instance, a recipe for a coating process of a specific thin-film device, such as a TFT, can be deemed as input associated with a "deposit an insulating device" goal. At act 1820 a set of concepts that can be applied to the state of the goal component is determined. Such concepts can be abstractions of data types entered in act 1810, or can be existing concepts in a memory platform (e.g., long term memory 510, or short term memory 520). Generally, functional concepts that can act, via at least a processor or a processing unit, on descriptive concepts (e.g., concepts with no functional component) can be utilized more frequently towards achieving a goal. At act 1830 a situation score for each concept in a set of concepts associated with the goal state is determined. A set of situation scores can establish a hierarchy for concept utilization or application, which can determine the dynamics of a goal, like goal adaptation or sub-goal creation/randomization. Adjustment of situation scores for specific concepts can drive goal accomplishment as well as propagation within a space of goals as part of goal adaptation.

FIG. 19 presents a flowchart 1900 of an example method for generating knowledge through inference according to aspects described herein. An autonomous biologically based learning engine (e.g., 360), and one or more components functionally coupled thereto, can implement at least in part the subject example method 1900. Alternatively or in addition, a processing platform and functional unit(s) or processor(s) therein that confer functionality to the autonomous biologically based learning engine or the one or more components functionally coupled thereto also can implement at least in part the subject example method. At act 1910 a concept is associated to a data type and a priority for the concept is determined Priorities typically can be determined based on a probability of utilization of a concept, or a concept's weight. Such a weight can be determined through a function (e.g., a weighted sum, an arithmetic average, or a geometric average) of parameters that can represent the ease to utilize a concept (e.g., the complexity to operate on a data type), such a parameter can be identified with a concept's inertia, and the suitability parameter of a concept to describe a state (e.g., a number of neighboring concepts that can be related to the concept). It should be appreciated that a priority can be time dependent as a consequence of explicitly time-dependent inertia and suitability parameters, or as a result of concept propagation. Time dependent priorities can introduce aging aspects into specific concepts and thus can promote knowledge flexibility (for example, a paradigm employed to pursue a goal, such as a recipe for preparation of a nano-structured device such as for example a TFT in an active matrix array in a FPD) through concepts ceasing to be relevant in a particular knowledge scenario (e.g., node structure in a priority-based knowledge network). At act 1920 a semantic network for a set of prioritized concepts is established. It should be appreciated that the semantic network can comprise multiple sub-networks, wherein each of the multiple networks can characterize a set of relationships among concepts in a class. As an example, in a two-tier semantic network, a first sub-network can represent relationships among concepts derived from data types, whereas a second sub-network can comprise relationships among functional concepts (e.g., a planner autobot or überbot, a conceptual autobot) describing operations that can be utilized to alter upon a data type. At act 1930 the set of priorities is propagated over the semantic network to make an inference and thus generate knowledge associated with the network of concepts. In an aspect, such propagation can be utilized to generate optimization plans for goal adaptation, or to predict failures in a system that pursues a specific goal.

FIG. 20 presents a flowchart of an example method 2000 for learning a relationship among a set of variables associated with production data generated by one or more tools that produce, e.g., manufacture, an asset according to aspects described herein. An autonomous evolutionary manufacturing tool and an autonomous biologically based learning engine (e.g., 360) therein can implement at least in part the subject example method 2000. Alternatively or in addition, a processing platform and functional unit(s) or processor(s) therein that confer functionality to the autonomous biologically based learning engine or one or more components functionally coupled thereto also can implement at least in part the subject example method 2000. At act 2010, a target product output is set. The target product output comprises a set of one or more product output metrics such as specific product specification(s) and associated tolerances established by an actor (e.g., 390) through an interface component, e.g., interaction manager 345. At act 2020, an initial recipe to fabricate a product that fulfills the target product output is drifted. At act 2030, a set of relationships associated with one or more product output metrics is learned through drifting. Learning through drifting includes learning one or more relationships in the set of relationships in accordance with knowledge generation, as described herein, based on data generated via one or more drifted recipes. The set of relationships can include a set of M (with M a natural number) functions that relate product output, e.g., measurement of a selected metric, with a set of input measurement data and recipe parameters of a current recipe. For a set of N production stages, wherein each stage includes Q (with Q a natural number) production runs, M≤N functions can be learned. At act 2040, an adjusted recipe is generated to accomplish the target product output based at least in part on the set of learned relationships. At act 2050, at least one product is produced in accordance with the adjusted recipe. At act 2060, it is determined if generation of the adjusted recipe is successful by collecting (e.g., measuring) data on output attribute(s) of the at least one product; wherein generation success is determined by quality of the output attribute(s) of the at least one product as dictated by a set of tolerances and specification(s) established for product output. In the negative case, at act 2070 a maintenance procedure is effected and flow is directed to act 2020. Conversely, at act 2080, it is evaluated whether target output product is fulfilled. A negative outcome of act 2080 directs flow to act 2020, in which the initial recipe is adjusted through learning originated at least in part via drifting of a previous recipe. In contrast, a positive outcome redirects flows to act 2030. Accordingly, data associated with a recipe to manufacture a successful product and the recipe can be utilized to further learn one or more relationships among a recipe and input data (e.g., data on state(s) of a manufacturing tool) via a continuous or nearly-continuous refinement, e.g., improvement, learning cycle, wherein the learning can be accomplished as described hereinbefore.

It is noted that through example method 2000 a recipe for fabrication of a product with custom properties dictated by product specification(s) and tolerances for output product measurements is recursively optimized, or evolved, through drifting and learning. Accordingly, a manufacturing tool that enacts the subject example method 2000 can fabricate an optimal output product.

FIG. 21 is a flowchart of an example method 2100 for drifting a manufacturing recipe according to aspects described herein. A component such as recipe drift component 1130 within an evolutionary tool system 1100 can enact the subject method. Alternatively or in addition, a processing platform and functional unit(s) or processor(s) therein that confer functionality to an autonomous biologically based learning engine and recipe drift component also can implement at least in part the subject example method. At act 2110, an initial recipe is set as a current recipe. At act 2120, the current recipe is drifted. Drift can include selecting one or more variables in the current recipe and effecting incremental changes to the one or more variables to generate a set of one or more adjusted recipe parameters. In an aspect, selection of the one or more variables is dictated by a list of variables that drive the drift, e.g., driving variables 1226 retained in memory 1220. Such list can be provided by an actor (e.g., 390) or inferred and delivered by autonomous biologically based learning engine 360. It is noted that that drifted variables can be specific to the current recipe. In addition, drift can be effected multi-dimensionally with varying levels of magnitude per respective directional vector, wherein a directional vector is defined in the space spanned by recipe parameters that can be drifted or randomized. The dimensionality can be across domains (e.g., power, chemicals, temperature, pressure, costs, speed, etc.). At act 2130, an adjusted recipe obtained through drifting the current recipe is processed. At act 2140, it is determined whether the adjusted recipe is to be drifted. In a positive outcome, at act 2150, the adjusted recipe is added to a genealogy of recipes created through drifting. At act 2160, the adjusted recipe is set as a current recipe. In a negative outcome to evaluation in act 2140, the genealogy of recipes created through drifting and data, such as input measurements, output measurements, tool conditions, maintenance, etc., associated with each recipe in the genealogy are supplied at act 2170.

FIG. 22 is a flowchart of an example method 2200 for generating an evolved recipe to fabricate a product with a target specification(s) for product output according to aspects described herein. An autonomous biologically based optimization system, e.g., 1150 within an evolutionary tool system 1100 can enact the subject example method 2200. Alternatively or in addition, a processing platform and functional unit(s) or processor(s) therein that confer functionality to an autonomous biologically based optimization engine, and components therein, also can implement at least in part the subject example method 2200. At act 2210, a set of learned functions that predict product output for a set of manufacture recipes in received. At act 2220, input material measurements are received. At act 2230, for a current state of a manufacturing tool, parameters for a recipe based at least in part on the received set of learned functions or the received input materials measurements are extracted. The current state of the manufacturing tool can be determined, at least in part, by at least one of record(s) of active duty cycles such as RF hours; preventive maintenance history; repair history; operation domains; or product manufacturing range which establishes types of disparate products manufactured in a single tool system such as a deposition chamber or etching chamber. In an aspect, the received set of learned functions combined with the received input measurements are utilized as bases for solution of an inverse problem in which a set of recipe parameters are identified so as to generated an output within predetermined bounds, such bounds can be configured autonomously by a component in an evolutionary manufacturing tool or can be supplied by an actor, human or otherwise; output bounds provided by a human actor can be received by a human machine interface, e.g., interaction component 330, which can enable, at least in part, machine implementation of the supplied bounds.

At act 2240, it is evaluated if predicted output for each recipe in the set of recipes satisfied respective constraints, or bounds. In the negative case, e.g., when a solution of suitable assignment of values to recipe parameters fails to yield output within constraints, a set of one or more output constraints are relaxed at act 2250. In an aspect, relaxation can be effect in accordance at least in part with a specific ranking of configurable weights for each output parameter in product output so that highly weighted output characteristics have their respective target values relaxed at later stages of relaxation. The ranking of weight can be configured by an actor, e.g., 390, or autonomously inferred by an autonomous biologically based learning engine, e.g., 360. Positive outcome to act 2240 directs flow to act 2280, in which the recipe is supplied in accordance at least in part with the extracted parameters. At act 2260 it is probed if a current number of relaxed constraints is above threshold, wherein the threshold can be configurable and determines a number of relaxations above which extraction of recipe parameters can produce unstable recipes that if processed by tool system 310 can result in avalanche scenarios or hazardous operation within a manufacturing tool system 310, such as explosion(s) or unsafe chemical reaction, damage to functional component(s) 315, or largely out of specification asset output 1106. When outcome of act 2260 is affirmative, a maintenance procedure is configured at act 2270. The maintenance procedure can include identification or definition of values for at least one of preventive maintenance (PM) metric(s) or repair metric(s) so that the manufacturing tool can produce output as demanded or as established by specification(s) or tolerance(s) that define output product constraints.

When outcome of act 2240 is affirmative, at act 2270, the recipe in accordance at least in part with the extracted parameters is supplied.

FIG. 23 displays a flowchart of an example method 2300 for autonomously generating a predictive functional relationship among input variable(s) and parameter(s) in a manufacturing recipe and product output according to aspects described herein. An autonomous biologically based learning engine (e.g., 360), and one or more components therein or otherwise functionally coupled thereto, can implement at least in part the subject example method 2300. Alternatively or in addition, a processing platform (e.g., 385) and functional unit(s) or processor(s) therein that confer functionality to the autonomous biologically based learning engine or the one or more components therein or functionally coupled thereto also can implement at least in part the subject example method. In one or more embodiments, the subject example method 2300 can be effected by a learning engine that is not based, or at least not based entirely, on biologically based learning principles; e.g., learning engine 1170. At act 2310, production data generated through execution of a set of one or more manufacturing recipes $\{R_1, R_2, \ldots, R_\lambda\}$ is received. At act 2320, a functional relationship among a product output and at least one of material input measurement(s) or recipe parameter(s) of a manufacturing tool that executes the recipe is learned. At act 2330, it is evaluated if a prediction of product output is within a specified quality, the prediction effected through the learned functional relationship. In the affirmative case, at act 2340, the learned functional relationship is accepted. Accepting a learned functional relationship can include retaining or conveying the learned functional relationship. In an aspect, acceptance of the learned function can include at least one of delivery or storage of the learned function. Conversely, negative outcome of evaluation act 2330 leads to act 2350, in which the learned functional relationship is rejected.

It should be appreciated that the subject example method 2300 can be re-enacted multiple times in order to learn multiple functional relationships for several production runs implemented according to respective recipes.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus as either hardware or a combination of hardware and software or hardware and firmware, or article of manufacture using standard programming and/or engineering techniques. Implementation(s) as a method, or as a combination of hardware and software, for example, can be effected at least in part through a processor or processing unit (e.g., processing platform 385) that executes computer-accessible code instructions retained in a memory. In one or more aspects, the functions described may be implemented in hardware, software, firmware, or any combination thereof. If implemented in software, the various functionality described herein can be stored or transmitted as one or more instructions or code on a computer-readable storage medium or memory. Computer-readable media includes both computer storage media and communication media including any medium that facilitates transfer of a computer program from one place to another. A storage medium may be any available media that can be accessed by a computer. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disc (CD), digital versatile disc (DVD) . . . ], smart cards, and flash memory devices (e.g., card, stick, key drive . . . ).

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes" or "including" are used in either the detailed description or the claims, such term is intended to be inclusive in a manner similar to the terms "comprises" or "comprising" as "comprises" or "comprising" is interpreted when employed as a transitional word in a claim.

What is claimed is:

1. A system, comprising:
   a processor, coupled to a memory, comprising computer-executable components, comprising:
   a drift component that modifies a manufacturing recipe processed by a manufacturing tool that produces an asset based at least in part on a set of driving variables and a defined probability distribution function to generate a modified manufacturing recipe for the asset, wherein the set of driving variables determine a sequence in which to modify a set of recipe parameters associated with the manufacturing recipe, and wherein a magnitude of change between the manufacturing recipe and the modified manufacturing recipe is determined based at least in part on the defined probability distribution function.

2. The system of claim 1, further comprising an objective autonomous learning engine that infers one or more functions for the manufacturing tool based on the modified manufacturing recipe processed by the manufacturing tool, wherein the one or more functions predict asset output metrics for the produced asset.

3. The system of claim 2, further comprising an autonomous optimization engine that extracts a set of updated recipe parameters from a set of input measurements and the one or more functions to generate an adjusted recipe within a pre-defined tolerance of a target value for the asset output metrics.

4. The system of claim 3, wherein, to infer the one or more functions, the objective autonomous learning engine relaxes one or more constraints for the asset output metrics.

5. The system of claim 4, wherein the relaxation of the one or more constraints is dictated at least in part by a ranking of weights for the asset output metrics.

6. A method, comprising:
   determining, by a device comprising a processor, a sequence for modifying one or more parameters associated with an initial recipe; and
   modifying the initial recipe to fabricate a product that is predicted to fulfill a target product output based at least in part on the sequence and a defined probability distribution function that determines a magnitude of the modifying of the initial recipe.

7. The method of claim 6, further comprising learning a set of relationships associated with product output based on the modifying of the initial recipe.

8. The method of claim 7, further comprising generating an adjusted recipe to accomplish the target product output based at least in part on the set of relationships.

9. The method of claim 8, further comprising evaluating whether the target product output is fulfilled in response to determining that generation of the adjusted recipe is successful.

10. The method of claim 9, further comprising continuing the modifying in response to determining that the evaluating indicates an unsuccessful outcome.

11. The method of claim 9, wherein the modifying includes:
   setting the initial recipe as a current recipe;
   randomizing the one or more parameters of the current recipe to generate an adjusted recipe;
   initiating processing, via a manufacturing tool, of the adjusted recipe obtained in response to the randomizing;
   in response to determining that the adjusted recipe is to be drifted, adding the adjusted recipe to a genealogy of recipes and setting the adjusted recipe as the current recipe; and
   in response to determining that the adjusted recipe is not to be drifted, sending the genealogy of recipes and data associated with the genealogy of recipes to a database.

12. The method of claim 9, wherein the generating includes:
   receiving the set of relationships that define predicted product outputs for a set of recipes;
   receiving input material measurements;
   extracting recipe parameters for the adjusted recipe based at least in part on a set of functions or the input material measurements; and
   sending the adjusted recipe at least in part with the recipe parameters to a database in response to determining that the predicted product outputs of the set of relationships satisfy respective output constraints.

13. The method of claim 12, in response to determining that the predicted product outputs do not satisfy the respective output constraints, further comprising:
   relaxing a set of the respective output constraints; and
   extracting recipe parameters for the adjusted recipe based at least in part on the set of functions or the input material measurements in response to determining that a current number of relaxed constraints is below a defined threshold.

14. The method of claim 13, further comprising configuring a maintenance repair procedure in response to determining that the current number of relaxed constraints is below the defined threshold.

15. The method of claim 11, wherein the learning includes:
   receiving production data generated through execution of one or more modified recipes;
   learning a functional relationship among a product output metric, material input measurements, and recipe parameters of the manufacturing tool based on the production data; and
   accepting the functional relationship in response to determining that predictions of the product output are within a specified quality.

16. The method of claim 12, wherein the extracting includes solving an inverse problem through at least one of genetic algorithm, Monte Carlo simulation, simulated annealing, or Tabu search.

17. The method of claim 15, wherein the accepting includes at least one of delivering the functional relationship or storing the functional relationship.

18. A non-transitory computer-readable medium comprising a set of code instruction retained therein that, in response to execution, cause a computing system including at least one processor to perform operations, comprising:
   determining a sequence for modifying one or more parameters associated with an initial recipe; and
   modifying the initial recipe to fabricate a product that fulfills a target product output based at least in part on the sequence and a defined probability distribution function that determines a degree of the modifying of the initial recipe.

19. The non-transitory computer-readable medium of claim 18, further comprising learning a set of relationships associated with product output through the modifying of the initial recipe.

20. The non-transitory computer-readable medium of claim 19, further comprising generating an adjusted recipe to accomplish the target product output based at least in part on the set of relationships.

* * * * *